US006416682B1

(12) United States Patent
Krijgsman et al.

(10) Patent No.: US 6,416,682 B1
(45) Date of Patent: Jul. 9, 2002

(54) METHOD OF PRODUCING MINERALS UNDER NEAR-CRITICAL, CRITICAL AND SUPERCRITICAL CONDITIONS

(75) Inventors: Pieter Krijgsman, Wapenveld; Daniel J. W. Ijdo, Voorhout, both of (NL)

(73) Assignee: Ceramic Oxides International B.V. (NL)

( * ) Notice: Subject to any disclaimer, the term of this patent is extended or adjusted under 35 U.S.C. 154(b) by 0 days.

(21) Appl. No.: 09/434,219

(22) Filed: Nov. 4, 1999

(51) Int. Cl.$^7$ ............................................... C04B 35/00
(52) U.S. Cl. ............................... 252/62.56; 252/62.57; 252/62.6; 252/62.62; 252/62.63; 252/62.64; 501/120; 423/593; 423/400; 423/594; 338/20; 338/21
(58) Field of Search ............................. 252/62.62, 62.6, 252/62.64, 62.63, 62.57, 62.56; 423/593, 594, 600; 501/120; 338/20, 21

(56) References Cited

U.S. PATENT DOCUMENTS

| | | | | |
|---|---|---|---|---|
| 3,577,247 A | * | 5/1971 | McKenna | 501/120 |
| 4,140,539 A | * | 2/1979 | Hund et al. | 252/62.62 |
| 4,457,812 A | | 7/1984 | Rado | 204/66 |
| 4,671,885 A | * | 6/1987 | Gaud et al. | 252/62.62 |
| 4,853,205 A | | 8/1989 | Tolley et al. | 423/472 |
| 4,983,374 A | | 1/1991 | Krijgdman | 423/593 |
| 5,233,021 A | | 8/1993 | Sikorski | 528/491 |
| 5,356,538 A | | 10/1994 | Wai et al. | 210/634 |
| 5,409,617 A | | 4/1995 | Ross et al. | 210/762 |
| 5,433,878 A | * | 7/1995 | Arai et al. | 252/62.63 |
| 5,480,630 A | | 1/1996 | Arai et al. | 423/625 |
| 5,509,558 A | * | 4/1996 | Imai et al. | 338/20 |
| 5,550,211 A | | 8/1996 | DeCrosta et al. | 528/480 |

(List continued on next page.)

FOREIGN PATENT DOCUMENTS

JP          8-259236       * 10/1996

OTHER PUBLICATIONS

Takada et al., "Preparation of Ferrites by Wet Method," *FERRITES: Proceedings of the International Conference*, (Jul. 1970) Japan, pp. 60–71.
Sato et al., "Preparation and Magnetic Characteristics of Ultra–Fine Spinel Ferrites," *FERRITES: Proceedings of the International Conference*, (Jul. 1970) Japan, pp. 72–74.
Kuczynski, "Formation of Ferrites by Sintering of Component Oxides," *FERRITES: Proceedings of the International Conference*, (Jul. 1970) Japan.
Turk, "Sintering and Grain Growth of $Ni_xZn_{1-x}Fe_2O_4$," *FERRITES: Proceedings of the International Conference*, (Jul. 1970), Japan pp. 99–101.
Strivens et al., "Adaptation of Manufacturing Process for Soft Ferrites to Suit Different Raw Materials," *FERRITES: Proceedings of the International Conference*, (Jul. 1970), pp. 239–242.

*Primary Examiner*—C. Melissa Koslow
(74) *Attorney, Agent, or Firm*—Skjerven Morrill LLP

(57) ABSTRACT

The present invention relates to methods of producing synthetic crystals (typically minerals) or comparable inorganic compounds by reactions of metal salts and metal oxyhydroxides under near-critical, critical or supercritical solvent conditions, avoiding thereby many of the difficulties associated with conventional solid state or wet chemistry synthesis. The metal oxyhydroxides are typically divalent or trivalent metals and the preferred solvent is typically (but not exclusively) water under near-critical, critical or supercritical conditions. The crystals so produced have a controlled particle size distribution. The crystals produced by the present invention also have morphologies with favorable properties for compaction into green bodies for subsequent sintering into near-net-shapes, approaching maximum theoretical densities. Avoidance of noxious by-products is another advantage of the present synthetic methods.

21 Claims, 35 Drawing Sheets

Phase diagram for a single pure component, illustrating boundaries in which solid (S), liquid (L), gaseous (G) and supercritical (SF) conditions occur, and in which tp and cp denote respectively the triple point and the critical point. A gas can be conveyed into a liquid counterclockwise. In doing so, the density ($\rho$), the viscosity ($\eta$) and the diffusion coefficient ($D_m$) change continuously from gas-like to liquid-like values however, no phase change is observed.

U.S. PATENT DOCUMENTS

| | | | |
|---|---|---|---|
| 5,561,066 A | 10/1996 | Sinha | 436/73 |
| 5,616,154 A | 4/1997 | Elliott et al. | 48/197 R |
| 5,635,154 A | 6/1997 | Arai et al. | 423/592 |
| 5,709,800 A | 1/1998 | Ross et al. | 210/762 |
| 5,730,874 A | 3/1998 | Wai et al. | 210/638 |
| 5,746,926 A | 5/1998 | Ross et al. | 210/761 |
| 5,750,081 A | 5/1998 | Smart | 423/3 |
| 5,753,086 A | 5/1998 | Guffey et al. | 202/88 |
| 5,770,085 A | 6/1998 | Wai et al. | 210/638 |
| 5,776,384 A | 7/1998 | Firsich et al. | 264/29.4 |
| 5,792,357 A | 8/1998 | Wai et al. | 210/638 |
| 5,824,709 A | 10/1998 | Suka | 521/47 |
| 5,837,149 A | 11/1998 | Ross et al. | 210/759 |
| 5,910,298 A | 6/1999 | Yamasaki et al. | 423/592 |

\* cited by examiner

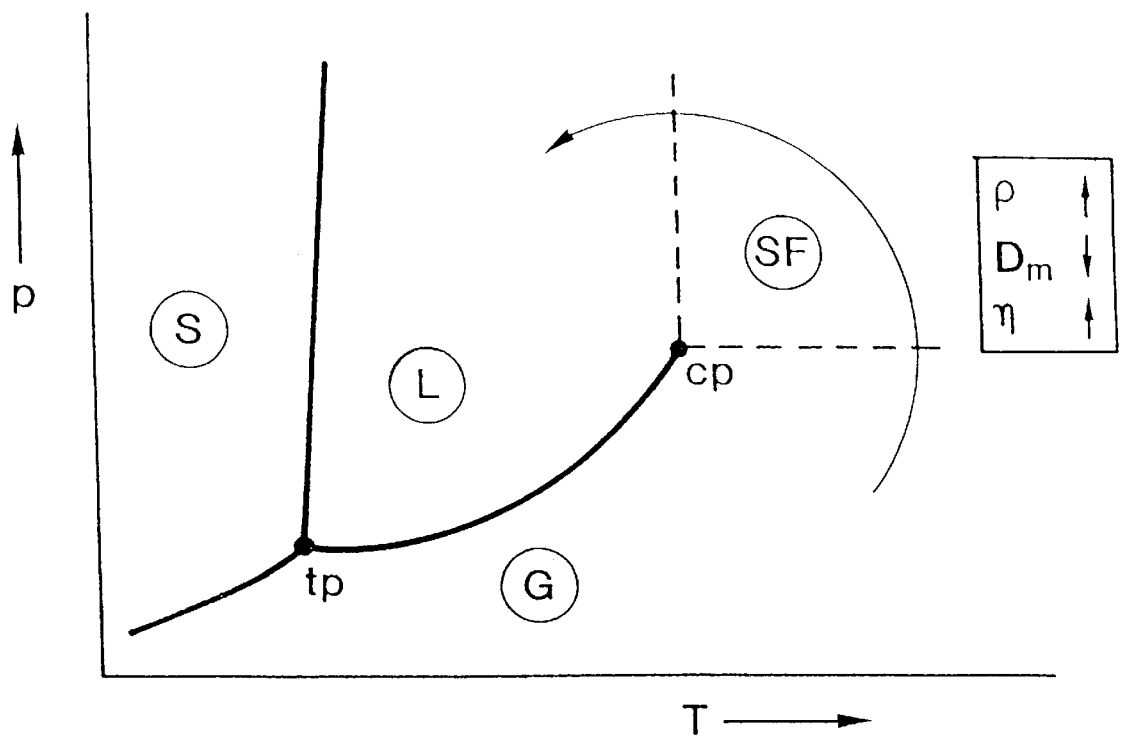

Phase diagram for a single pure component, illustrating boundaries in which solid (S), liquid (L), gaseous (G) and supercritical (SF) conditions occur, and in which tp and cp denote respectively the triple point and the critical point. A gas can be conveyed into a liquid counterclockwise. In doing so, the density ($\rho$), the viscosity ($\eta$) and the diffusion coefficient ($D_m$) change continuously from gas-like to liquid-like values however, no phase change is observed.

Fig. 1

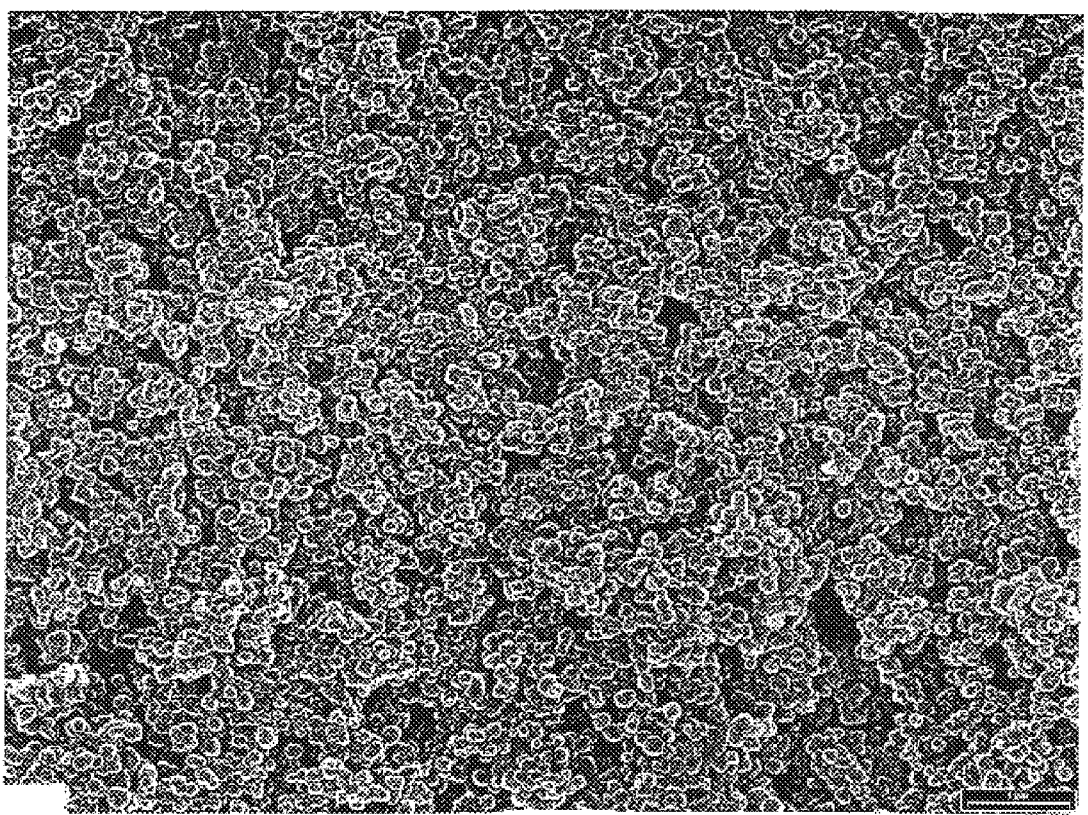
Fig. 5a     15000:1
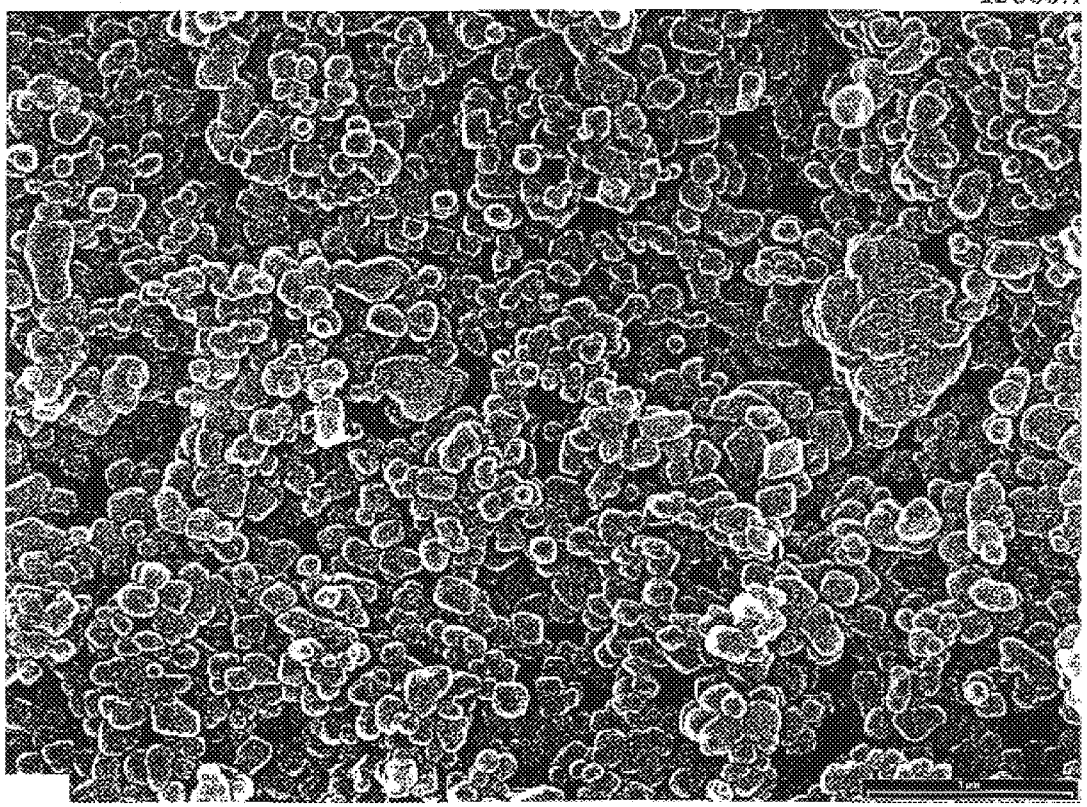
Fig. 5b     30000:1

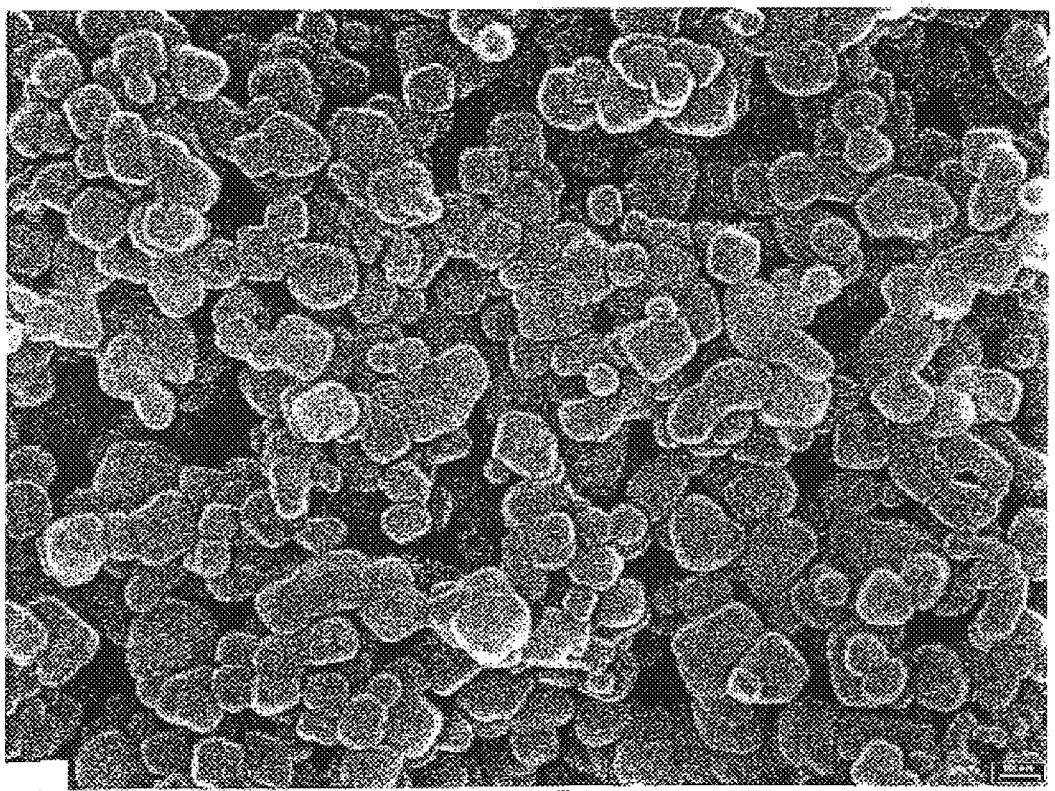
Fig. 5c  60000:1
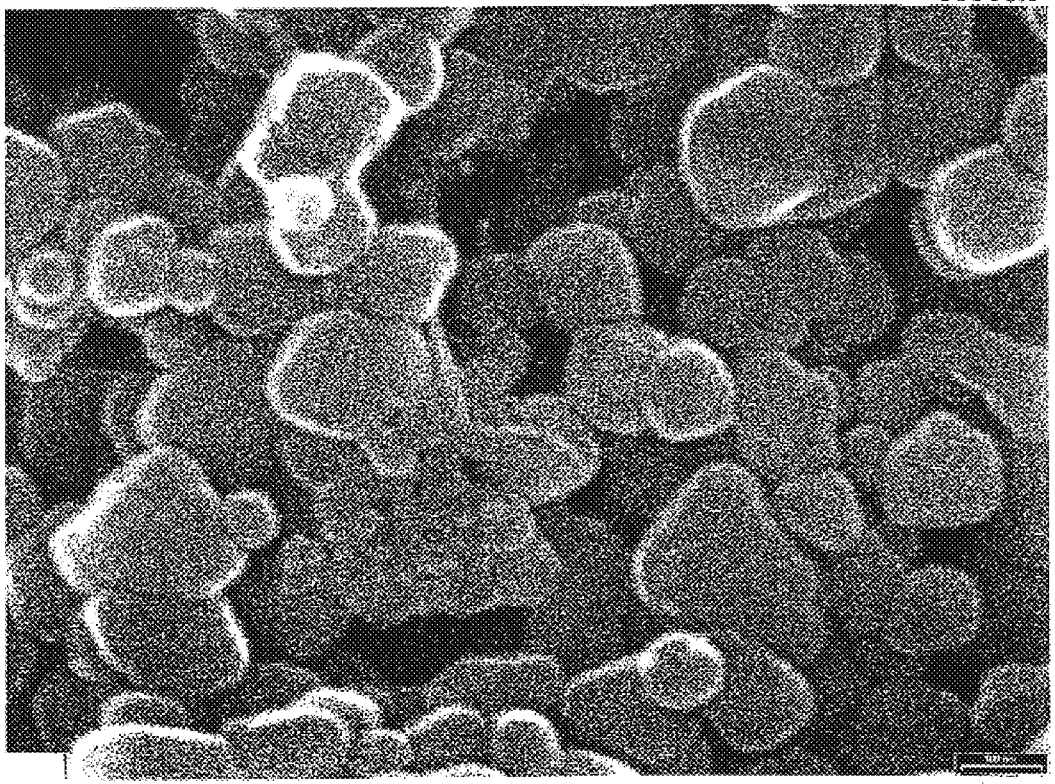
Fig. 5d  120000:1

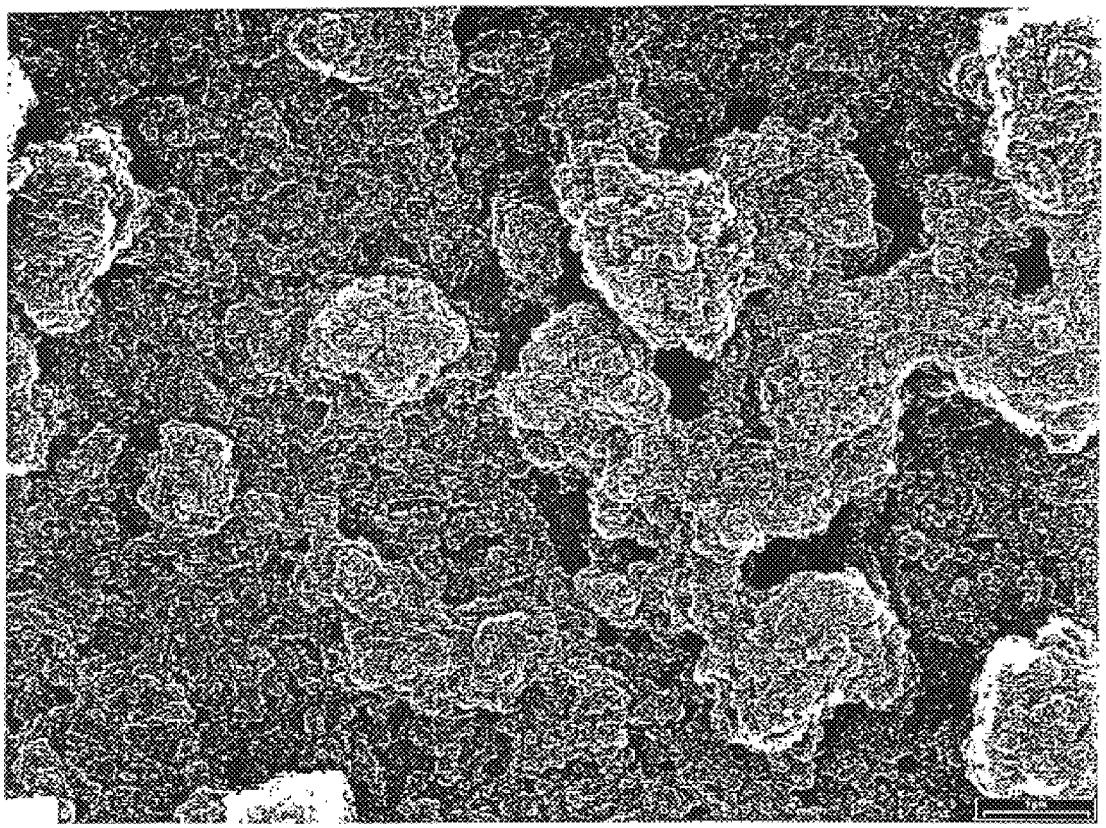
Fig. 6a 15000:1
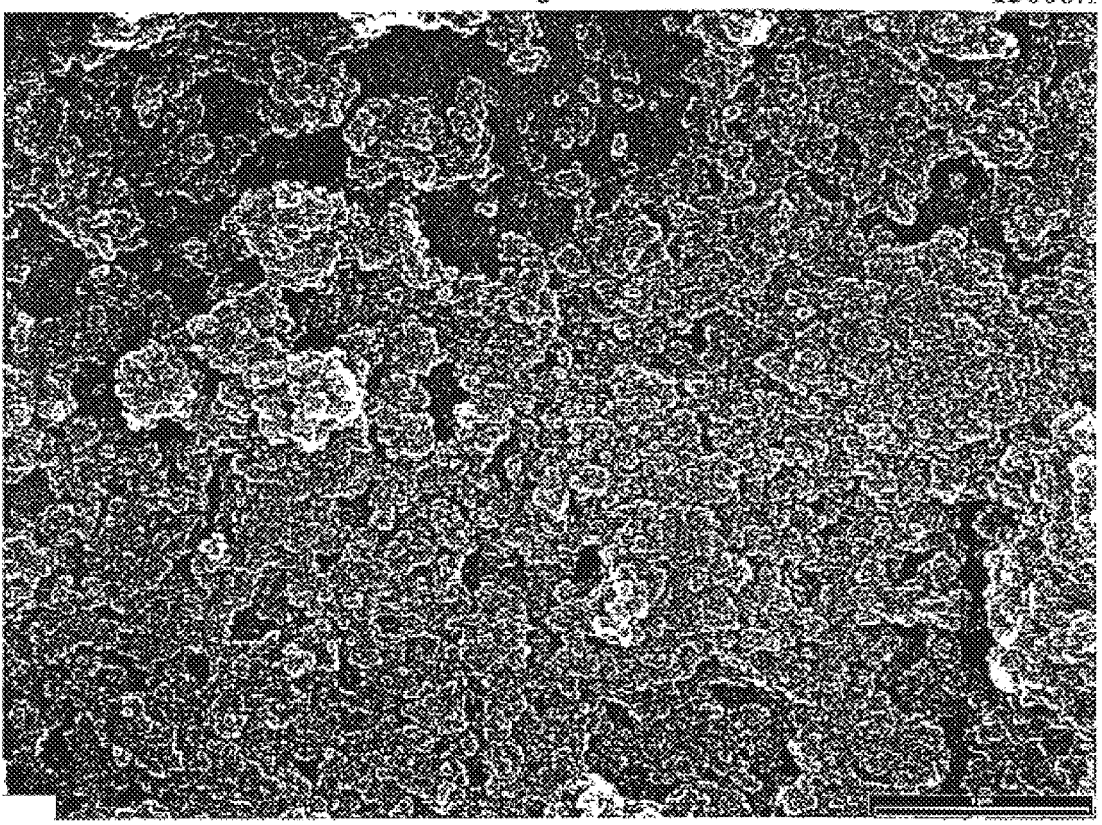
Fig. 6b 30000:1

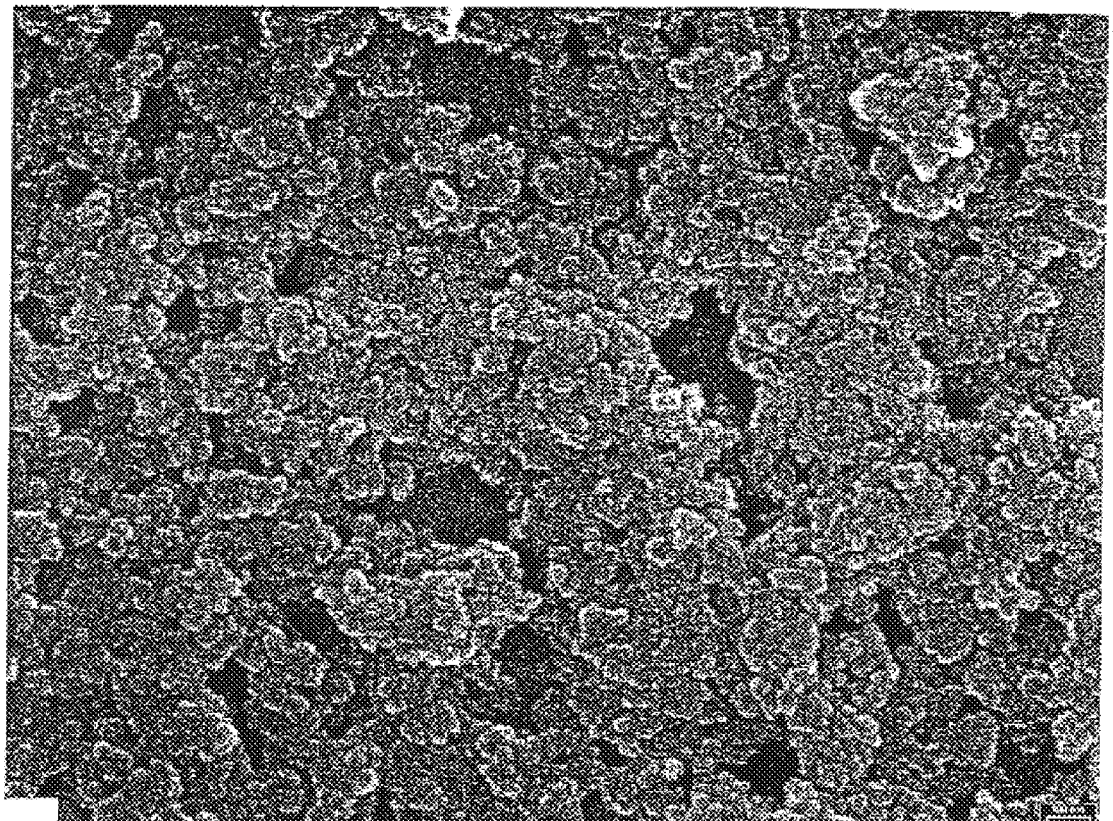
Fig. 6c  60000:1
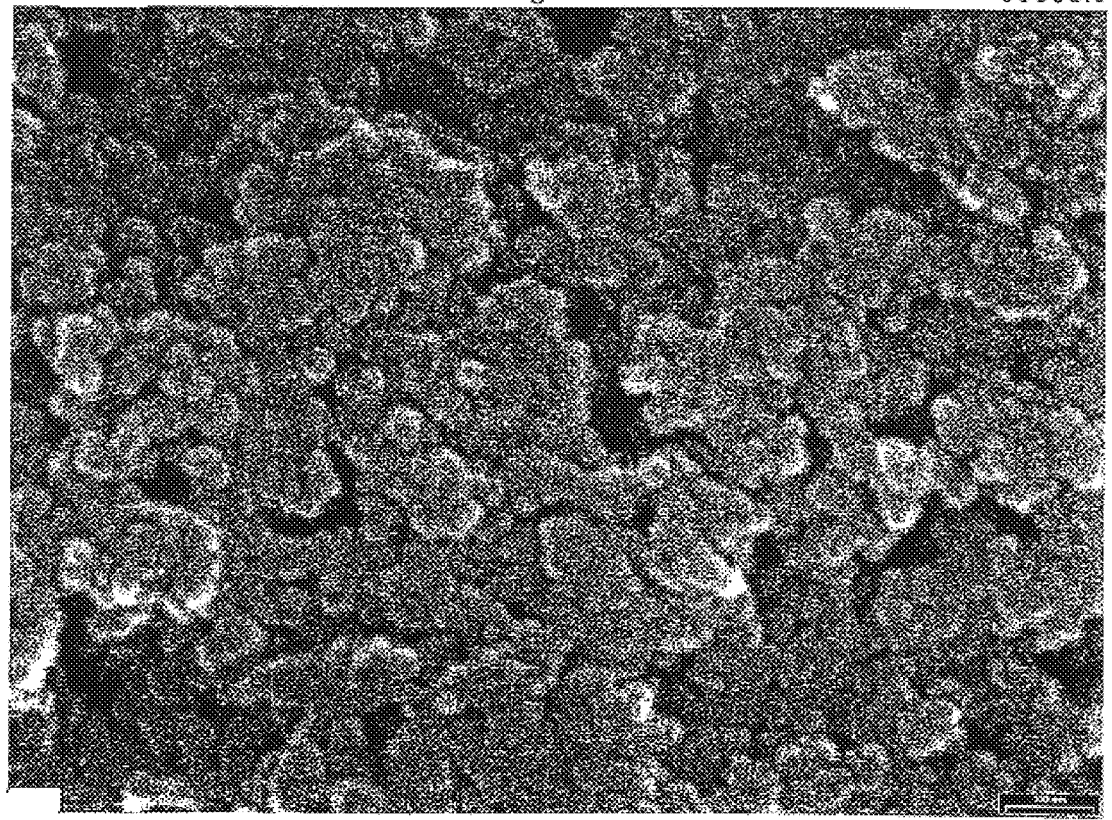
Fig. 6d  120000:1

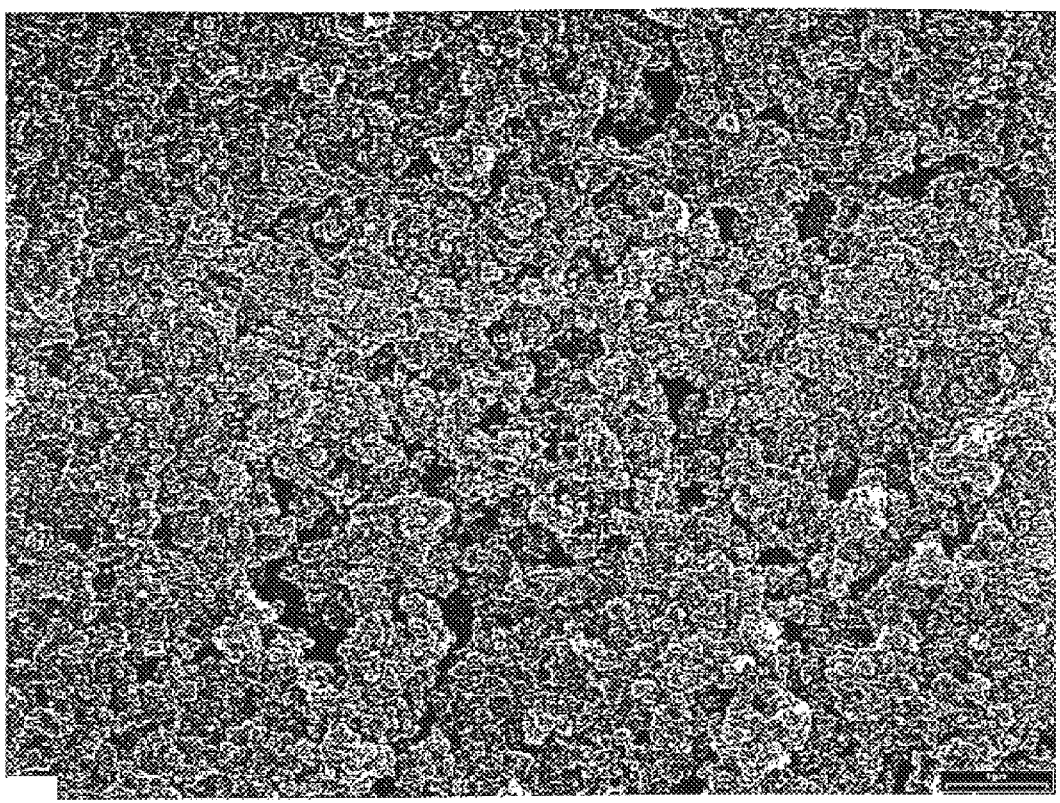
Fig. 7a          15000:1
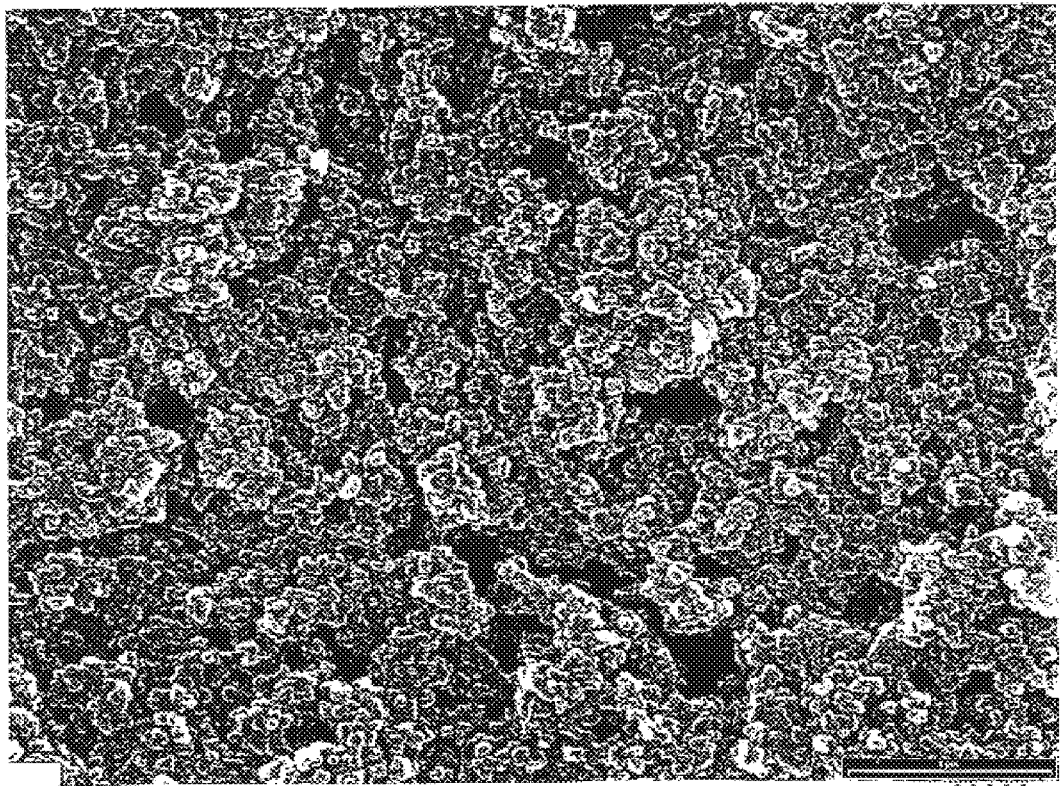
Fig. 7b          30000:1

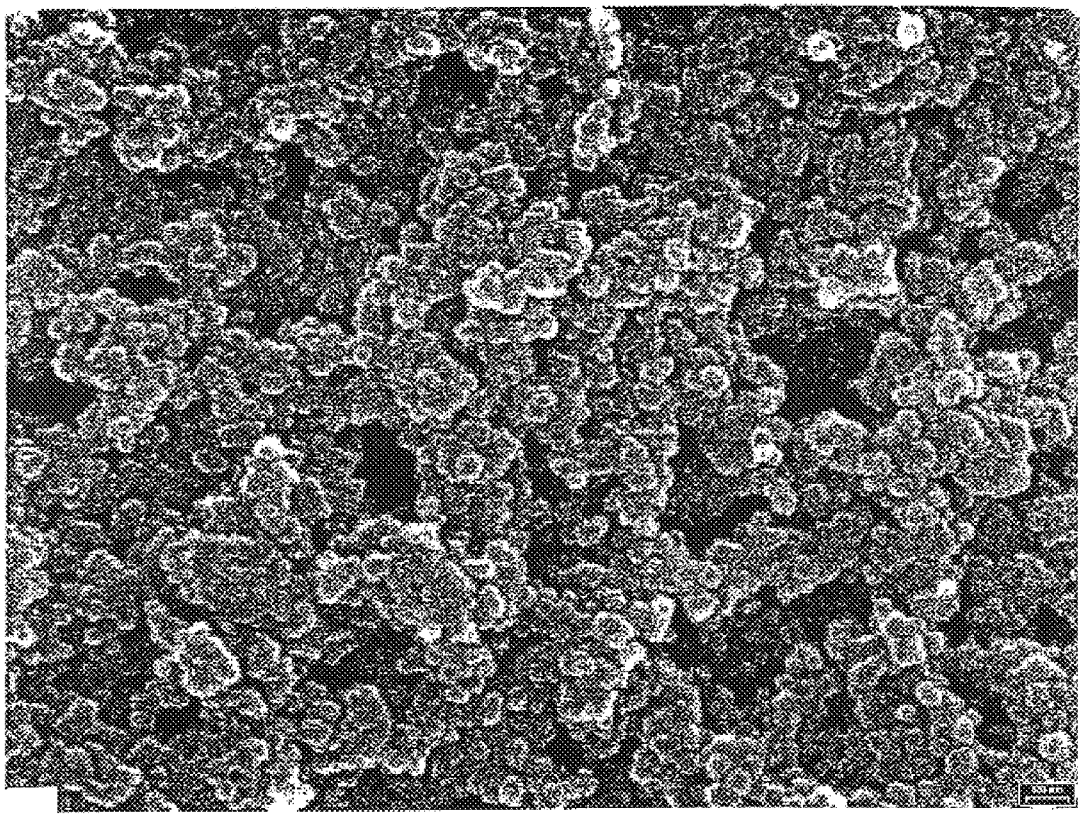
Fig. 7c 60000:1
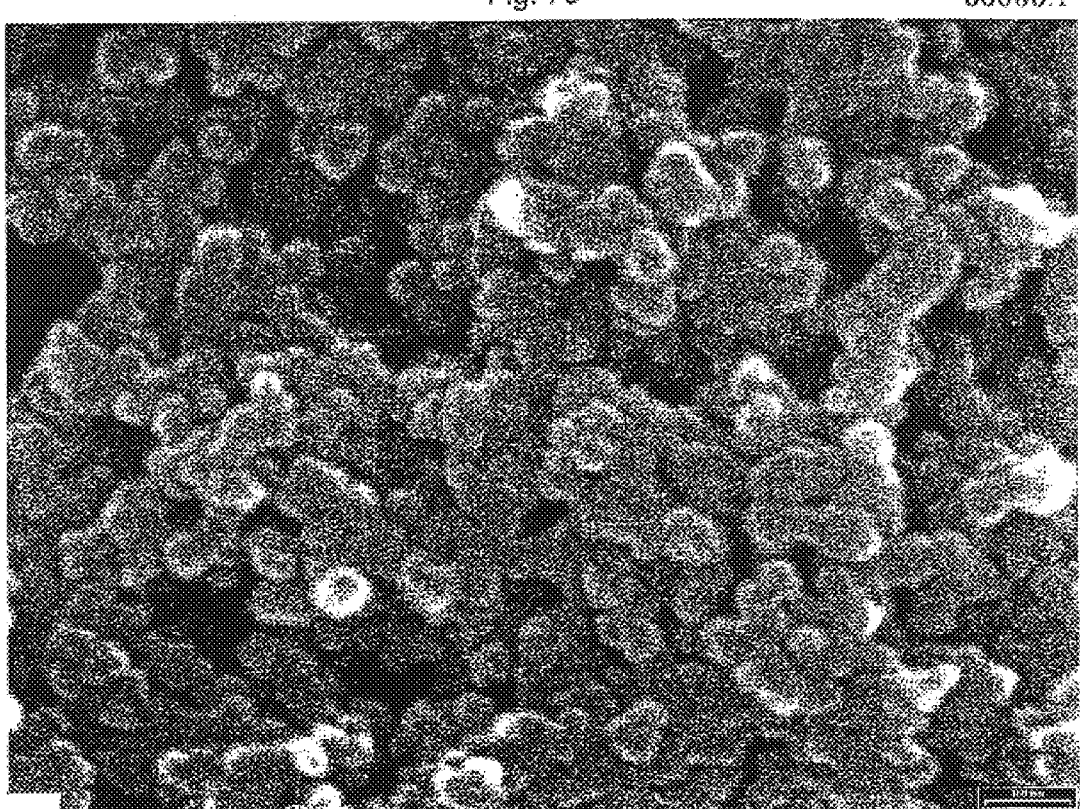
Fig. 7d 120000:1

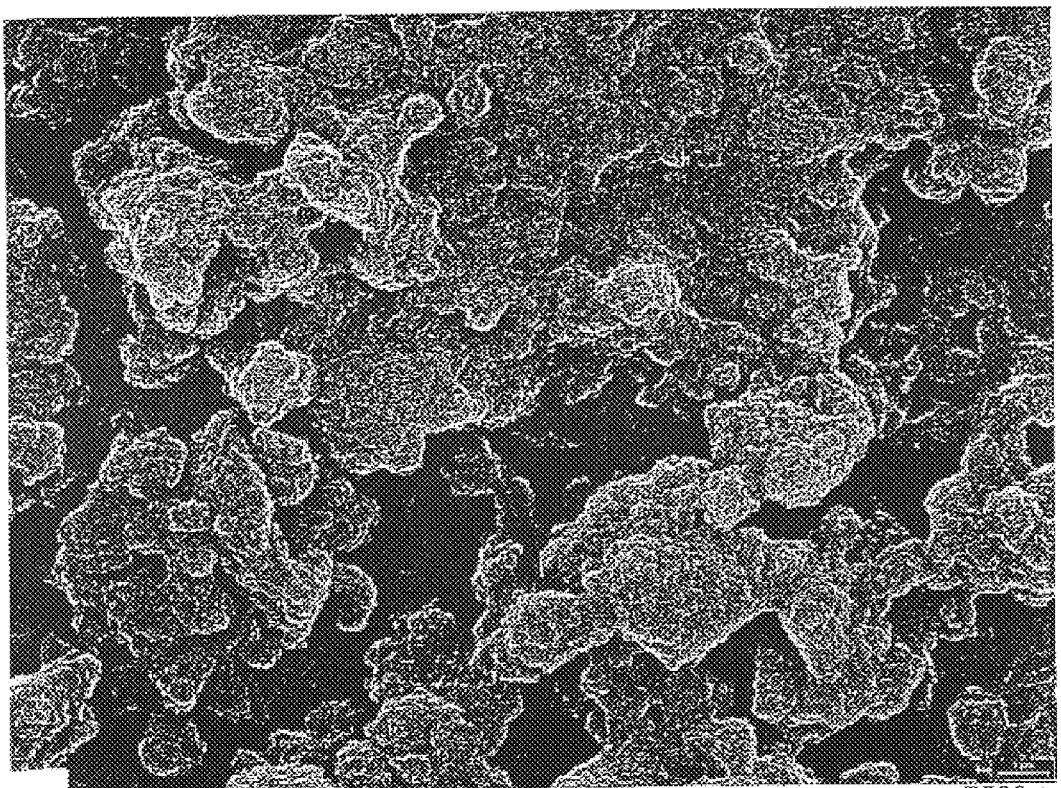
Fig. 8a 7500:1
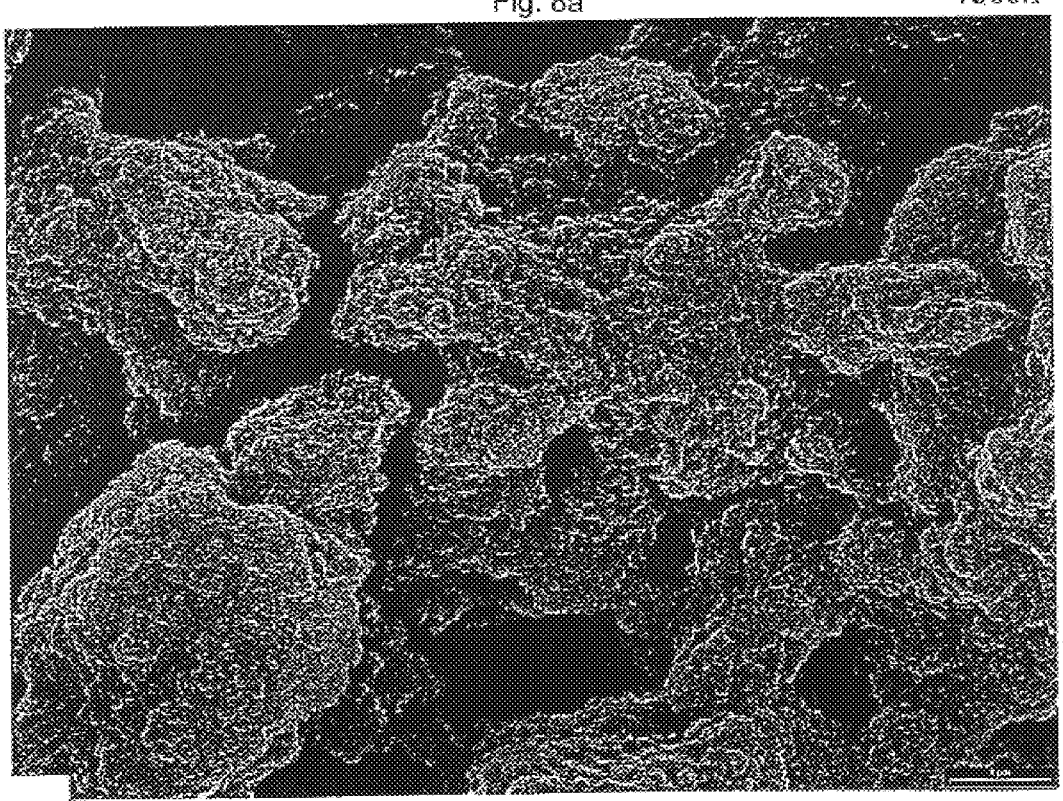
Fig. 8b 15000:1

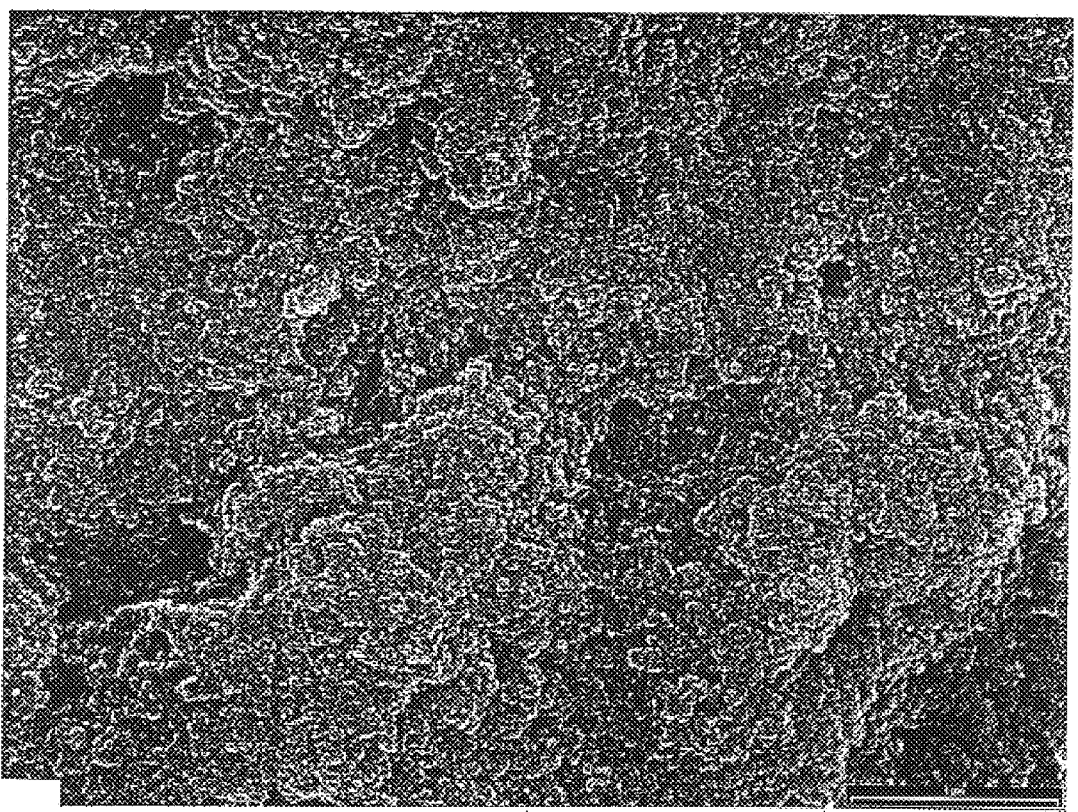
Fig. 8c    30000:1
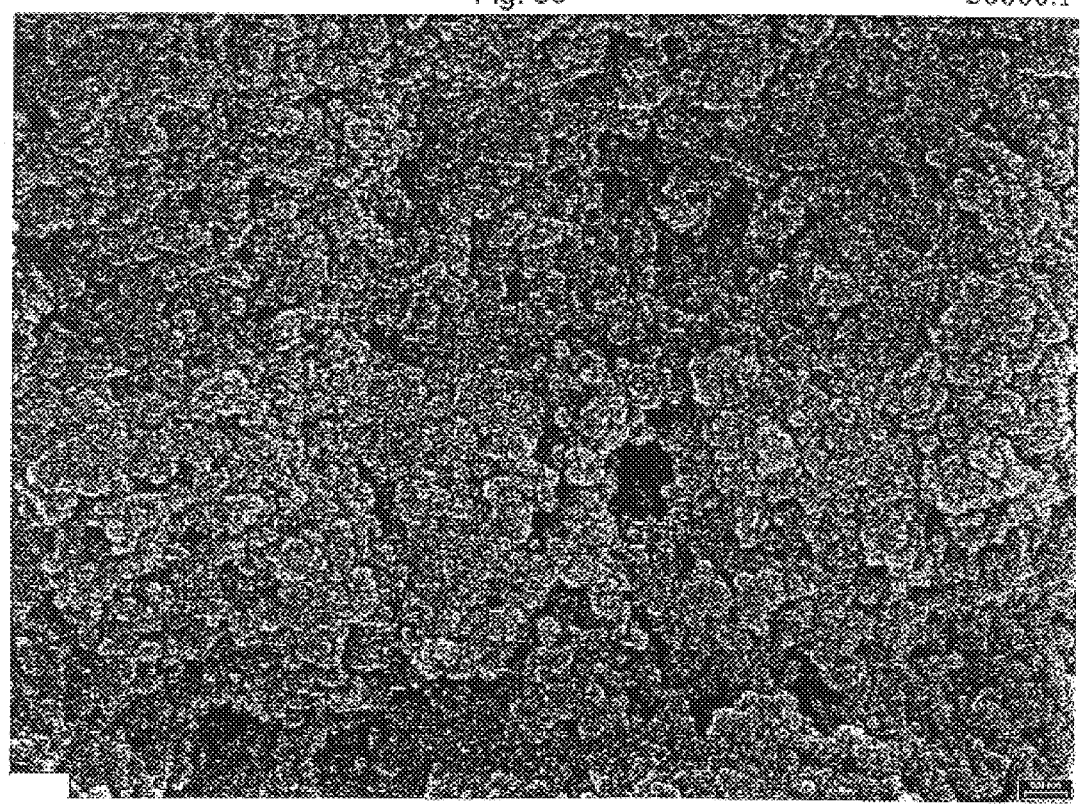
Fig. 8d    60000:1

120000:1

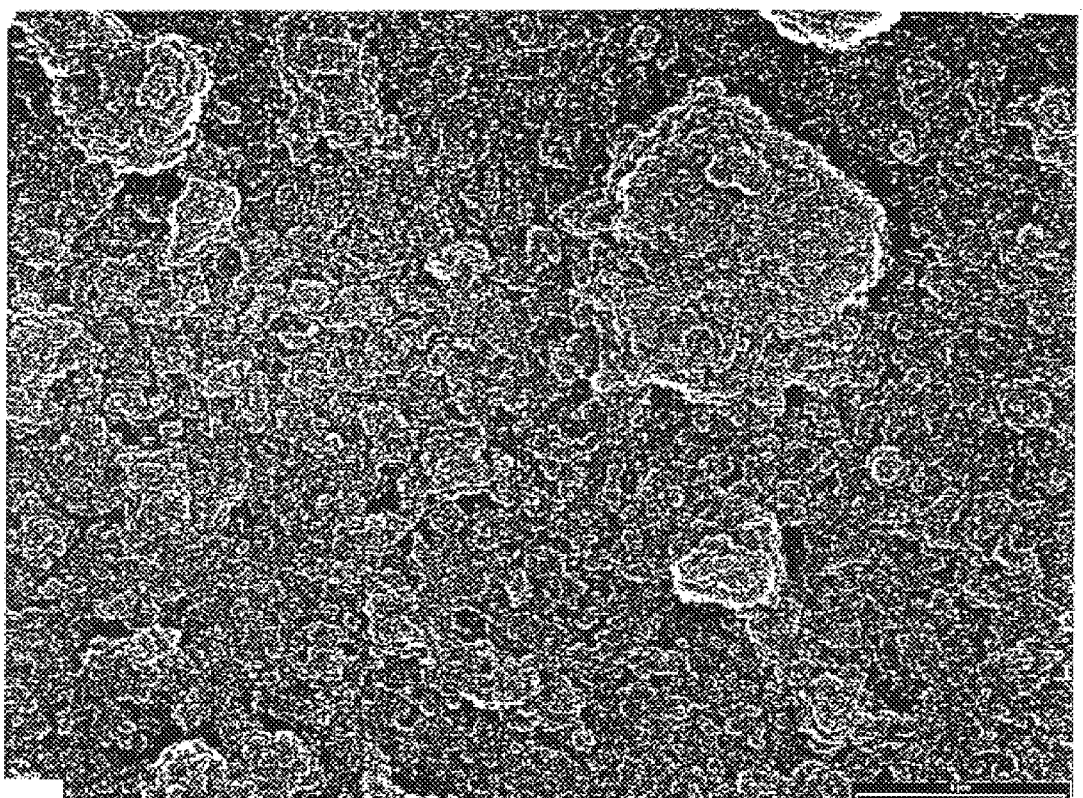
Fig. 9a  30000:1
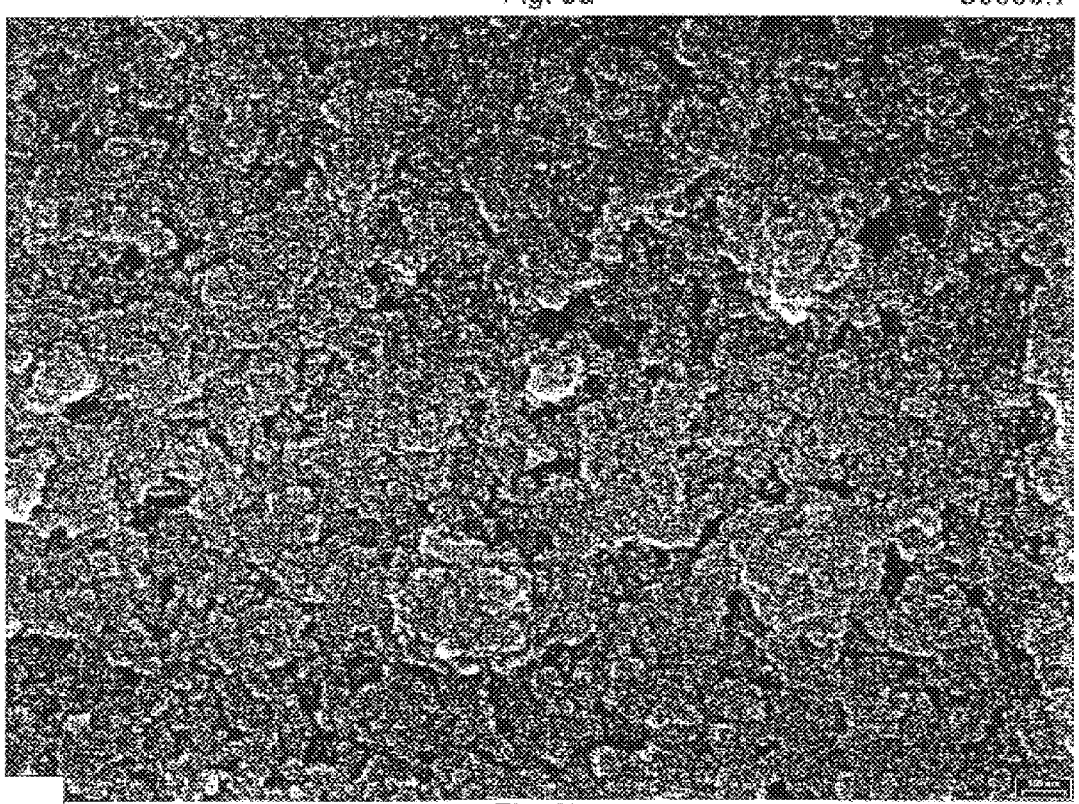
Fig. 9b  60000:1

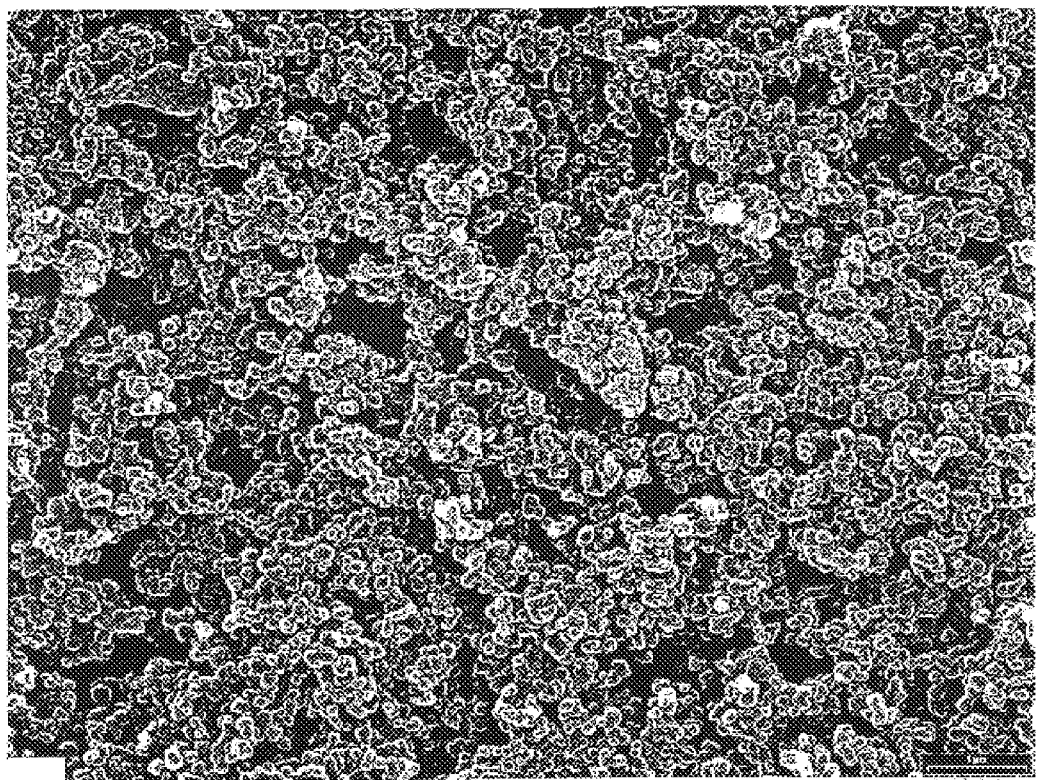
Fig. 10a     15000:1
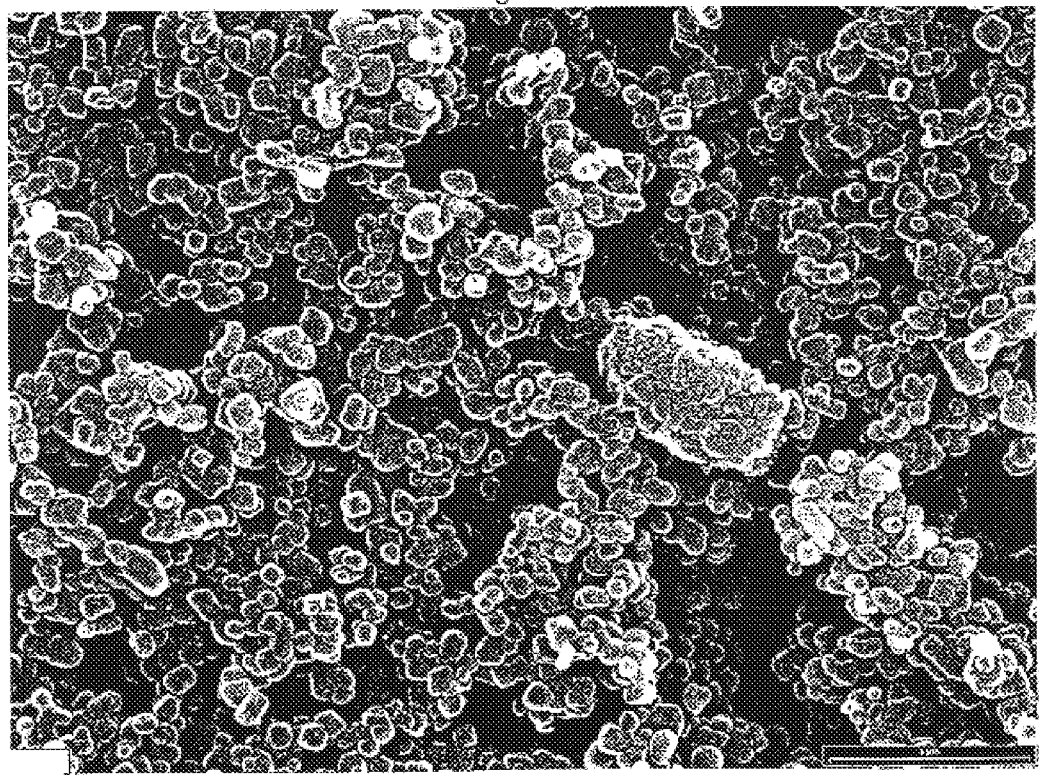
Fig. 10b     30000:1

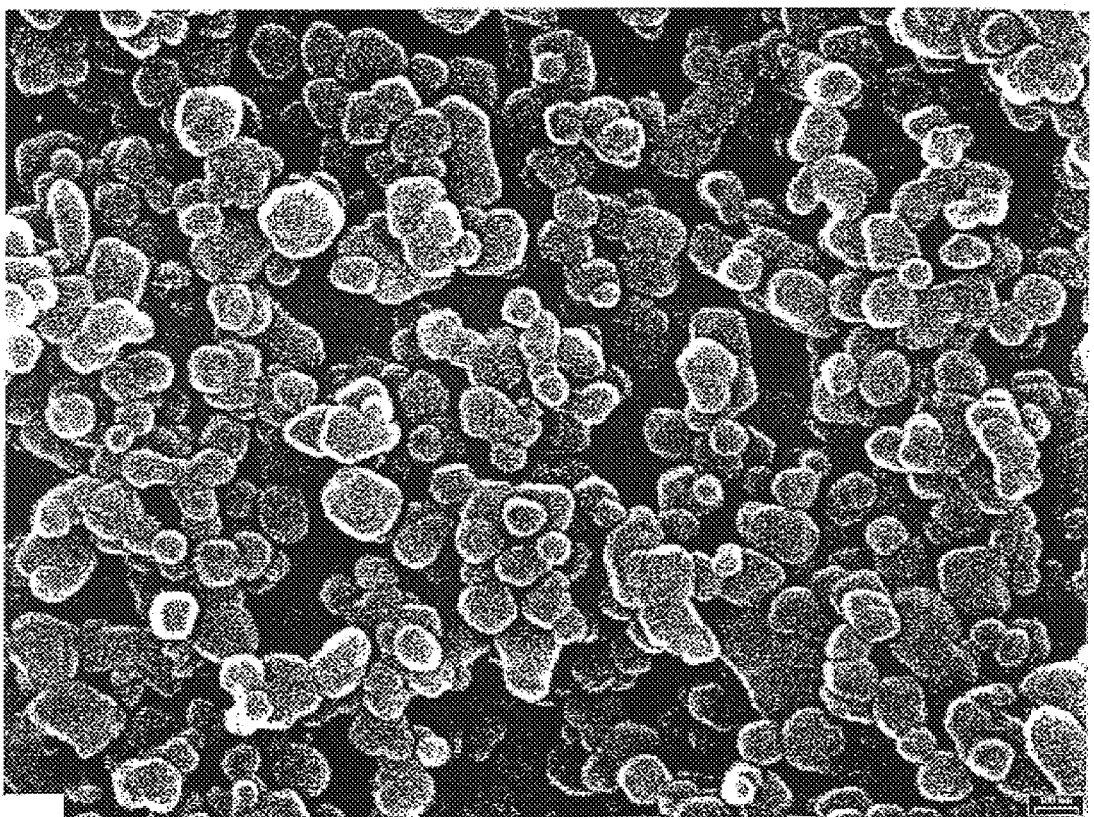
Fig. 10c  60000:1
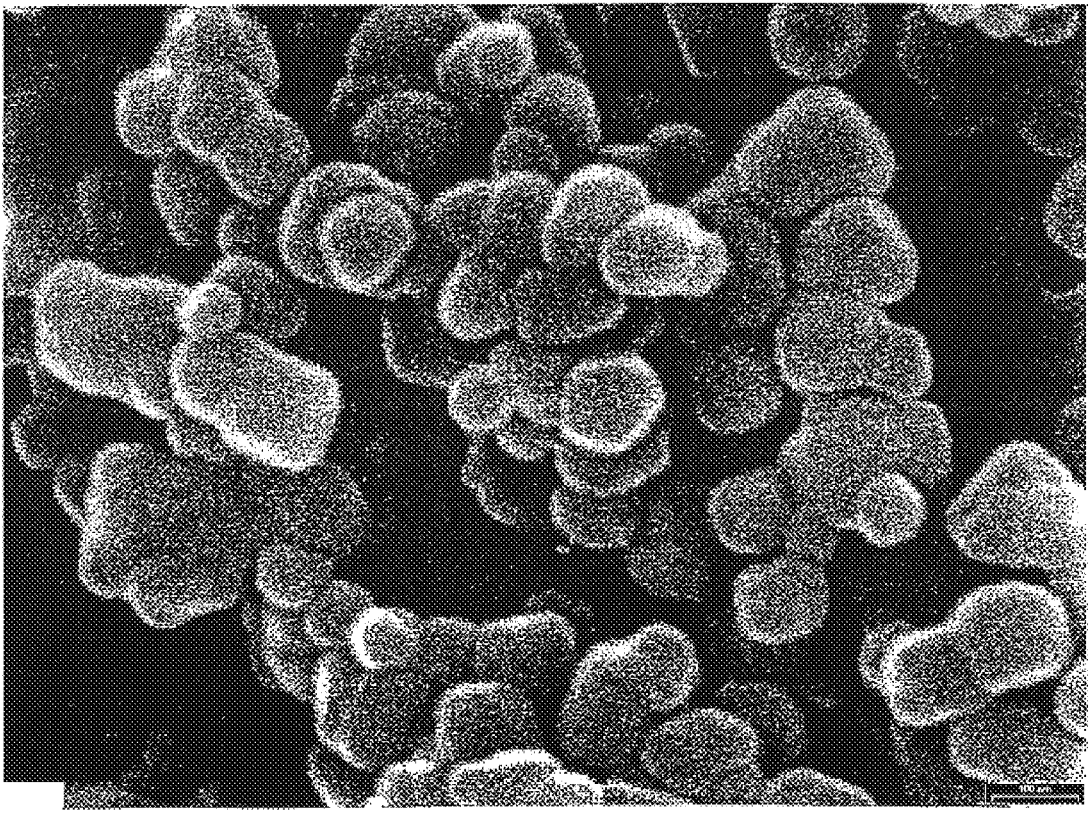
Fig. 10d  120000:1

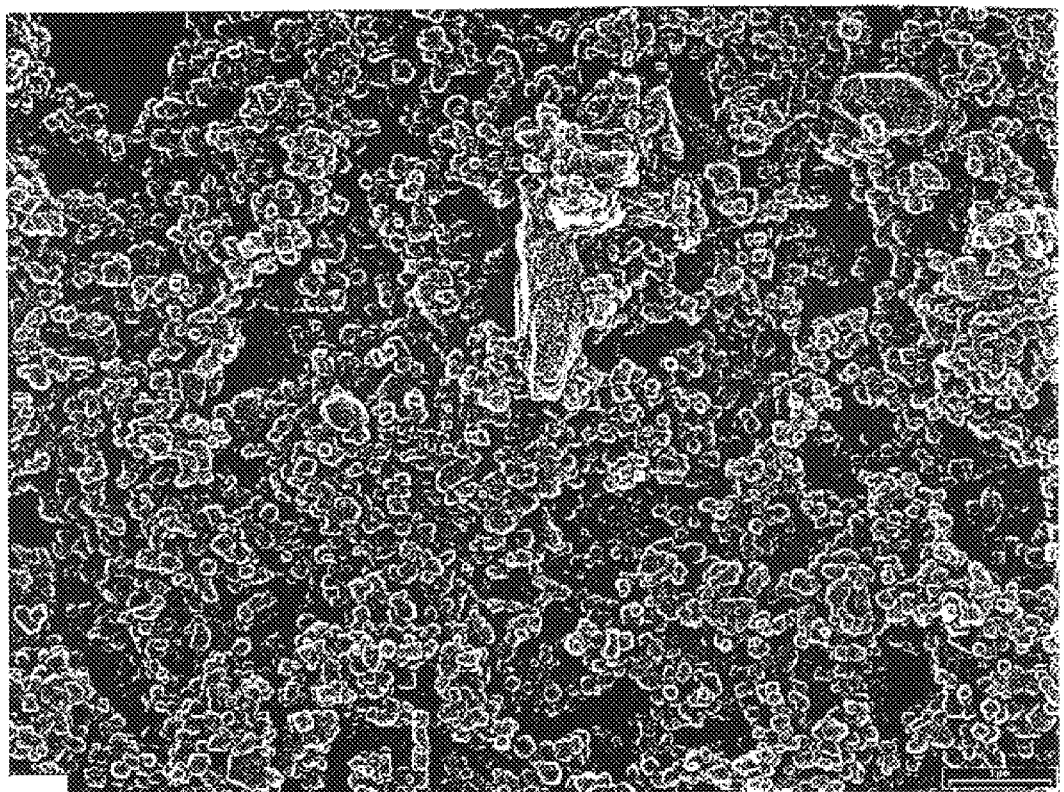
Fig. 11b  15000:1
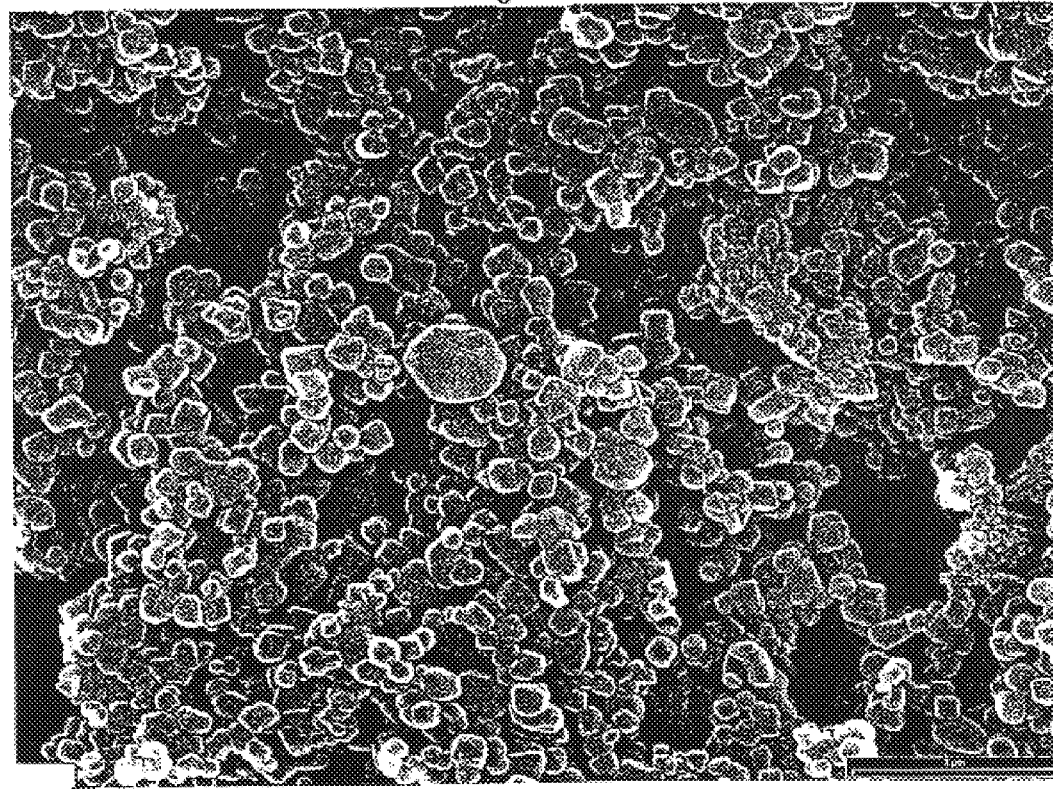
Fig. 11c  30000:1

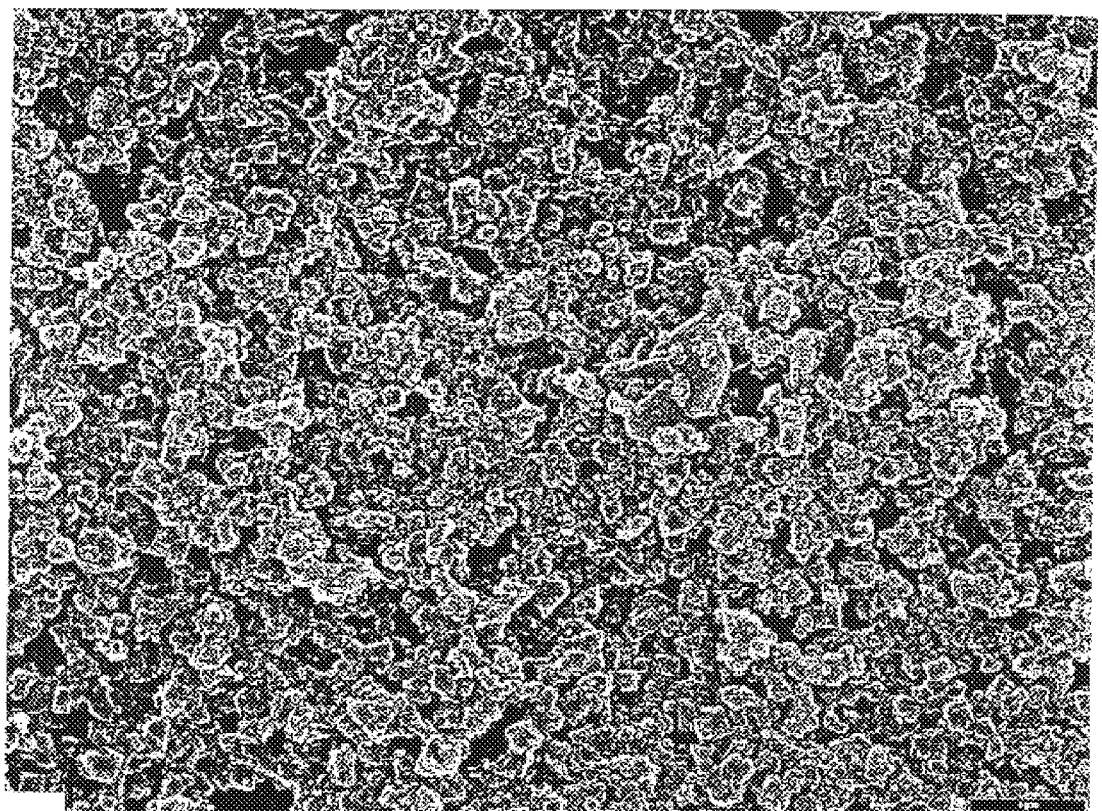
Fig. 13a    15000:1
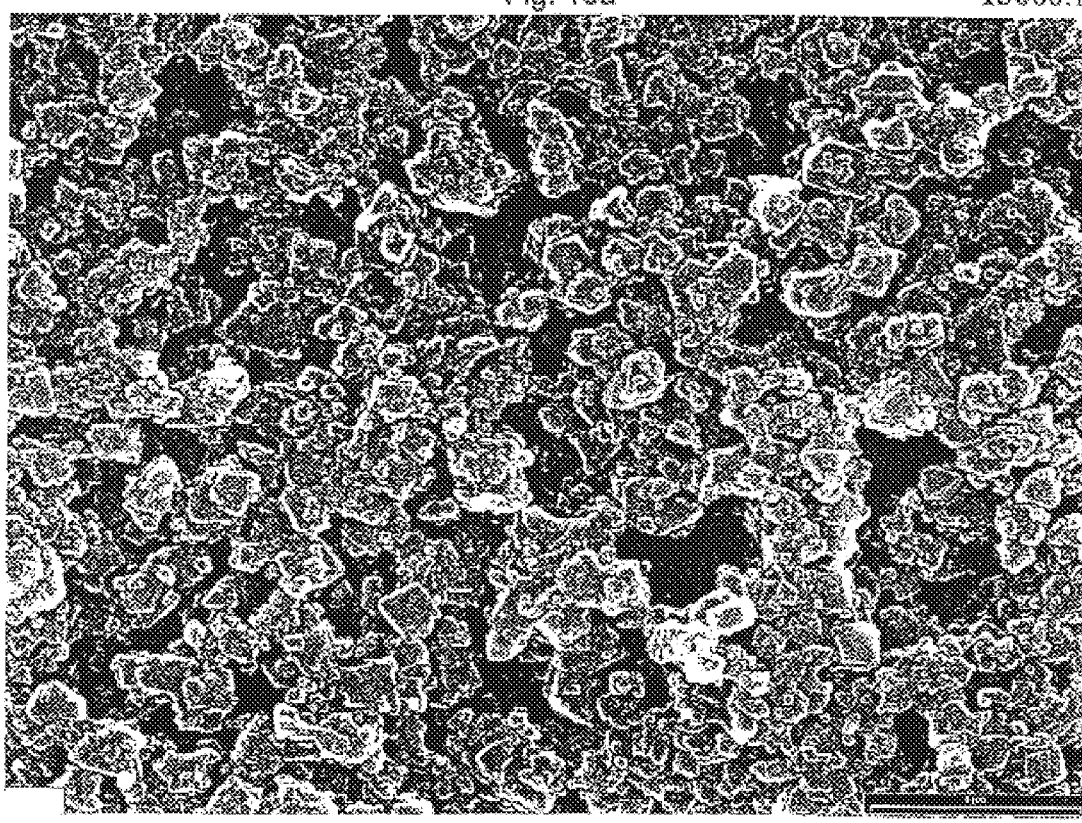
Fig. 13b    30000:1

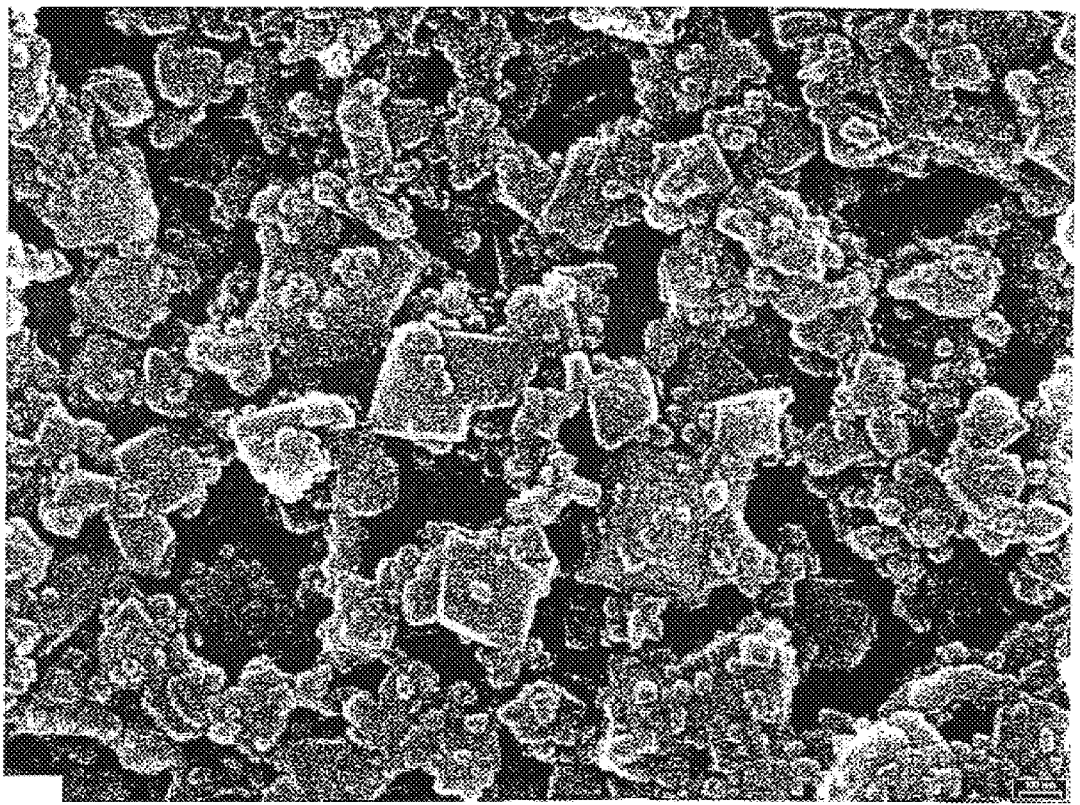
Fig. 13c  60000:1
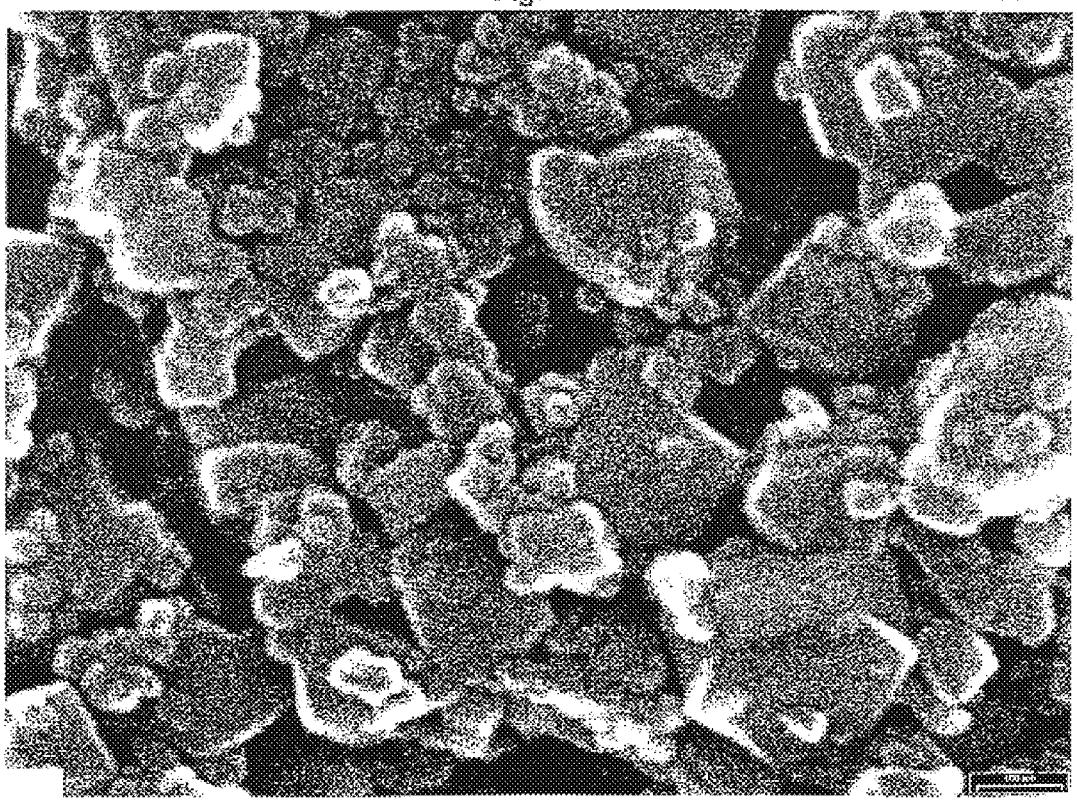
Fig. 13d  120000:1

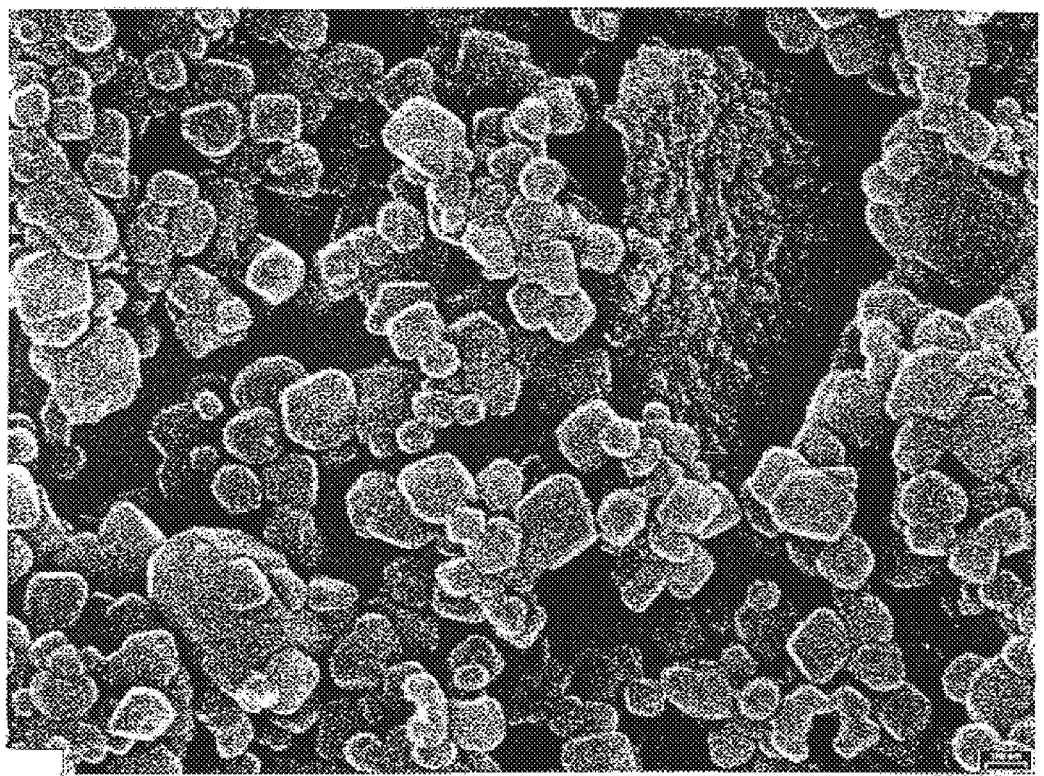
Fig. 14c  60000:1
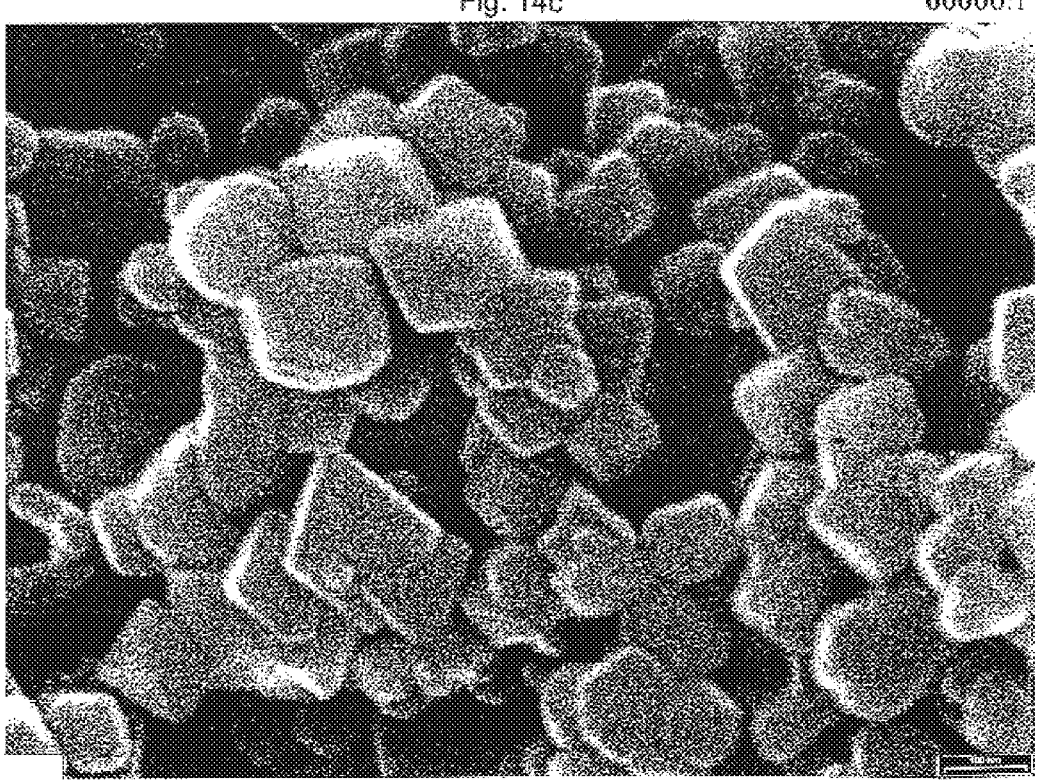
Fig. 14d  120000:1

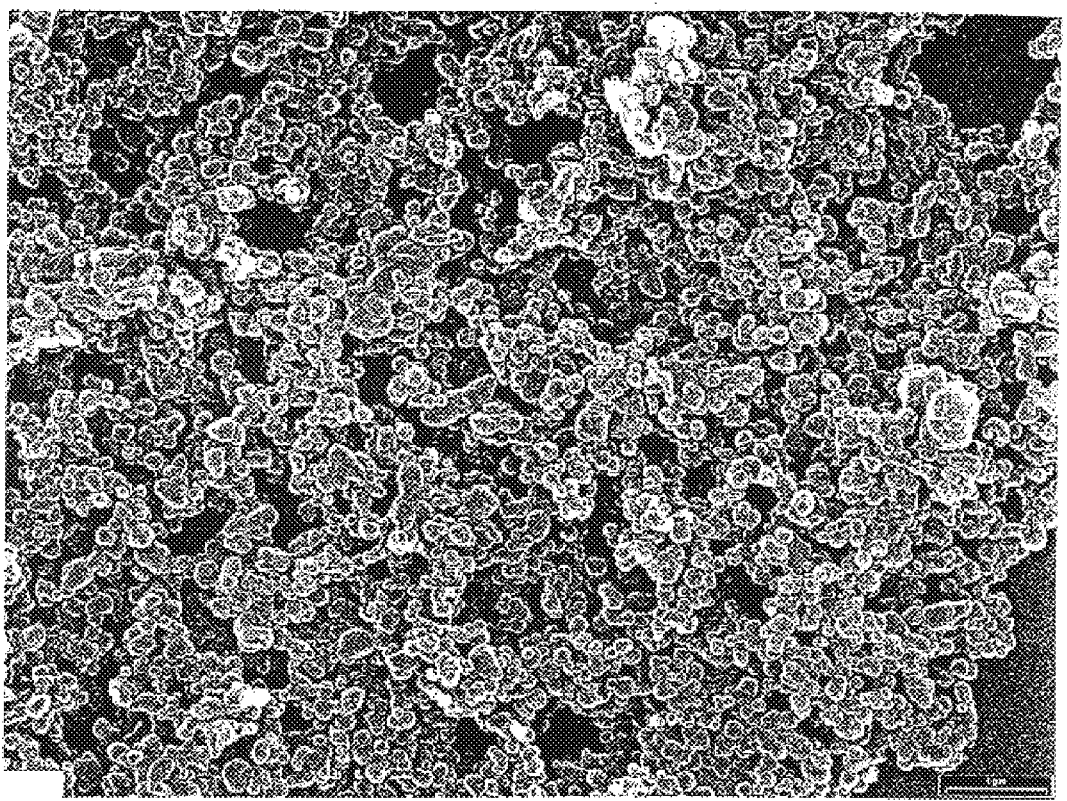
Fig. 15a 15000:1
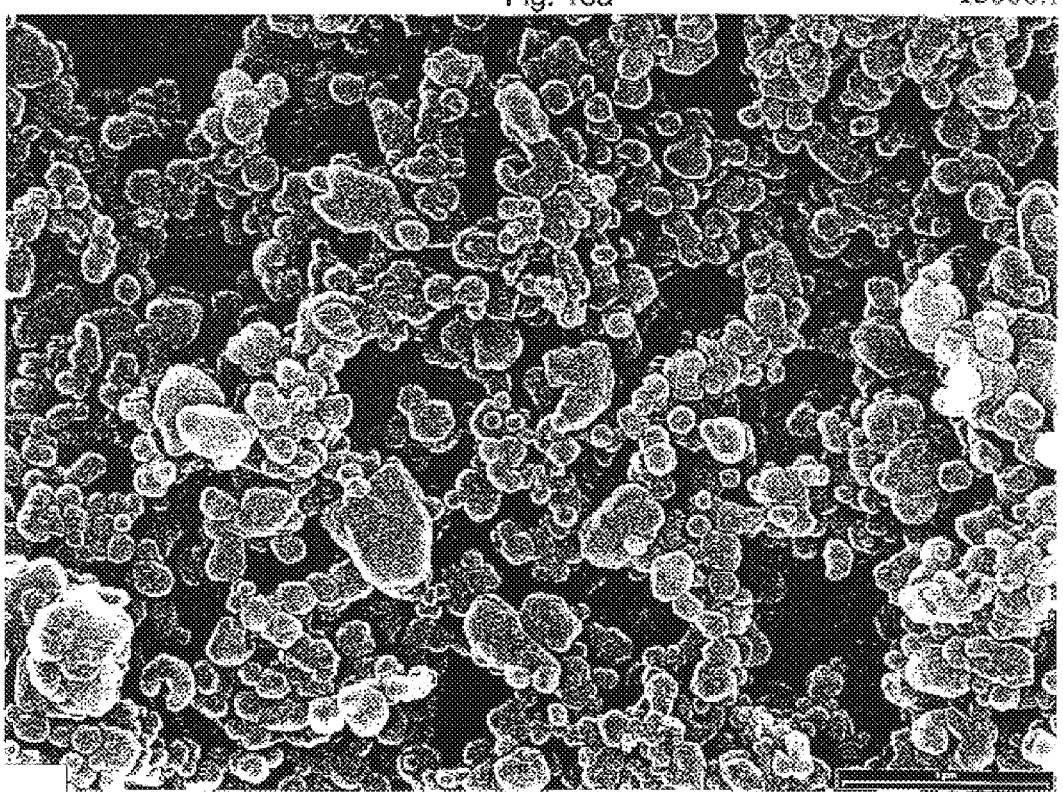
Fig. 15b 30000:1

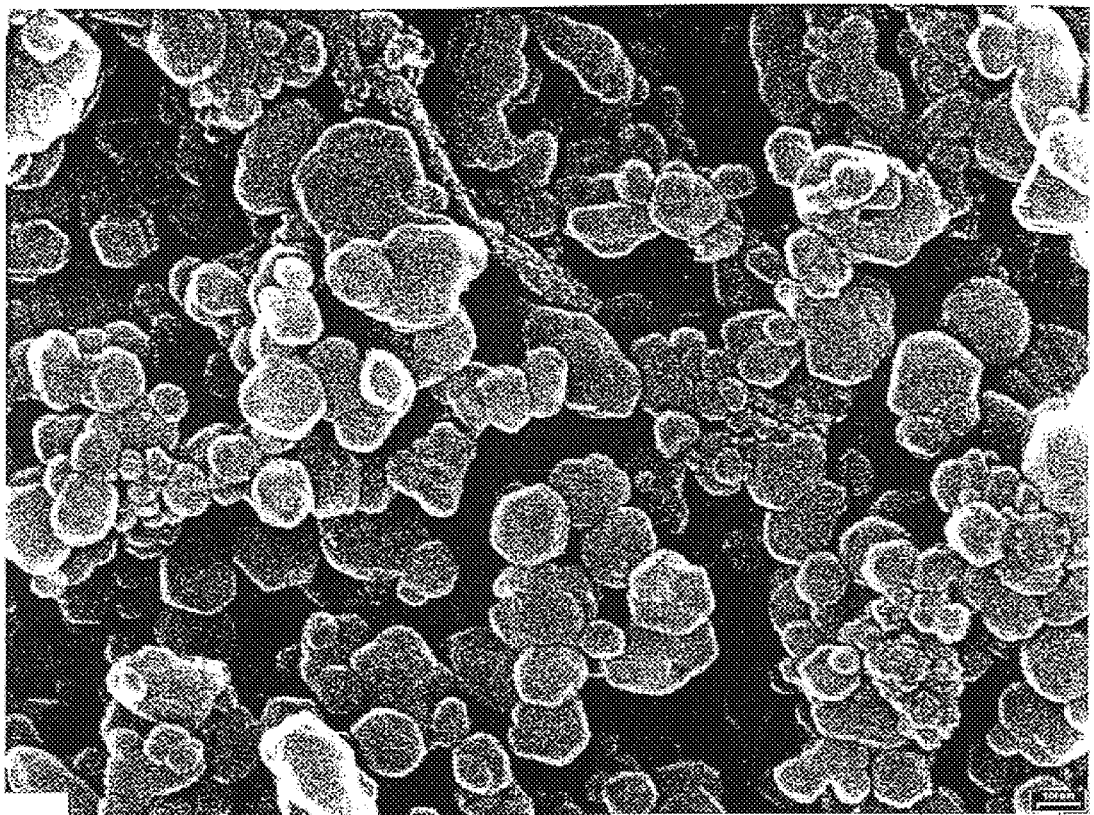
Fig. 15c  60000:1
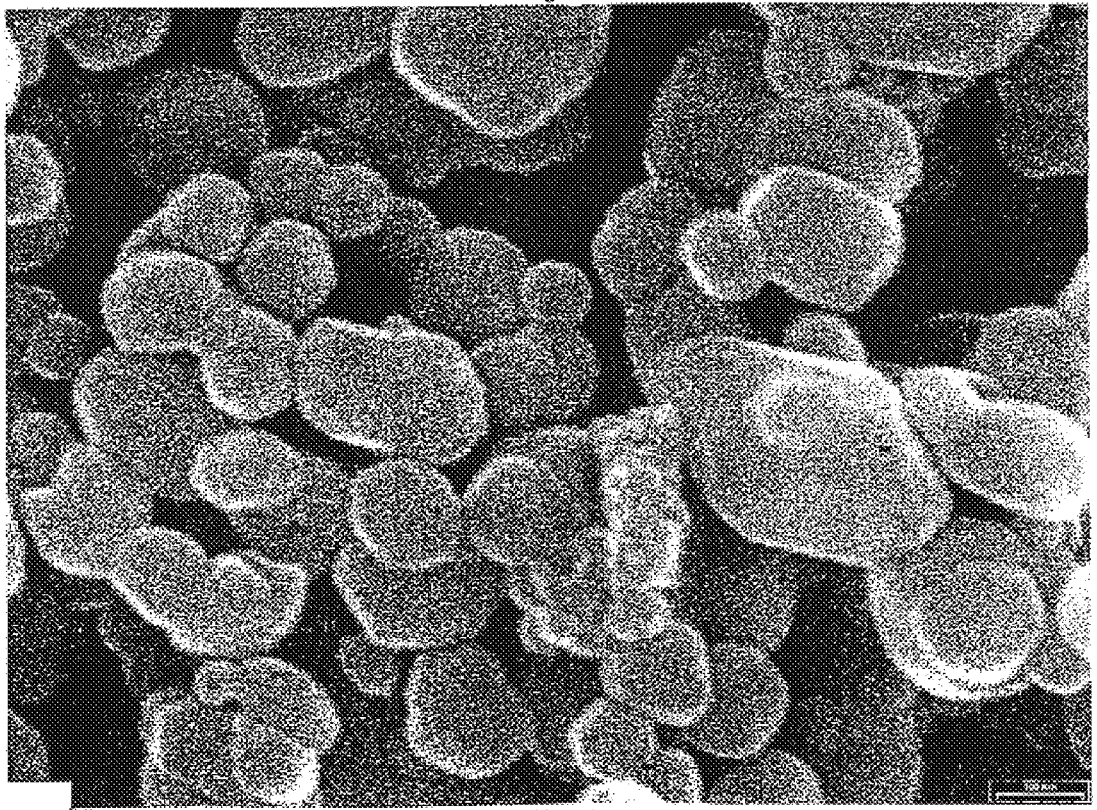
Fig. 15d  120000:1

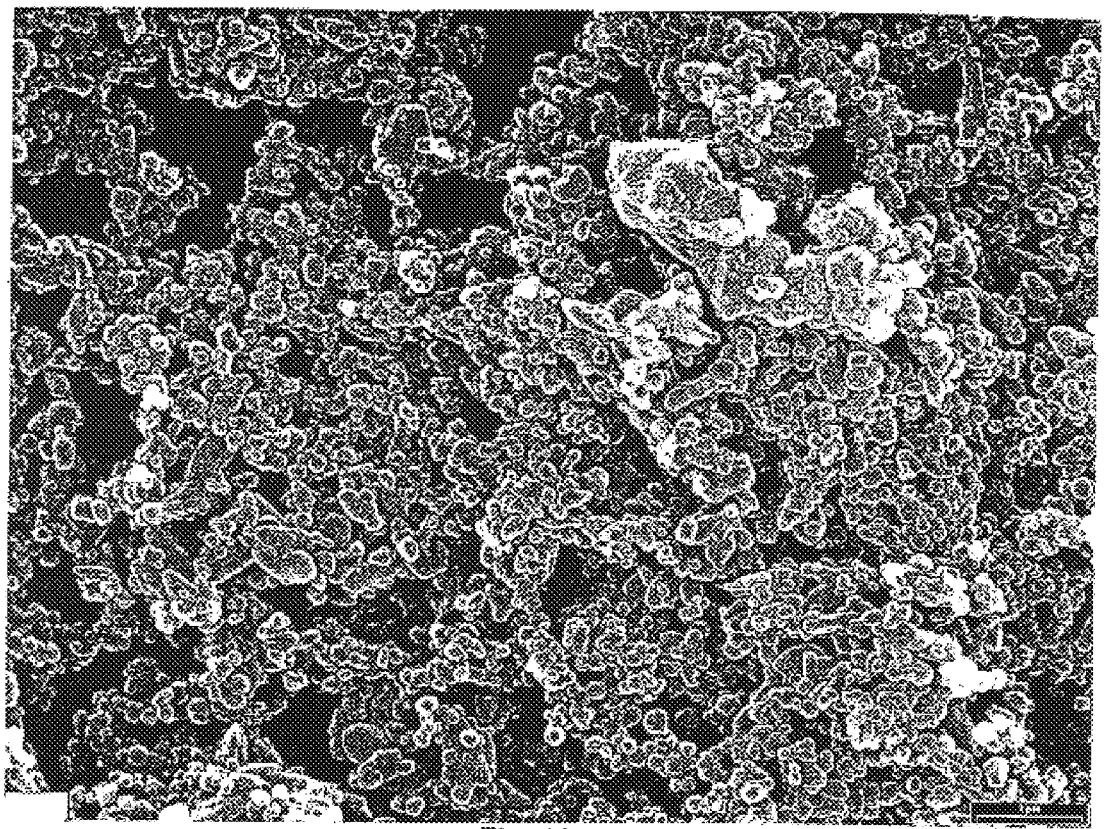
Fig. 16a  15000:1
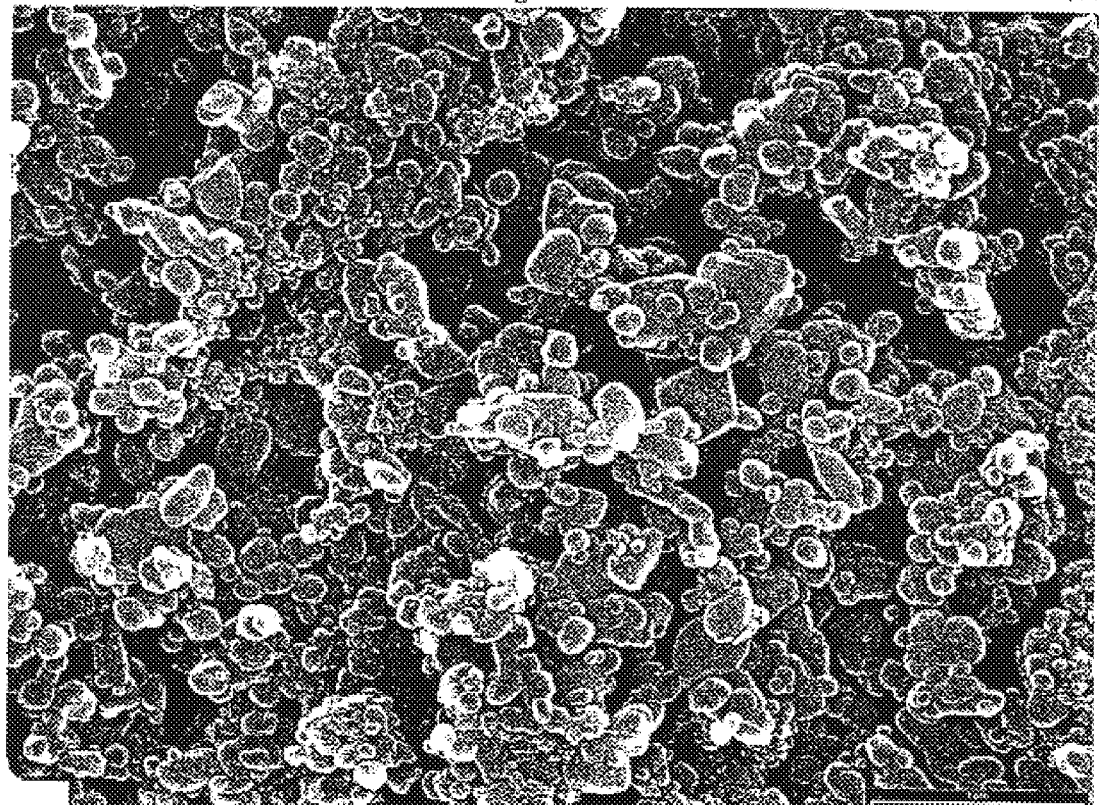
Fig. 16b  30000:1

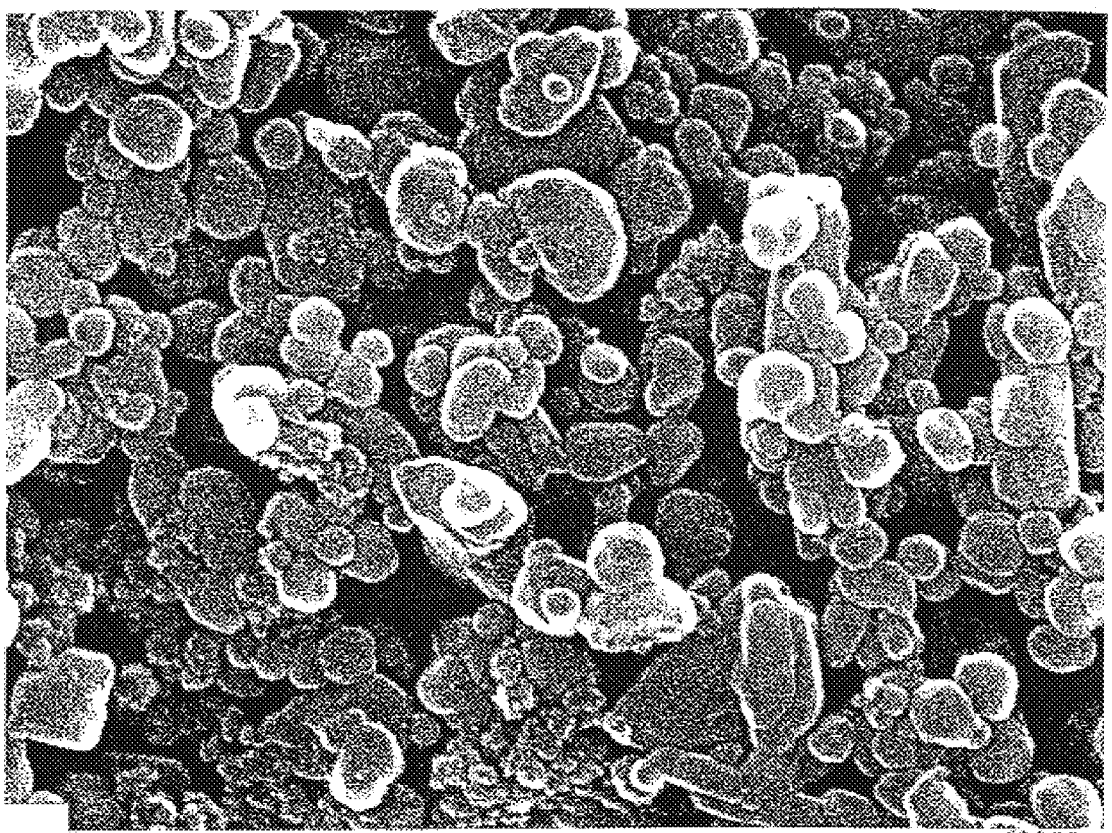
Fig. 16c  60000:1
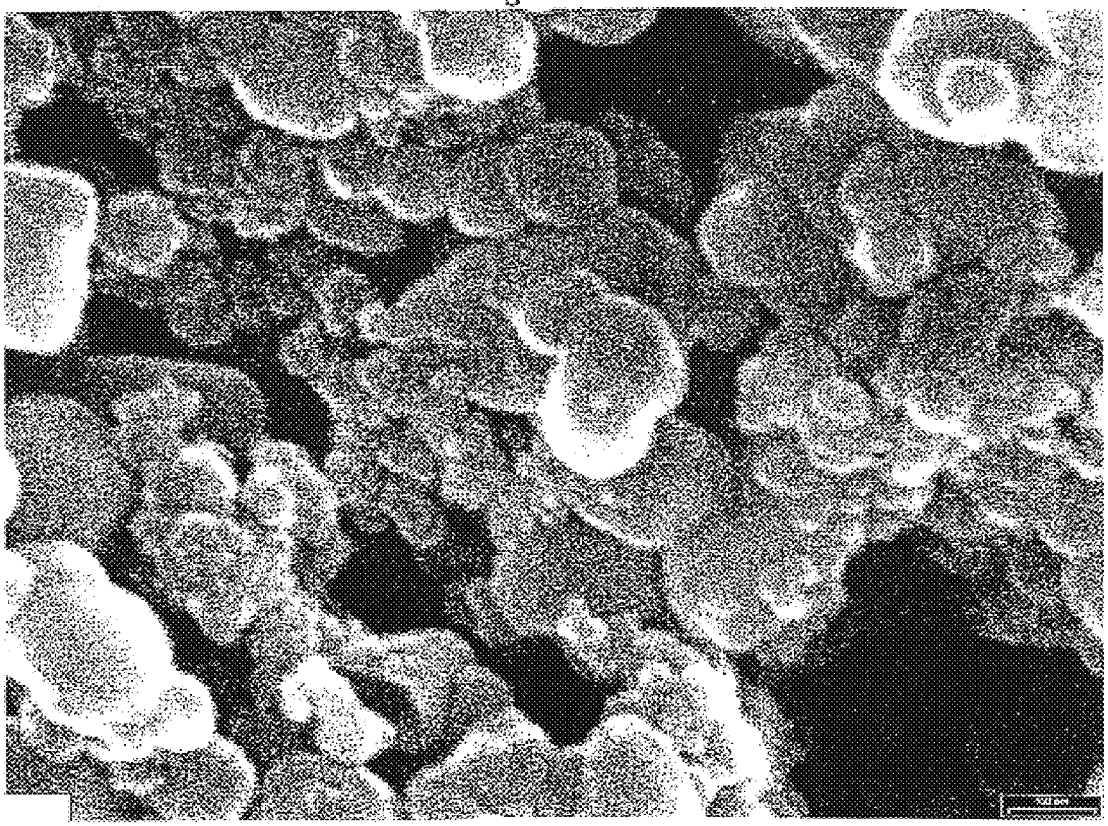
Fig. 16d  120000:1

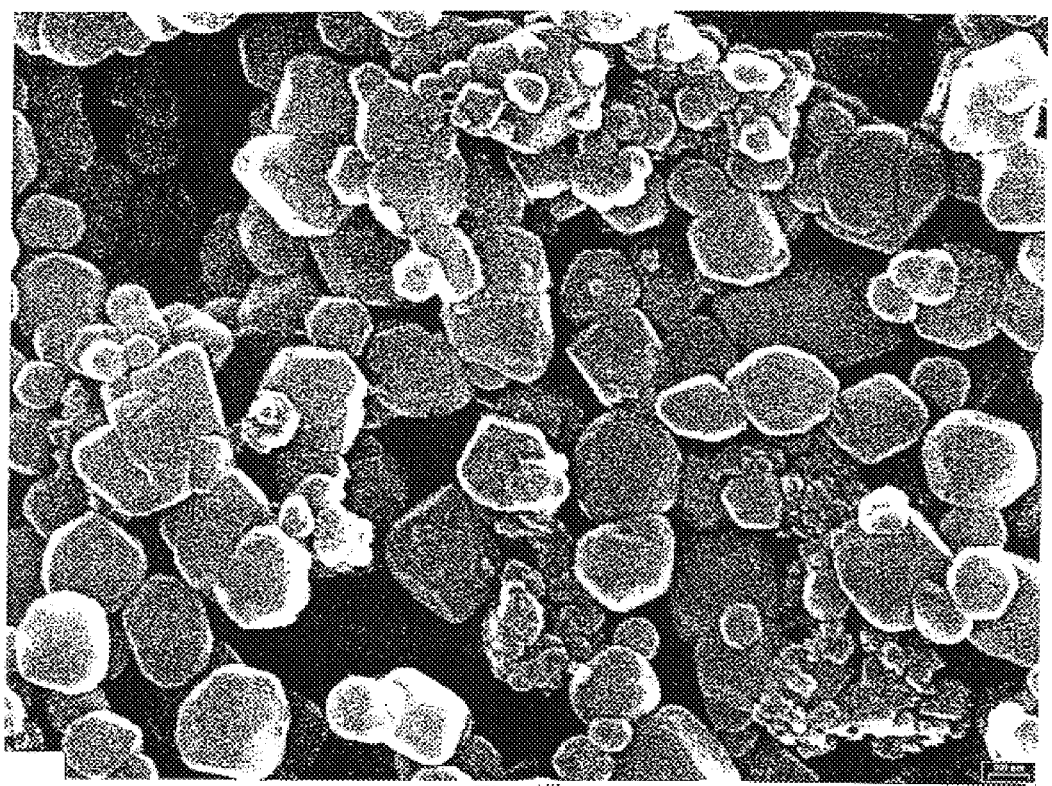
Fig. 17c  60000:1
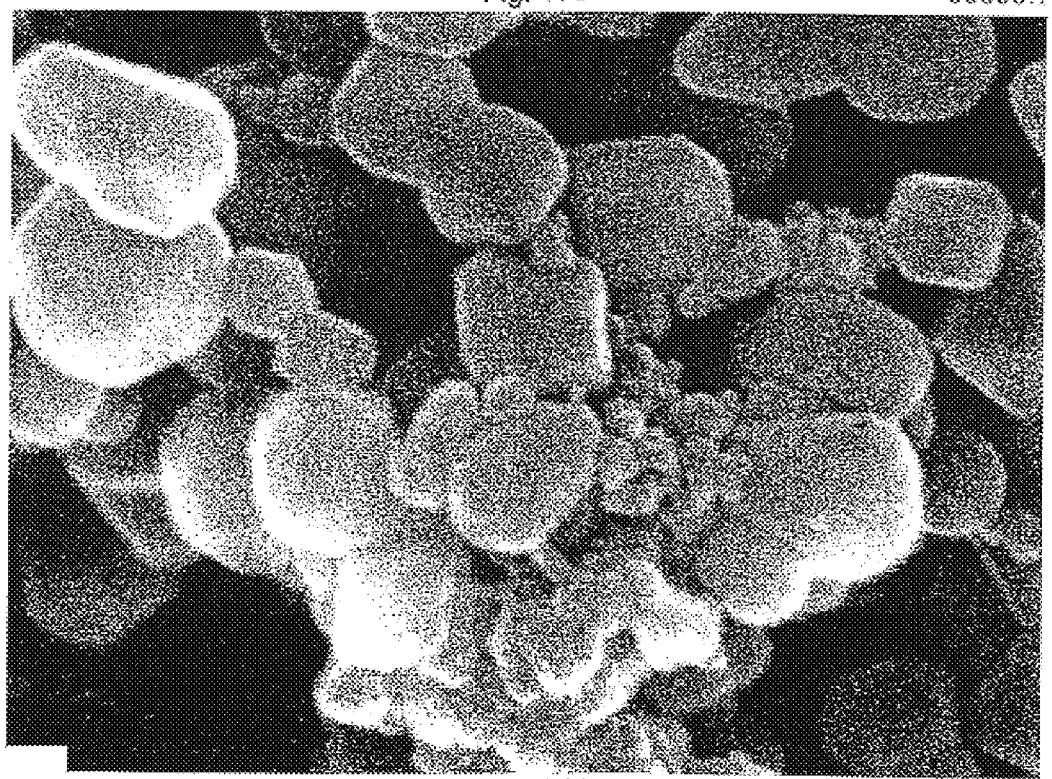
Fig. 17d  120000:1

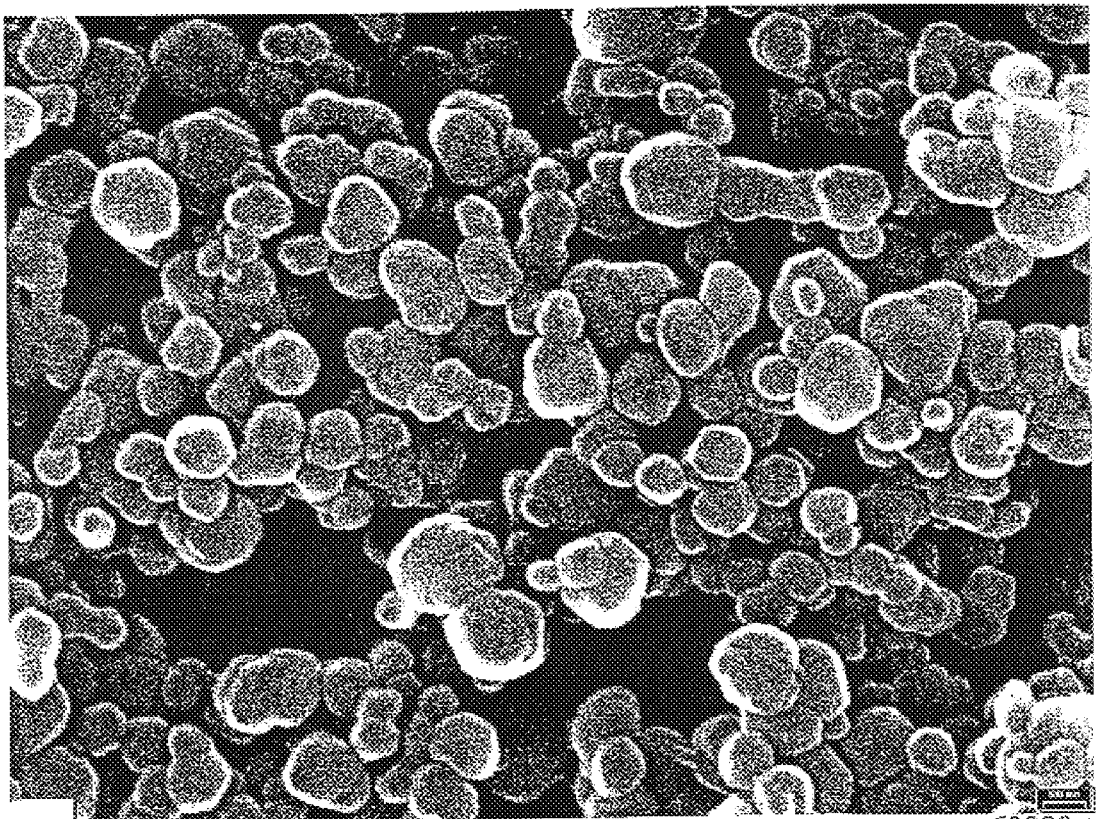
Fig. 18c     60000:1
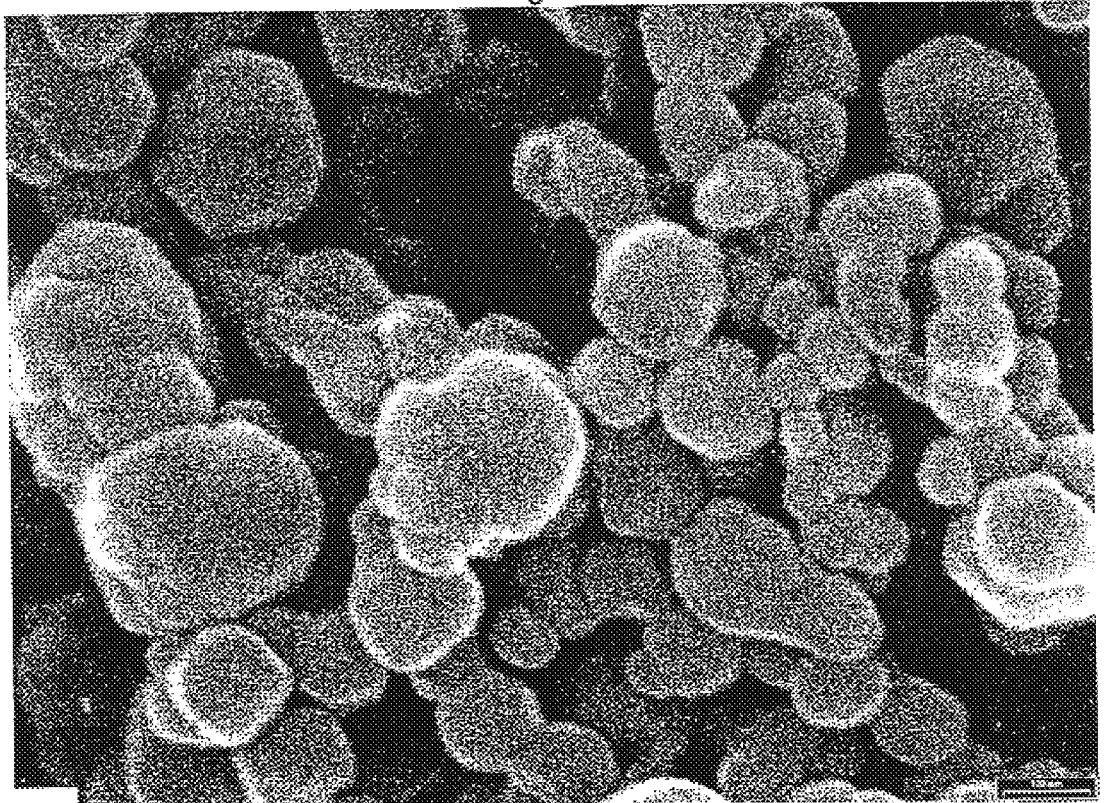
Fig. 18d     120000:1

METHOD OF PRODUCING MINERALS UNDER NEAR-CRITICAL, CRITICAL AND SUPERCRITICAL CONDITIONS

BACKGROUND OF THE INVENTION

1. Technical Field

The present invention relates to methods of producing fine crystals by reactions of metal salts, metal oxides and metal oxyhydroxides under near-critical, critical or supercritical solvent conditions, avoiding thereby many of the difficulties associated with conventional solid state or wet chemistry synthesis, and further relates to the materials so produced. More particularly, the present invention relates to the production of iron-containing mineral crystals of controlled morphology and without noxious byproducts.

2. Description of Related Art

Iron-containing mineral crystals frequently have useful and commercially valuable magnetic properties. In particular, ferrites, which are iron-containing complex oxides, have many technological applications. For example, permanent magnets, ultrahigh frequency electronic components, and magnetic recording media may be manufactured from ferrites, powders of ferrites, and fine crystals of ferrites.

Ferrites may be produced by solid state or wet chemistry synthetic routes. Solid state synthesis typically involves the mixing of dry raw materials for several days, followed by several hours of heating at temperatures in excess of 1000° C. The product is then ground to a powder of the required particle size. The grinding process may also take several days. Typically, it is not feasible to add dopants to the final mineral products when the mineral is produced by solid state synthesis. Solid state synthetic methods are discussed in detail in (for example) *The Inorganic Chemistry of Materials*, Plenum Press, New York, N.Y., 1998 and references cited therein.

Direct synthesis of ferrites in a solvent in the critical domain of temperature and pressure is an attractive alternative to solid state synthesis. The solvent "critical domain" corresponds to temperatures and pressures near the solvent critical temperature and critical pressure, which together constitute the neighborhood of the solvent critical point. The justification for developing methods of producing ferrites and other minerals under near-critical, critical and supercritical solvent conditions is based upon the unique properties of water and other solvents in the critical domain and stems from industry's need to acquire ready-made minerals efficiently and in a cost-effective manner rather than undergoing the tedious and expensive solid state production route.

In contrast to solid state synthesis methods, direct synthesis of ferrites and other minerals under near-critical, critical and supercritical solvent conditions typically involves mixing of raw material in a solvent for several minutes, followed by several hours of heating at a temperature typically less than 500° C. Dopants may be added to the product in situ. The product is typically obtained as a powder of fine crystals with a controllable particle size distribution governed in large part by the residence time in the reactor. Narrow size distributions may readily be obtained by these methods. Grinding is not typically required although may be performed if the final product justifies the additional processing step(s).

Products manufactured according to the present invention have several advantages both in processing and in the characteristics of the final products over conventionally-synthesized mineral powders. A manufacturing process utilizing a powdered mineral as the starting material (reactant) typically involves addition of binders to the powder. A "green body" is typically formed by pressing the powder into the desired shape in a die. The green body is then heated to a high temperature to calcine or sinter the powder, causing the green body further to agglomerate. The sintered body might then be machined to produce the desired final shape. Powder produced according to the direct synthesis procedures of the present invention typically has greater homogeneity than powder obtained by other means. This greater uniformity allows for a much lower sintering temperature than is typically required for a product having less uniformity as typically produced by the methods of solid state synthesis. In addition to saving energy (and cost) in the manufacturing process, lowered sintering temperatures permit the use of reactant materials and/or structures that may not survive the higher sintering temperatures required in connection with the use of conventionally obtained mineral reactants.

The direct synthesis of minerals at near-critical, critical and supercritical solvent conditions utilized in the practice of the present invention is compared with the solid state route in Table 1. A side-by-side comparison of the various processing steps clearly illustrates the advantages of near-critical, critical and supercritical synthesis in terms of faster processing times, reduced energy consumption and a greater degree of processing flexibility in the addition of dopants.

The present invention also has advantages in comparison with wet chemical synthetic methods. Typically, wet chemical methods will be a neutralization method of the general type

or an oxidation method of the general type

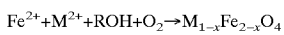

In both cases, $M^{2+}$ denotes $Mg^{2+}$, $Mn^{2+}$, $Fe^{2+}$, $Co^{2+}$, $Zn^{2+}$, $Ni^{2+}$ and similar metal ions, R is typically an organic group and x is a number between 0 and 1. The spinel ferrite particles obtained by the wet chemical neutralization method are typically ultrafine, that is less than about 0.05 micrometer. Such fine particles are difficult to use commercially, such as for commercial sintered ferrites. Some references claim that the wet chemical oxidation method yields particle sizes from 0.05 micrometer to about 1.0 micrometer but practical substantiation of these assertions has not been publicized. See "*Ferrites*: Proceedings of the International Conference, July 1970, Japan," published by University Park Press, Baltimore, London, Tokyo.

Direct synthesis of ferrites in solvents under hydrothermal conditions is discussed in U.S. Pat. Nos. 4,551,260; 4,512,906; 4,671,885; 4,789,494; 4,960,582; 5,863,512. None of these references teaches the use of supercritical solvent conditions. Moreover, the importance of pressure is not widely recognized or taught in these references.

Hayakawa et. al. (U.S. Pat. No. 4,512,906) for "Wet process for preparing ferrites of magnetoplumbite structure in fine particle form" relates to the preparation of fine particles of ferrites of magnetoplumbite structure by subjecting $Fe_2O_3$, $Fe_3O_4$, or $(FeO)_xFe_2O_3$ and at least one compound of a divalent metal selected from Ba, Sr, and Pb to hydrothermal treatment in an aqueous alkali solution at T=80° C. to 360° C. Hexagonal, plate-like crystals result. The metal salts and metal oxides used as reactants in the present invention, as described in detail below, differ from the reactants of this patent.

Hayakawa et. al. (U.S. Pat. No. 4,551,260) "Wet process of preparing fine particles of ferrite of magnetoplumbite structure" relates to the preparation of magnetoplumbite ferrites substituted with Fe, Cu, Zn, Co, Ni, Mn and Mg. All the ferrites contain Sn, using different reagents and producing different products from the present invention.

Gaud et. al. (U.S. Pat. No. 4,671,885) for "Process for the preparation of magnetized hexagonal ferrites, use of these ferrites as base materials for magnets or for magnetic recording" relates to the preparation of magnetic hexagonal ferrites with the iron optionally substituted hydrothermally at P<500 atm, T>100° C. by reacting one alkali metal ferrite and a compound which releases an alkaline-earth metal ion in water and optionally one or more alkali metal salts of metal oxides. The present invention does not require alkali metal ferrites as reagents.

Aoki et. al. (U.S. Pat. No. 4,789,494) for "Hydrothermal process for producing magnetoplumbitic ferrite" relates to a hydrothermal process for producing magnetoplumbitic ferrite powder in water at 100° C.<T<400° C. and in the presence of an alkali.

Ado et. al. (U.S. Pat. No. 4,960,582) for "Process for producing microcrystalline Co/Ti-substituted barium ferrite platelets" relates to a hydrothermal process to provide precursors of spinel structure nickel ferrite-modified, Co/Ti-substituted barium ferrites, followed by calcining to produce the ferrites. Calcining is not required to produce the reaction products of the present invention.

Iwasaki et. al. (U.S. Pat. No. 5,863,512) for "Process for preparing layered rock salt type lithium ferrite by mixed alkali hydrothermal method" relates to a hydrothermal process for preparing $LiFeO_2$ with a rock salt type structure from iron salts, iron hydroxides, iron oxide hydroxides (FeOOH), or iron in an aqueous solution containing LiOH and NaOH or KOH.

SUMMARY OF THE INVENTION

The present invention relates to methods of producing fine crystals by reactions of metal salts and metal oxyhydroxides under near-critical, critical or supercritical solvent conditions, avoiding thereby many of the difficulties associated with conventional solid state or wet chemistry synthesis, and further relates to the materials so produced. The metal in the reactants is typically in either a divalent or a trivalent state. The synthetic crystals (typically mineral crystals) may be formed by the methods of the present invention in numerous crystal structures including but not limited to: ferrite and non-ferrite spinel, hexagonal and garnet-like crystal structures. The crystals produced by the present invention also have morphologies, based upon the fourteen (14) lattice types in three (3) dimensions (for example, see Handbook of Chemistry and Physics, 80th Edition, 1999–2000, p. 12-9), such morphologies have favorable properties for compaction into green bodies for subsequent sintering into near-net-shapes, approaching maximum theoretical densities.

Reactants and reaction conditions are described that yield various crystal products (typically mineral) including but not limited to trevorite and zinc substituted trevorite having the general stoichiometry $Ni_xZn_yFe_2O_4$ in which x and y are fractions between zero (0) and one (1) that sum to approximately one (1). Examples include x=0.95, y=0.05 and x=0.6, y0.4. A reactant especially useful in the practice of the present invention is a mineral form of FeOOH commonly referred to as goethite. The resulting (typically mineral) products have surface area to mass ratios that can be adjusted by varying the reaction conditions. Preferable surface area to mass ratios of around 9 to 10 square meters per gram are obtained. The methods of the present invention typically produce fine crystals which can be distinguished from naturally occurring crystals and from crystals produced via solid state synthetic routes or by wet chemistry synthesis (typically neutralization or oxidation methods). Salient features distinguishing the crystals of the present invention from crystals produced by solid state or wet chemical routes include, but are not limited to, morphology, size distribution, surface-to-mass ratio, magnetic properties, range of applications, and low cost.

The present invention permits dopants to be added to the reactants for incorporation into the (typically mineral) products. Adjustable surface area to mass ratios of the final products without grinding are another advantage of the present invention. Energy savings and lower costs are the typical result when crystals are produced according to the present invention, in comparison with other ways to obtain the crystals (in particular, the solid state synthetic route).

BRIEF DESCRIPTION OF THE DRAWINGS

FIG. 1 depicts a typical thermodynamic phase diagram for a single pure component.

FIGS. 5a–5e are Scanning Electron Micrographs characterizing the morphology of fine mineral crystals produced by the methods of the present invention under conditions given in Example 1, and Run A of Tables 3 and 4. FIGS. 5a–5e depict the following magnifications respectively:

5a) 15000:1
5b) 30000:1
5c) 60000:1
5d) 120000:1
5e) 120000:1

FIGS. 6a–6d are Scanning Electron Micrographs characterizing the morphology of fine mineral crystals produced by the methods of the present invention under conditions given in Example 2, and Run B of Tables 3 and 4. FIGS. 6a–6d depict the following magnifications respectively:

6a) 15000:1
6b) 30000:1
6c) 60000:1
6d) 120000:1

FIGS. 7a–7d are Scanning Electron Micrographs characterizing the morphology of fine mineral crystals produced by the methods of the present invention under conditions given in Example 3, and Run C of Tables 3 and 4. FIGS. 7a–7d depict the following magnifications respectively:

7a) 15000:1
7b) 30000:1
7c) 60000:1
7d) 120000:1

FIGS. 8a–8e are Scanning Electron Micrographs characterizing the morphology of fine mineral crystals produced by the methods of the present invention under conditions given in Example 4, and Run D of Tables 3 and 4. FIGS. 8a–8e depict the following magnifications respectively:

8a) 7500:1
8b) 15000:1
8c) 30000:1
8d) 60000:1
8e) 120000:1

Figure 9C:
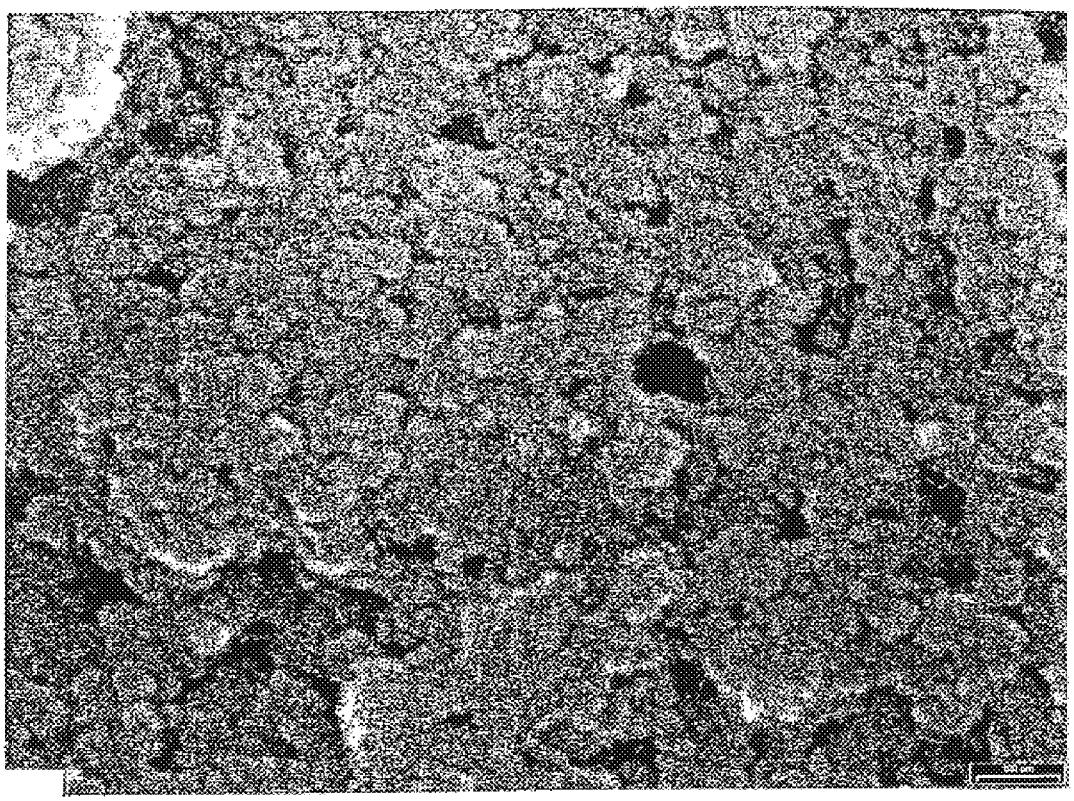

FIGS. 9a–9c are Scanning Electron Micrographs characterizing the morphology of fine mineral crystals produced by the methods of the present invention under conditions given in Example 5, and Run E of Tables 3 and 4. FIGS. 9a–9c depict the following magnifications respectively:

9a) 30000:1
9b) 60000:1
9c) 120000:1

FIGS. 10a–10d are Scanning Electron Micrographs characterizing the morphology of fine mineral crystals produced by the methods of the present invention under conditions given in Example 6, and Run F of Tables 3 and 4. FIGS. 10a–10d depict the following magnifications respectively:

10a) 15000:1
10b) 30000:1
10c) 60000:1
10d) 120000:1

Figure 11A:
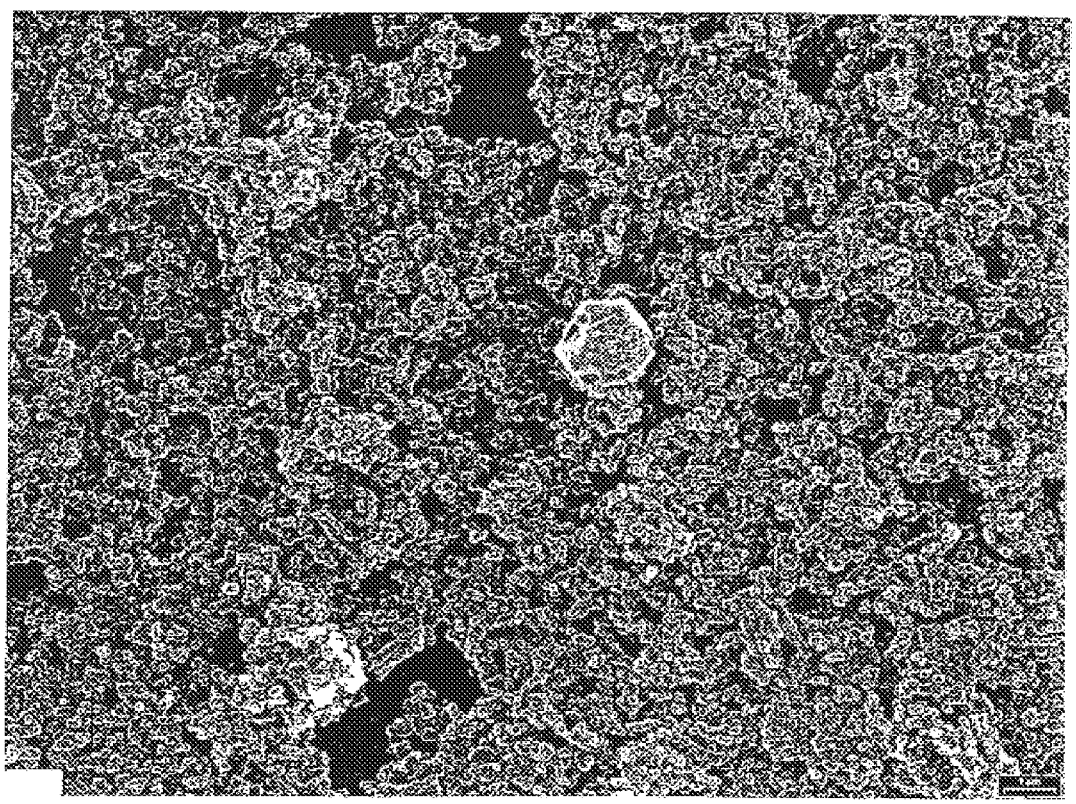
Figure 11D:
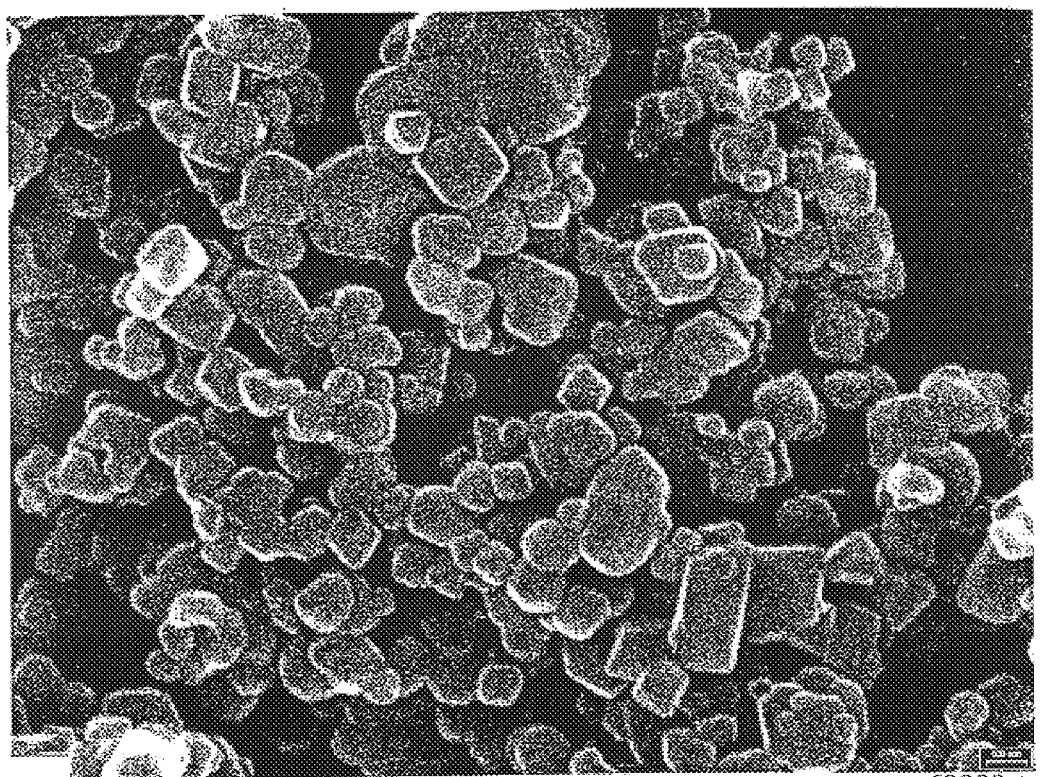
Figure 11E:
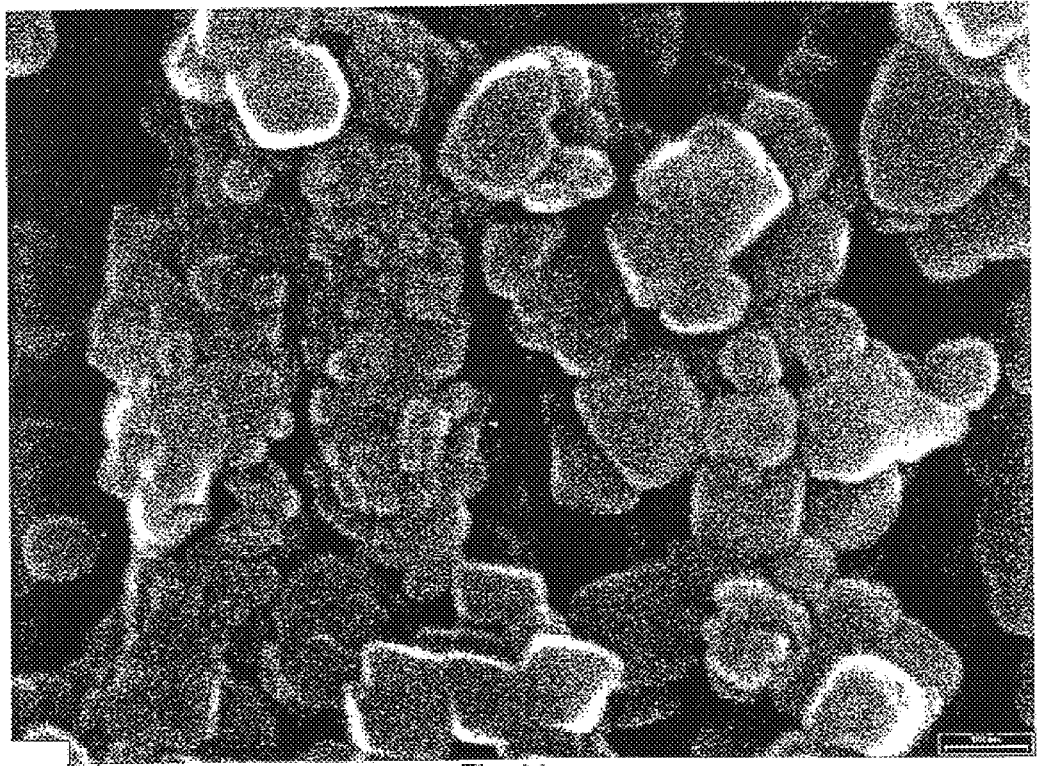

FIGS. 11a–11e are Scanning Electron Micrographs characterizing the morphology of fine mineral crystals produced by the methods of the present invention under conditions given in Example 7, and Run G of Tables 3 and 4. FIGS. 11a–11c depict the following magnifications respectively:

11a) 7500:1
11b) 15000:1
11c) 30000:1
11d) 60000:1
11e) 12000:1

Figure 12A:
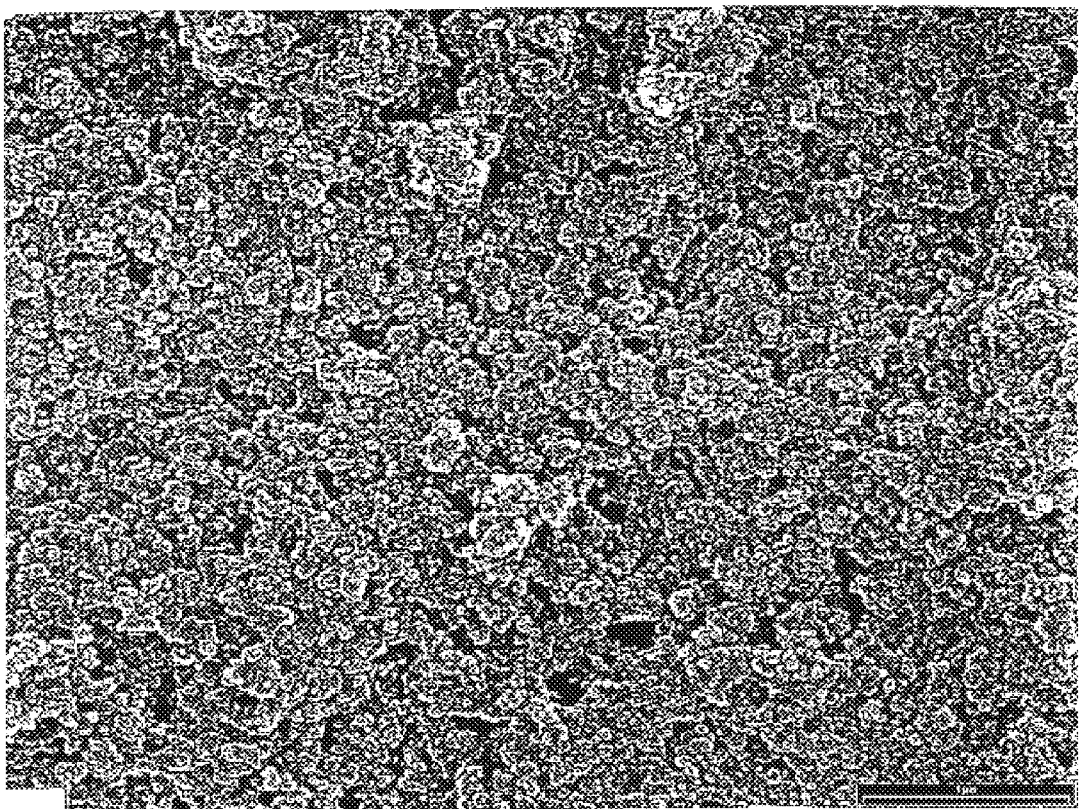
Figure 12B:
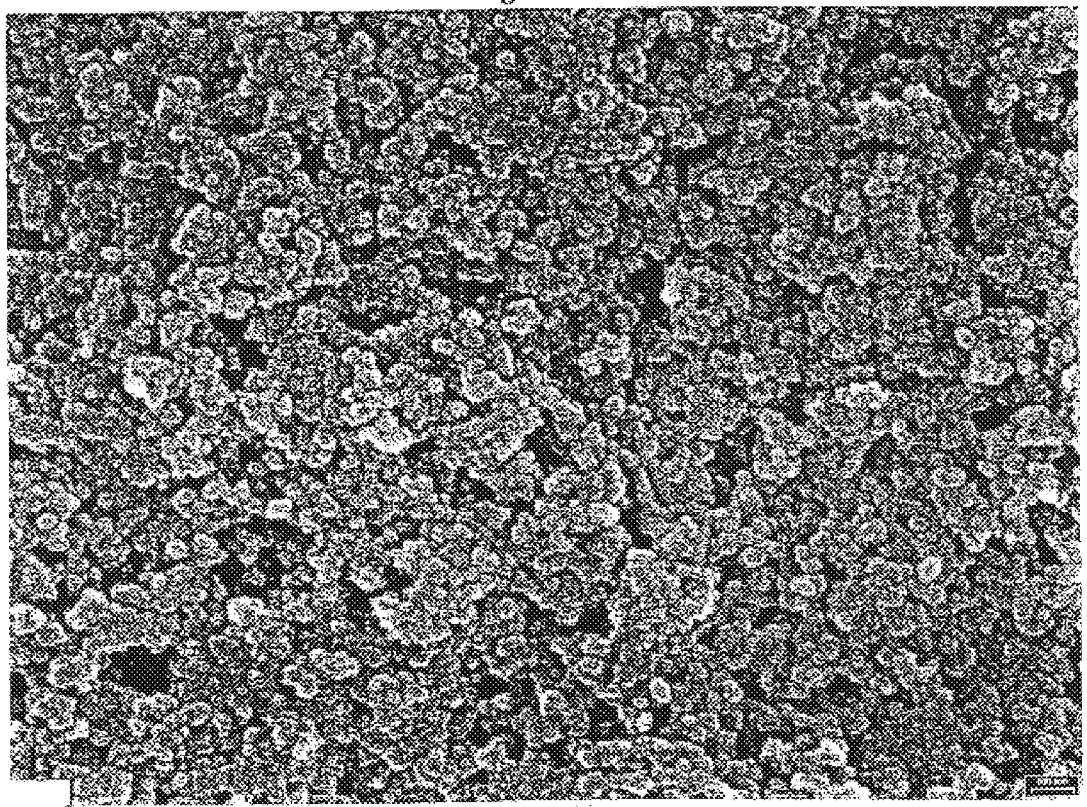
Figure 12C:
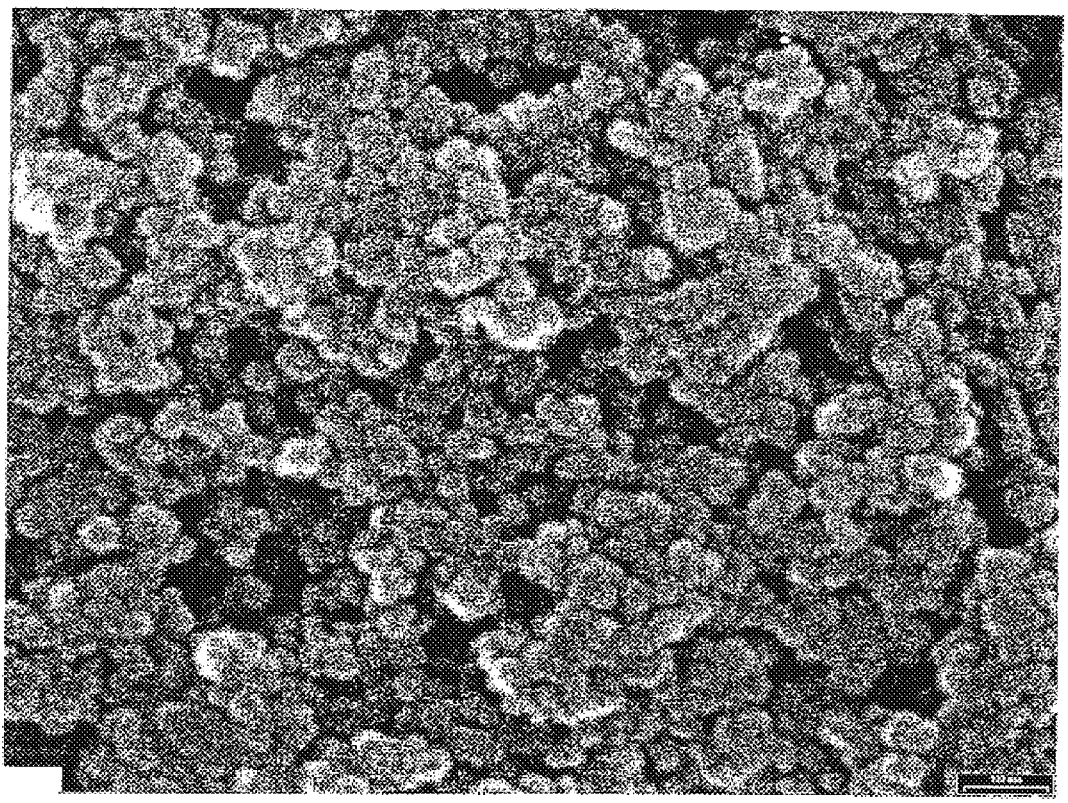
Figure 14A:
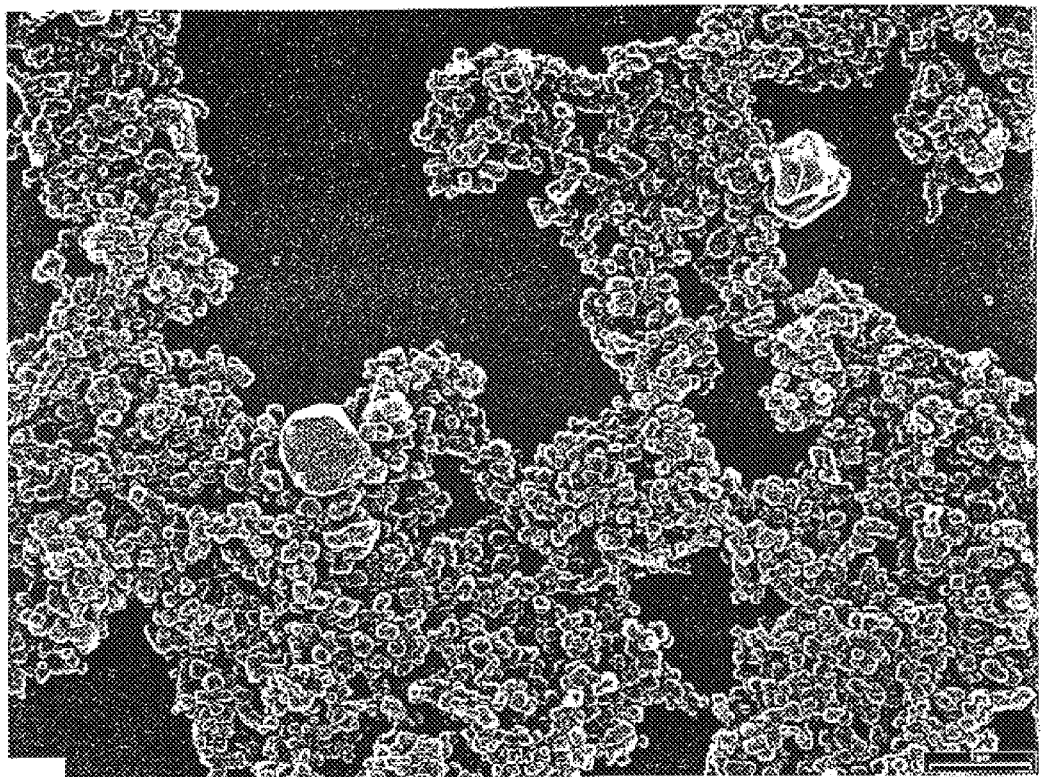
Figure 14B:
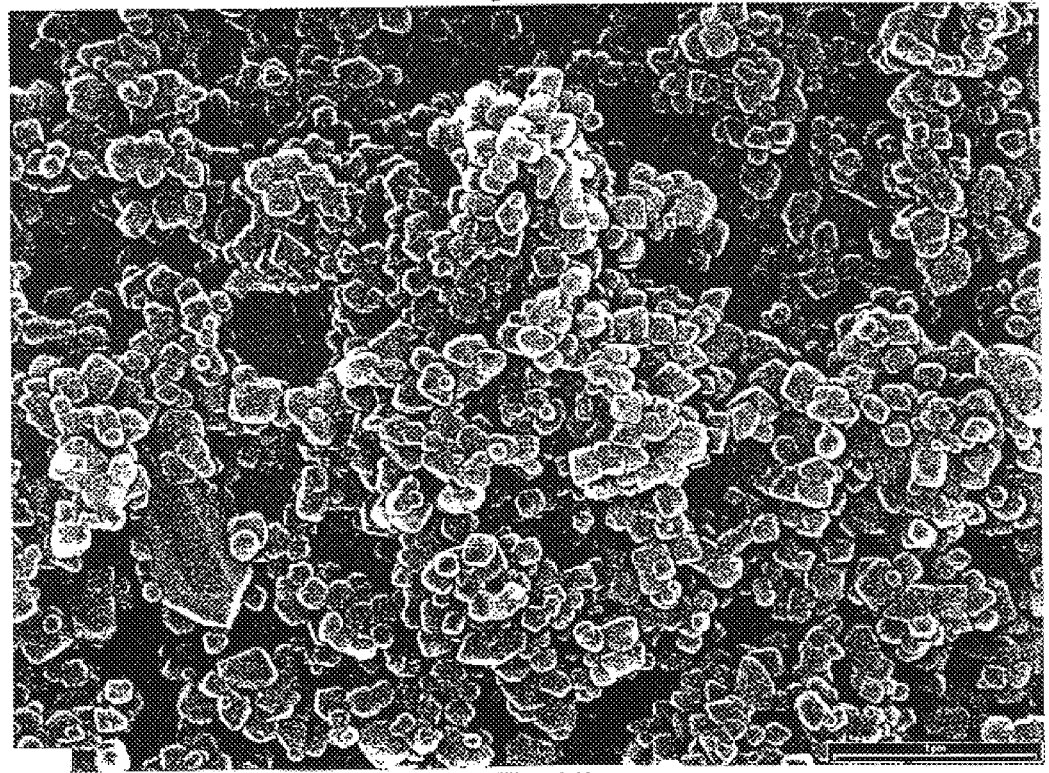
Figure 17A:
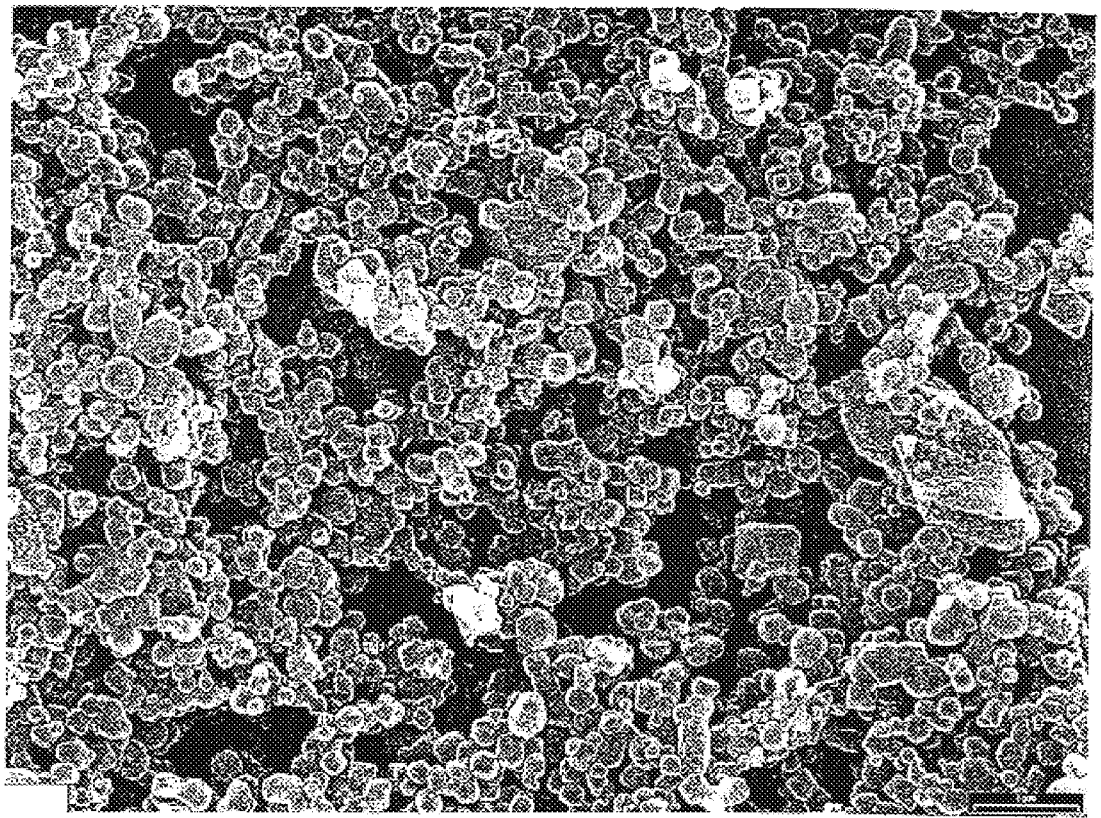
Figure 17B:
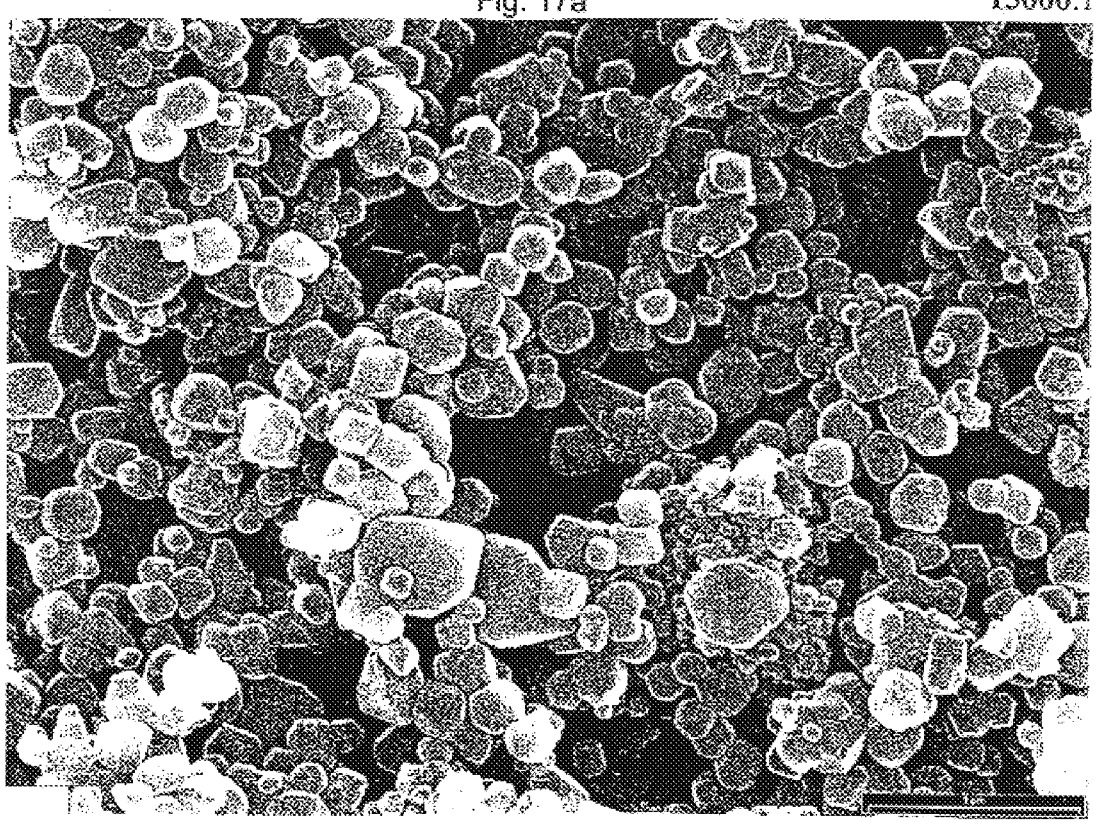
Figure 18A:
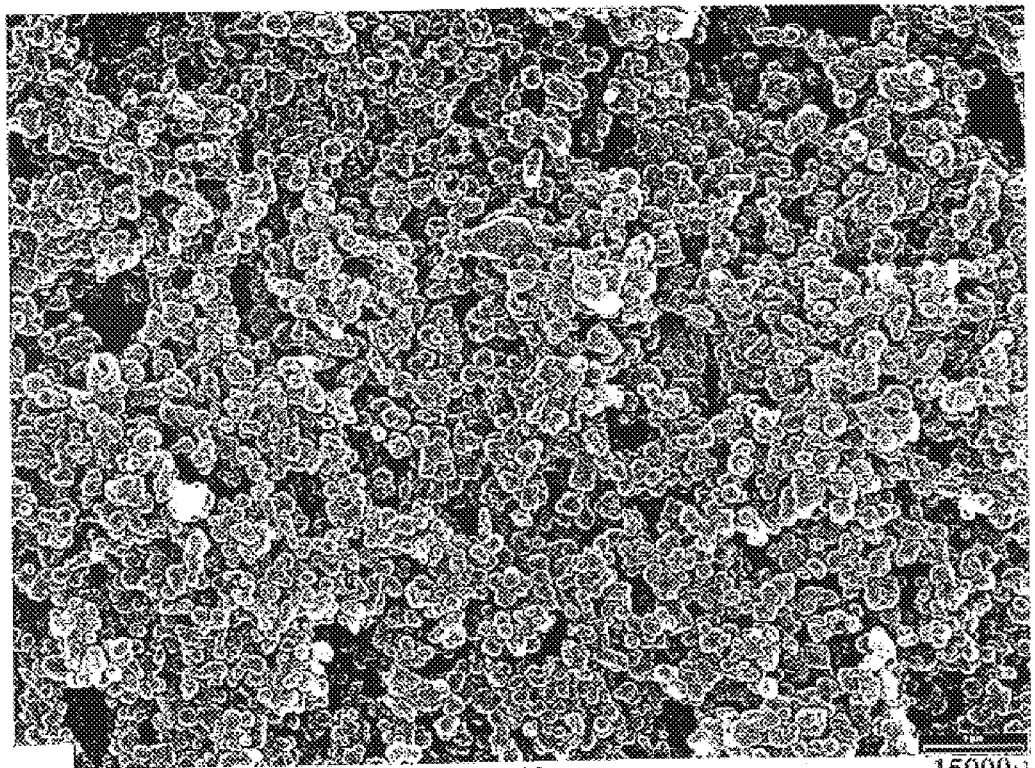
Figure 18B:
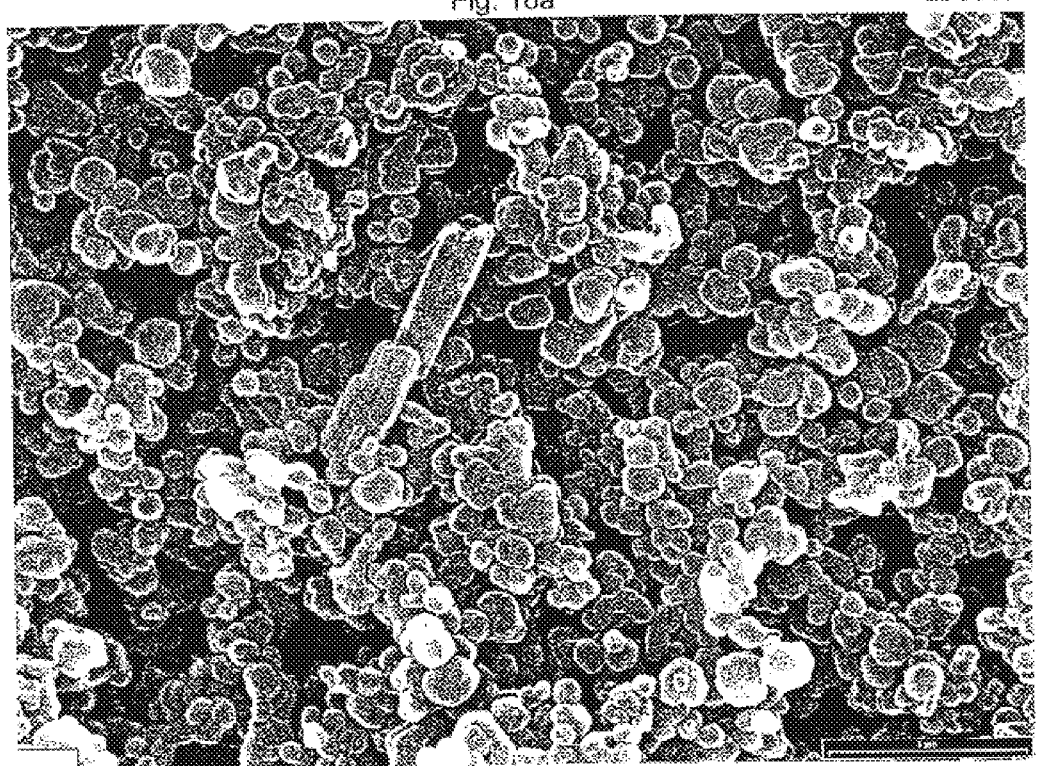

FIGS. 12a–12c are Scanning Electron Micrographs characterizing the morphology of fine mineral crystals produced by the methods of the present invention under conditions given in Example 8, and Run K of Tables 3 and 4. FIGS. 12a–12c depict the following magnifications respectively:

12a) 30000:1
12b) 60000:1
12c) 120000:1

FIGS. 13a–13d are Scanning Electron Micrographs characterizing the morphology of fine mineral crystals produced by the methods of the present invention under conditions given in Example 9, and Run L of Tables 3 and 4. FIGS. 13a–13d depict the following magnifications respectively:

13a) 15000:1
13b) 30000:1
13c) 60000:1
13d) 120000:1

FIGS. 14a–14d are Scanning Electron Micrographs characterizing the morphology of fine mineral crystals produced by the methods of the present invention under conditions given in Example 10, and Run M of Tables 3 and 4. FIGS. 14a–14d depict the following magnifications respectively:

14a) 15000:1
14b) 30000:1
14c) 60000:1
14d) 120000:1

FIGS. 15a–15d are Scanning Electron Micrographs characterizing the morphology of fine mineral crystals produced by the methods of the present invention under conditions given in Example 11, and Run H of Tables 3 and 4. FIGS. 15a–15d depict the following magnifications respectively:

15a) 15000:1
15b) 30000:1
15c) 60000:1
15d) 120000:1

FIGS. 16a–16d are Scanning Electron Micrographs characterizing the morphology of fine mineral crystals produced by the methods of the present invention under conditions given in Example 12, and Run I of Tables 3 and 4. FIGS. 16a–16d depict the following magnifications respectively:

16a) 15000:1
16b) 30000:1
16c) 60000:1
16d) 120000:1

FIGS. 17a–17d are Scanning Electron Micrographs characterizing the morphology of fine mineral crystals produced by the methods of the present invention under conditions given in Example 13, and Run J of Tables 3 and 4. FIGS. 17a–17d depict the following magnifications respectively:

17a) 15000:1
17b) 30000:1
17c) 60000:1
17d) 120000:1

FIGS. 18a–18d are Scanning Electron Micrographs characterizing the morphology of fine mineral crystals produced by the methods of the present invention under conditions given in Example 14, and Run N of Tables 3 and 4. FIGS. 18a–18d depict the following magnifications respectively:

18a) 15000:1
18b) 30000:1
18c) 60000:1
18d) 120000:1

DETAILED DESCRIPTION OF THE INVENTION

The present invention relates to methods for producing fine mineral crystals by reacting metal salts and metal oxides and to the materials produced thereby. One reactant especially useful in the practice of the present invention is a mineral form of FeOOH commonly referred to as goethite. The mineral crystals are produced under near-critical, critical, and supercritical solvent conditions. "Fine mineral crystals" denotes herein mineral crystals typically having a size in the range of tens of nanometers to hundreds of nanometers. The methods of the present invention typically produce fine mineral crystals which can be distinguished from naturally occurring minerals and from minerals produced via solid state synthetic routes by their morphology, size distribution, surface-to-mass ratio, magnetic properties, range of applications, and low cost.

In the present invention, minerals are produced by reactions at near-critical, critical, and supercritical solvent conditions. FIG. 1 depicts a typical thermodynamic phase diagram for a single pure component, and illustrates boundaries in which solid (S), liquid (L), gaseous (G), and supercritical (SF) conditions occur. The label "cp" denotes the critical point in the phase diagram, which is defined by a critical temperature and a critical pressure. For example, for water the critical point occurs at a critical temperature of 647° K (374° C.) and a critical pressure of 22.1 MPa (218 atm). The critical temperatures and pressures for several other solvents found to be useful in the practice of the present invention are listed in Table 2. Near-critical, critical, and supercritical solvent conditions refer to the regions of the solvent phase diagram in the vicinity of the solvent critical point, at the critical point, and at both higher temperature and higher pressure than the critical point. As the temperature and pressure of a fluid approach their critical values, the densities of the liquid and gas phases of the fluid converge to a single value. At the critical point, and in the supercritical region, the gas and liquid phases of the fluid are indistinguishable (not separated by a meniscus) and the fluid exists in a single phase.

For economy of language we refer to the "critical domain" as conditions of temperature and pressure not too distant from the critical point for the solvent being used. That is, in the critical domain either or both temperature and pressure may be subcritical, critical or supercritical, corresponding to a two-dimensional region in the neighborhood of point cp in FIG. 1. "Critical domain conditions" or "critical domain solvent conditions" refer to reactions performed in the critical domain of the particular solvent being used, most commonly water.

Critical domain conditions are advantageous for the synthesis of minerals for several reasons. Among these is the property that the solubility of many materials in solvents under critical domain conditions is enhanced in comparison with typical solubilities. In water, for example, both polar and nonpolar chemical compounds are typically soluble under critical domain conditions while non-polar solubilities in water are typically rather small away from such conditions of temperature and pressure. Some otherwise insoluble oxides dissolve in water under critical domain conditions. It is thought by some that geological mineral formation may occur under conditions approximating the critical domain.

The discussion of critical domains in connection with the present invention is not limited to the example of a single component as depicted for purposes of illustration in FIG. 1. Multicomponent solvents exhibit more complex phase diagrams than that depicted in FIG. 1, having the possibility of various azeotropes, complexes or chemical reaction products in addition to the separate pure substances in mutually soluble, partially soluble and insoluble proportions. The methods of the present invention are not limited to single component solvents. Multicomponent solvents may have conditions of (typically elevated) temperatures and pressures leading to increased solubility of the mineral reactants. Such conditions of temperature and pressure may occur in regions in which the densities of multicomponent liquid and gas phases become the same, the analogue of the critical point in a single component solvent. To be definite in our discussion, we will describe the critical domain solvent conditions and present examples primarily in connection with single component solvent, typically water. However, generalization to other solvents and mixtures of solvents are straight forward extensions of the techniques described herein. Examples of multicomponent solvents are given in Table 3, Runs C, D, E, K and L.

Reactants (Precursors)

In a typical embodiment of the present invention, a suspension of one or more metal salts and metal oxides in one or more solvents reacts in a thermal reactor under critical domain solvent conditions to produce fine mineral crystals. In an example of the present invention, the metal oxide precursor is typically the mineral goethite. Goethite has chemical formula FeOOH, which is also known as iron oxyhydroxide, and is available commercially in bulk from Bayer Incorporated as Bayferrox 920Z®.

Examples of the metal salts used as reaction constituents (precursors) in the present invention include but are not limited to salts of the following metals: Fe, Mn, Ba, Mg, Ca, Sr, Co, Cd, Pb, and Ni. Examples of the metal salt anions used as reaction constituents in the present invention include but are not limited to the following: nitrates and sulfates as well as metal-organic acid salts such as acetates, citrates, formates, oxalates, carboxylates and other organic acid salts. In the preferred embodiment of the present invention, the reaction constituents are typically metal acetates and goethite with water as a solvent. However, the acetates are inexpensive commodity chemicals while such other metal-organic acid salts are typically expensive specialty chemicals. In an alternative embodiment of this invention, metal nitrates are used as reaction constituents with water as a solvent. Under critical domain reaction conditions the nitrate groups are degraded to and noxious by-products such as NO are released. The production of noxious by-products is a disadvantage in practice.

The choice of reactants and their absolute and relative initial quantities may be varied to control the stoichiometry, composition and crystal structure of the fine mineral crystal products. The stoichiometry of the products is determined by thermodynamics. In addition, the stoichiometry to produce $Ni_xZn_yFe_2O_4$, requires that the initial quantities of reactants be chosen to provide x moles of nickel and y moles of zinc for every two moles of iron. The choice of the anion or anions for a given metal cation may be varied by choice of metal salt to control the growth rate of the fine mineral crystals. The crystal growth rate is typically faster when the metal salts are acetates than when the metal salts are the analogous citrates or nitrates.

The pH of the suspension is one parameter by which the process may be controlled. It is observed that reducing the pH tends in many cases to increase the rate of crystal growth of the products. It is typical in the practice of the present invention that the pH be adjusted to be in the range from about 3.2 to about 4.5. Although this pH range is believed to be preferable in the practice of the present invention, other pH ranges may be determined by straight forward experimental determination as the need arises.

The present invention has been used to produce various minerals including but not limited to zinc doped trevorites. The mineral trevorite has chemical formula $NiFe_2O_4$. Zinc doped trevorites have a trevorite crystal structure and general chemical formula $Ni_xZn_yFe_2O_4$ where x and y indicate the relative proportion of nickel and zinc in the product mineral. That is, 0<x,y<1 and x+y=1. Examples include the following:

Nickel Acetate+Zinc Acetate+Goethite in water→$Ni_xZn_yFe_2O_4$
(trevorite structure)

Nickel Acetate+Zinc Acetate+Fe(III)Citrate in water→$Ni_xZn_yFe_2O_4$
(trevorite structure)

Nickel Acetate+Zinc Acetate+Fe(III)Nitrate in water→$Ni_xZn_yFe_2O_4$
(trevorite Structure)

Nickel Nitrate+Zinc Nitrate+Fe(III)Nitrate in water→$Ni_xZn_yFe_2O_4$
(trevorite structure)

Nickel Sulfate+Zinc Sulfate+Fe(II)Sulfate in water→$Ni_xZn_yFe_2O_4$
(trevorite Structure)

Examples of reactions conducted by the methods of the invention include but are not limited to those described in Table 3 and Table 4. Precursors, reaction conditions, and products for 14 example reaction runs, labeled run A through run N, are summarized in Table 3 and Table 4.

Typical Reaction Protocols

Figure 2:
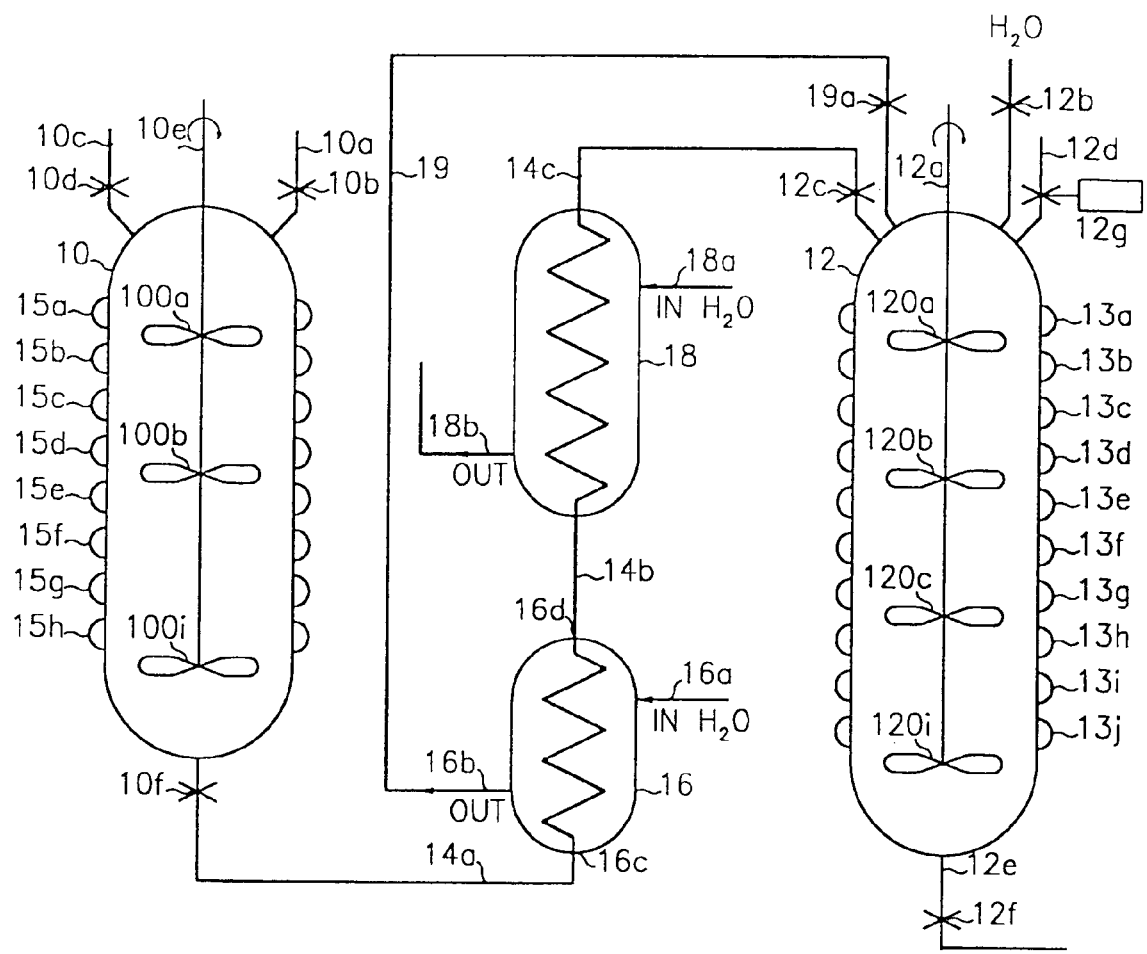
FIG. 2 is a schematic depiction of a thermal reactor used in the present invention (not to scale).

The suspension of metal salts and metal oxides is loaded, for example, into the autoclave of a thermal reactor capable of achieving near-critical, critical, and supercritical conditions. FIG. 2 depicts an example of such a thermal reactor capable of reaching near-critical, critical, and supercritical solvent conditions used in the preferred embodiment of the present invention. This thermal reactor is described in U.S. patent application Ser. No. 09/337,483 and is an example of one apparatus in which the present reactions are conveniently performed. The present invention, however, is not limited to a particular apparatus.

In FIG. 2, autoclave 10 has a pressure outlet port 10a controlled by pressure release valve 10b and an inlet port 11c controlled by valve 10d, both valves being of a type well known in the art. An agitator 10e typically has a plurality of paddles 100a, 100b to 100i where i is an integer equal to the maximum number of paddles used with agitator 10e. The blades on the paddles are preferably of the Interprop® type supplied by Ekato Corporation of Germany. The Interprop® mixing blades typically achieve a large heat transfer from the wall of autoclave 10 into the suspension at a low energy consumption. In FIG. 2, three paddles are shown on agitator 10e; however, a different number of paddles can be used if desired based upon experimental results. Agitator 10e is, in accordance with one embodiment of this invention, a variable speed agitator with a speed which varies from approximately 30 rpm to approximately 240 rpm. Of course, these speeds can also be changed if desired to achieve appropriate results depending upon the reaction product desired.

Autoclave 10 is typically heated by the use of a thermal oil of well known constituents. The thermal oil is first heated in a thermal oil boiler (not shown) and is then pumped through hollow typically semicircular coils wound in a plurality of banks on the outer surface of autoclave 10. FIG. 2 shows eight cross-sections 15a through 15h of one bank of such semicircular coils. Typically, four banks of coils are used, and one bank contains eight (8) spirals of heating coils which pass the thermal oil in one direction. The adjacent bank also contains eight (8) spirals of heating coils but passes thermal oil in the other direction. The use of the plurality of banks of coils minimizes the temperature drop of the heating oil in any one bank to ensure that the surface of autoclave 10 is fairly uniformly heated in the steady state. In one embodiment, the temperature drop of the heating oil from the inlet to the outlet of the bank is typically kept to less than twenty degrees Celsius. This small temperature drop coupled with the use of the agitators allows the temperature of the reaction product in autoclave 10 to be kept substantially uniform within about ±5° C.

As the suspension in the autoclave is heated to a desired temperature near the critical temperature of the solvent, the pressure in the autoclave rises to a value near the critical pressure of the solvent determined by the temperature, the volume of the reactor, and the initial composition of the suspension. The temperature and pressure are important process parameters. The synthesis of $Ni_{0.95}Zn_{0.05}Fe_2O_4$ (zinc doped trevorite) from goethite and metal acetate precursors, for example, is not found to occur below about 340° C. The temperature of the suspension is typically about 200° C. to about 500° C. The pressure in the reactor is typically about 1 MPa to about 30 MPa.

Agitator 10e within autoclave 10 is controlled to mix the reaction product within autoclave 10 to ensure substantially uniform temperature throughout the reaction product. As a result, the crystal growth of the reaction product within autoclave 10 is also controlled to be substantially uniform.

The suspension is maintained at a desired temperature, or at a series of desired temperatures, for the desired residence time or times. Choice of residence time determines the size of the fine mineral crystals produced for particular reaction constituents and reaction conditions. Residence times are typically about 1 to about 48 hours, but may be either longer or shorter than this range. After the desired residence time or times, the suspension may be transferred from the autoclave 10 to receiving vessel 12.

Autoclave 10 in FIG. 2 includes an outlet valve 10f connected to an outlet line or pipe 14 (composed of sections 14a, 14b, and 14c). Outlet line 14 passes the reaction product from autoclave 10 through two heat exchangers 16 and 18. Heat exchanger 16 contains an inlet 16a and an outlet 16b for the passage of a fluid, such as water, into a secondary portion of heat exchanger 16 to withdraw heat from the reaction product flowing through line 14a. In the preferred embodiment, heat exchanger 16 is used to generate steam, as explained elsewhere herein, and will hereinafter be referred to as steam generator 16. The reaction product flowing through line 14a passes into steam generator 16 at inlet 16c and out from steam generator 16 through outlet 16d.

Figure 3:
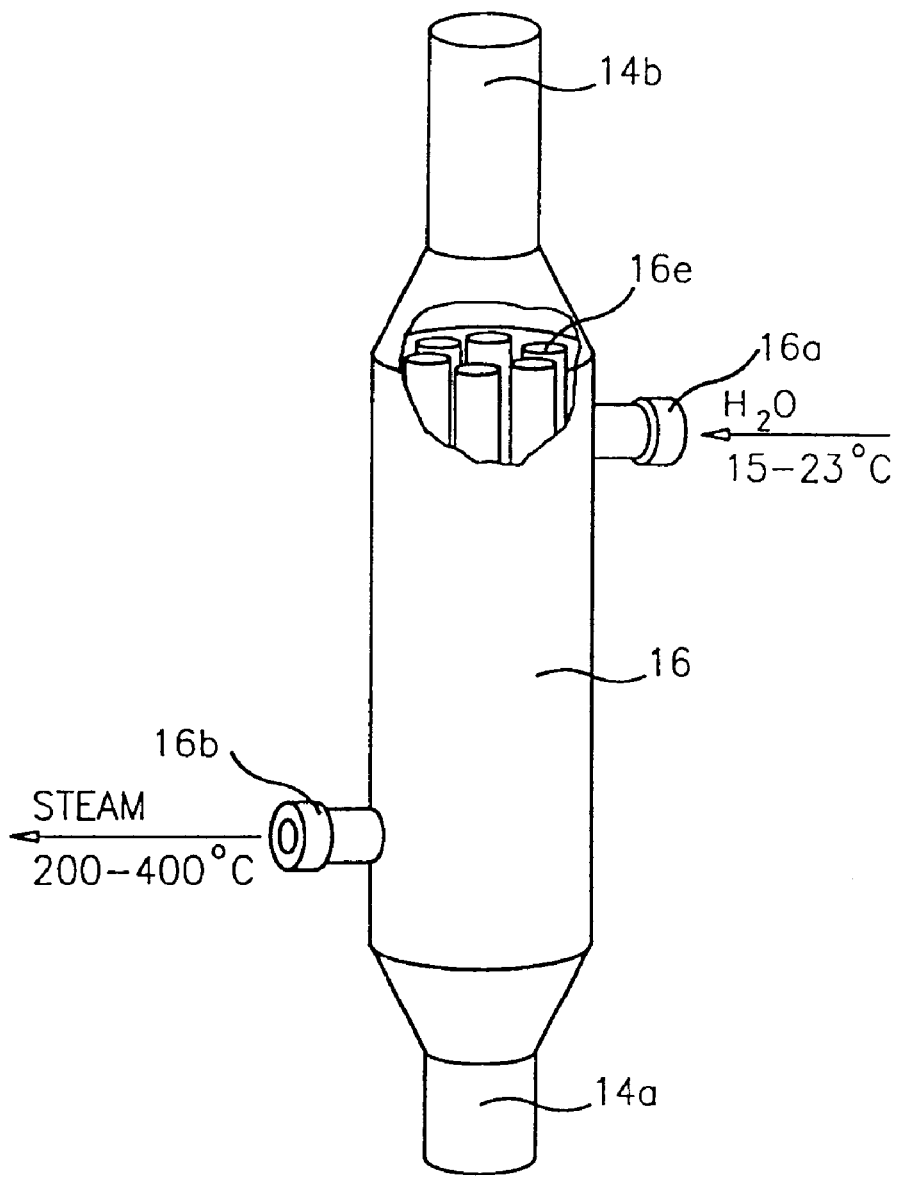
FIG. 3 is a schematic depiction of a heat exchanger as used to generate steam in the present invention (not to scale).

FIG. 3 illustrates one embodiment of steam generator 16. Steam generator 16 cools the reaction product flowing into the primary portion of steam generator 16 such that the reaction product exiting from steam generator 16 is, for example, 50° C. cooler than the reaction product entering steam generator 16. To cool the reaction product as it flows through steam generator 16, a low temperature liquid, such as water, at a temperature of, for example, 15° C. enters into a top portion of steam generator 16 via inlet 16a. This cool water entering steam generator 16 flows around a plurality of internal pipes or tubes 16e formed of, for example, stainless steel, through which the reaction product flows.

Steam generator 16 is designed so that the cool water entering inlet 16a accepts enough heat from the reaction product to exit as steam having a temperature of, for example, 200° C.–400° C. via outlet 16b.

To maintain a laminar flow through lines 14a and 14b, the cross-sectional areas of lines 14a and 14b should be approximately the same as the sum of the cross-sectional areas of tubes 16e so that steam generator 16 will not present a flow resistance to the reaction products. Of course, consideration must also be given to other factors, well known to those skilled in the art, such as friction between the reaction product and tubes 16e, to maintain a laminar flow.

The steam exiting from outlet 16b is typically supplied to a receiving vessel 12 so as to make use of the energy in the steam and to control the pressure in receiving vessel 12.

Preferably, steam generator 16 uses a counter-flow of cooling fluid, whereby the cool fluid enters near the cooled reaction product exit portion 16d of steam generator 16, and the steam exits near the hotter reaction product entrance portion 16c of steam generator 16 so as to minimize mechanical stresses within steam generator 16 due to temperature differences.

From outlet 16d of steam generator 16, the reaction products flow through pipe 14b and into a second heat exchanger 18 (FIG. 3). Heat exchanger 18 includes a coolant inlet 18a and a hot water outlet 18b. This second heat-exchanger 18 is similar in its general construction to steam generator 16 of FIG. 2.

The cooled slurry exiting heat exchanger 18 flows into line 14c. Line 14c is connected to receiving vessel 12 via valve 12c. Vessel 12, like autoclave 10, contains an agitator 12a containing a plurality of paddles 120a, 120b . . . through 120$i$, where i is an integer representing the number of paddles on agitator 12$a$. The blades of paddles 120 are also preferably the Interprop® type from Ekato Corporation of Germany. One embodiment of this invention uses four such paddles 120 although, again, the number of paddles used can be determined empirically depending upon the quality desired for the resulting product.

Vessel 12 is heated by thermal oil with FIG. 2 showing ten cross-sections 13$a$ through 13$j$ of the semicircular coils through which the thermal oil is pumped. In one embodiment, this thermal oil is pumped at a rate substantially higher than for the autoclave 10. The walls of vessel 12 are sized to have a relatively large latent heat capacity to prevent vessel 12 from cooling down too quickly.

Vessel 12 has an outlet 12$e$ with a valve 12$f$ for controlling the removal of material from vessel 12. In addition, a standard valve 12$d$ is provided to relieve the remainder of the pressure in vessel 12 after the total discharge of vessel 12 has taken place. Valve 12$d$ may be controlled by control mechanism 12$g$.

The practice of the present invention employs a self-siphoning method for transferring reaction products from autoclave 10 to receiving vessel 12. In order to initiate a flow of reaction product from autoclave 10 to receiving vessel 12, a pressure difference ($\Delta P$) is required. The following equation applies:

$$P_r - \Delta P = P_s, \qquad \text{(eq. 1)}$$

where $P_r$=reaction pressure in autoclave 10 in MPa (Mega Pascals)

$\Delta P$=pressure difference in MPa $P_s$=saturated steam pressure in receiving vessel 12 in MPa Transfer always should take place under laminar conditions (Reynolds Number$\leq$2000), usually not exceeding 0.4 MPa (4 bars) pressure difference between autoclave 10 and receiving vessel 12, however, the pressure difference could be as high as 1.0 MPa (10 bars) in the case the viscosity of the slurry is high. The latter could be the case in the event the solids content in autoclave 10 is high or reaction times have exceeded a certain time, leading to an increase of viscosity, thus requiring a high pressure difference to enable a proper discharge from autoclave 10, through steam generator 16, through heat exchanger 18, and into receiving vessel 12.

The self-siphoning mechanism in the preferred embodiment is established by first introducing, via inlet valve 12$b$, a fixed amount of water necessary to achieve a saturated steam pressure in vessel 12 after vessel 12 is heated. Upon heating by use of the heating coils 13$a$–13$j$, the water and vessel 12 will both be at the desired same temperature, with the entire vessel 12 acting as a heat reservoir. Thus, any cooling of vessel 12 will take place slowly and evenly. An initial pressure is now established within vessel 12 which should be less than the pressure in autoclave 10.

Thus, when the cooled reactant leaves heat exchanger 18 and enters into the hot receiving vessel 12, it will immediately start to evaporate, creating a certain amount of pressure within receiving vessel 12 which controls the self-siphoning due to the pressure being less than in autoclave 10. In the preferred embodiment, the pressure so produced is such that the reaction product is transferred through line 14 under laminar flow conditions thereby preventing the crystal structure of the reaction product from degrading. For safety's sake, pressure transducers placed on the top of autoclave 10 and vessel 12 are also connected to safety control circuits to prevent the inadvertent opening by individuals operating the system of any valves during the reaction process. In addition, safety valves are placed on the top of autoclave 10 and receiving vessel 12 to relieve pressures within these vessels should these pressures exceed safety limits.

Heat exchanger 18 is used to lower the temperature of the slurry to a selected temperature so that the resulting reaction product may be held in receiving vessel 12 without the reaction product undergoing any further reaction. Thus, the resulting reaction product may be transferred from receiving vessel 12 via outlet 12$e$ at any later time. Frequently, it may be desired to conduct a secondary reaction process in receiving vessel 12, and thus heat exchanger 18 will be operated accordingly to reduce the temperature of the reaction product to the desired temperature for this secondary reaction process.

When the reaction product has been completely transferred from autoclave 10 to receiving vessel 12, there will typically still be a residual pressure in autoclave 10 which may exceed 1 MPa or 10 bars. This residual pressure is typically due to the presence of $CO_2$ and water when the metal salts are acetates or salts of other organic acids, and due to the presence of NO and water when the metal salts are nitrates. To lower this pressure safely, the flow of water into the secondary portion of steam generator 16 may be stopped while continuing to flow water into the secondary portion of heat exchanger 18 via inlet 18$a$. By doing so, the vapor pressure in autoclave 10 is reduced to virtually atmospheric pressure, while hot water is being generated by heat exchanger 18 for subsequent batches. A hot water storage vessel (not shown) may store the hot water outputted from output 18$b$.

The residual hot water which has been outputted by heat exchanger 18 and stored may also be used to provide the initial pressurization of receiving vessel 12 so that less energy is required to be externally supplied to receiving vessel 12 to heat the water to the temperature needed to generate the required initial pressure in receiving vessel 12.

Generally, the maximum temperature drop between the slurry entering and leaving steam generator 16 should not exceed approximately 50° C. By using a separate heat exchanger to generate steam, as opposed to a single heat exchanger which would merely generate hot water, steam generator 16 may be made fairly small so as to withstand very high pressures and temperatures and produce an energy-valuable steam resource which may be used as a control tool in the transfer of reaction products. The specialized use of steam generator 16 enables one to form, using standard materials, a steam generator which may operate at temperatures near critical, at critical, or supercritical temperatures of water Although water has been specifically mentioned as the coolant for steam generator 16 and heat exchanger 18, and as an ingredient in the reaction process itself, other fluids may be used such as but not limited to the solvents listed in Table 2.

Reaction Products

Examples of fine mineral crystals produced by the methods of the invention include but are not limited to spinel type, hexagonal type, and garnet type ferrites. Examples of spinel type ferrite fine mineral crystals produced by the methods of the invention include but are not limited to: $Fe_xZn_yFe_2O_4$, $Mg_xZn_yFe_2O_4$, $Mn_xZn_yFe_2O_4$, $Ni_xZn_yFe_2O_4$, and $Cu_xZn_yFe_2O_4$, where x and y indicate stoichiometry as defined above. In addition, spinel ($MgAl_2O_4$), and gahnite ($ZnAl_2O_4$), are also conveniently produced by the methods of the present invention. Spinel has utility as a heat shielding substance for space vehicles re-entering the atmosphere. Gahnite has been used in the production of variable resistance semiconductor devices, varistors.

Examples of hexagonal type ferrite fine mineral crystals produced by the methods of the invention include but are not limited to: $CaFe_{12}O_{19}$, $SrFe_{12}O_{19}$, and $BaFe_{12}O_{19}$. Examples of garnet type fine mineral crystals produced by the methods of the invention include but are not limited to: $Y_3Fe_5O_{12}$. The fine mineral crystals may be typically produced with a ratio of surface area to mass from about 8 square meters per gram to about 100 square meters per gram. A ratio of crystal surface area to mass of 8 to 12 square meters per gram ($m^2/gm$) is typically considered to be advantageous due to the relative ease of handling of the material. A ratio of crystal surface area to mass of 9 square meters per gram is easily achieved by the methods of this invention. Examples of fine mineral crystals produced by the methods of the invention include but are not limited to those listed in Table 2.

Product fine mineral crystals were analyzed chemically to establish percent metal content by weight. Scanning Electron Microscopy (SEM) and x-ray diffraction were used to characterize the size, morphology, and crystal structure of the product fine mineral crystals. The Brunauer-Emmett-Teller (BET) technique was used to determine the ratio of surface area-to-mass of the fine mineral crystals. For some samples, the saturation magnetization and magnetic remanence of the products were also assessed.

EXAMPLES

Example 1

Synthesis of $Ni_{0.95}Zn_{0.05}Fe_2O_4$

In example run A, described in Table 3 and in Table 4, zinc doped trevorite with stoichiometry $Ni_{0.95}Zn_{0.05}Fe_2O_4$ was synthesized from Ni Acetate, Zn Acetate, and FeOOH. These precursors were mixed stoichiometrically in 1.0 liter of distilled water and loaded into the thermal reactor of the preferred embodiment. The thermal reactor heated this mixture to a temperature of about 352° C. The pressure in the reactor rose to about 17 MPa. This corresponds to near critical solvent conditions. These conditions were maintained for a residence time of about 5 hours. After about 5 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Figure 4:
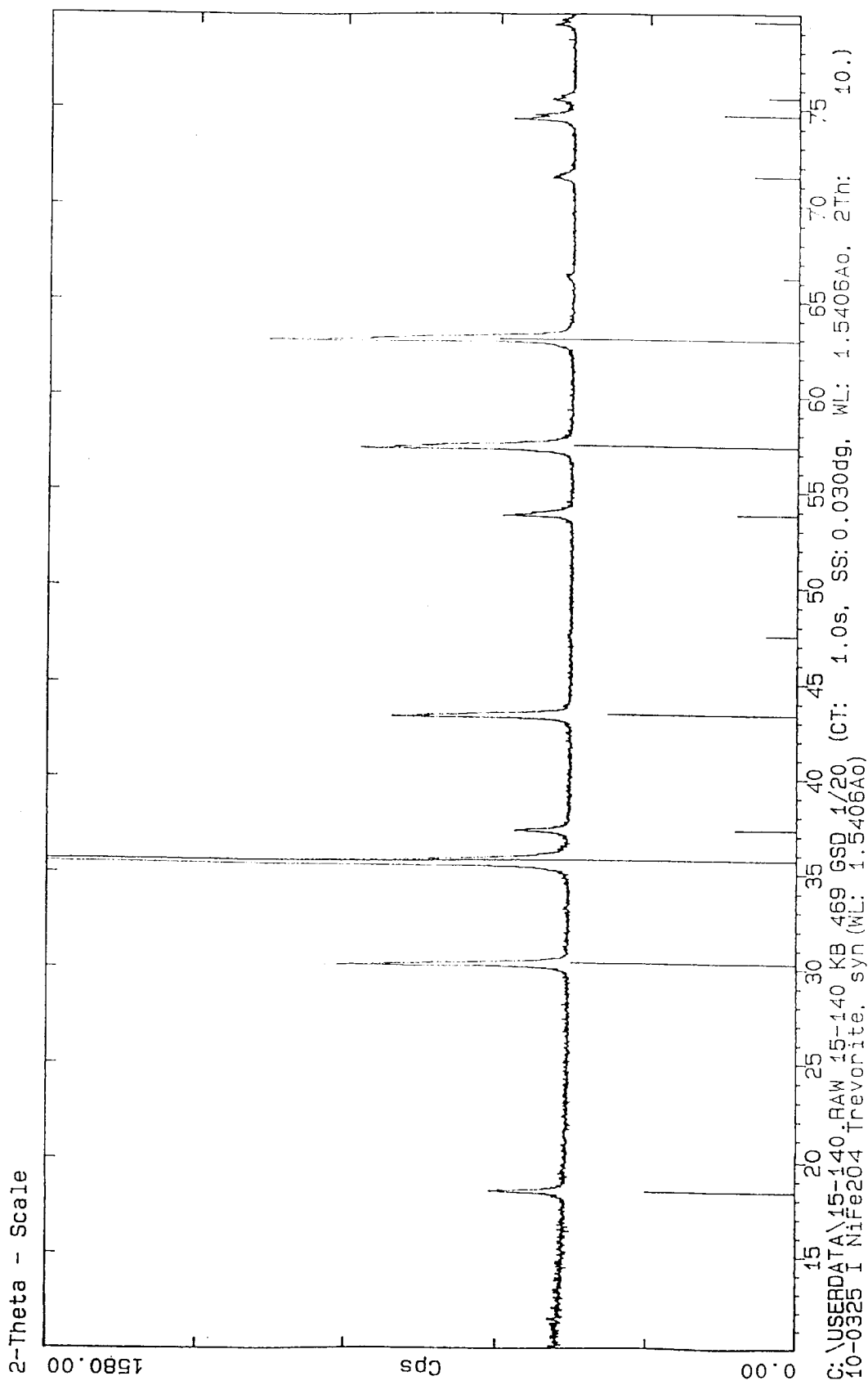
FIG. 4 depicts x-ray diffraction data characterizing the crystal structure of fine trevorite crystals produced by the methods of the invention.
Figure 5E:
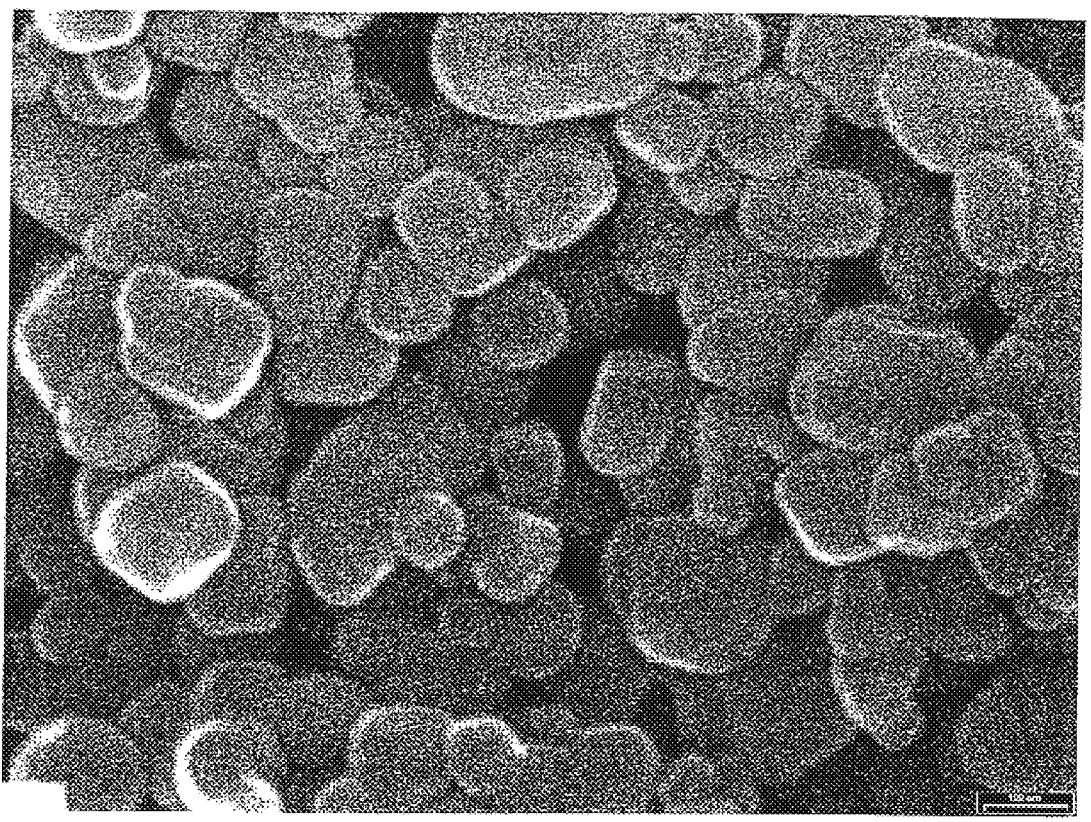
Figure 8E:
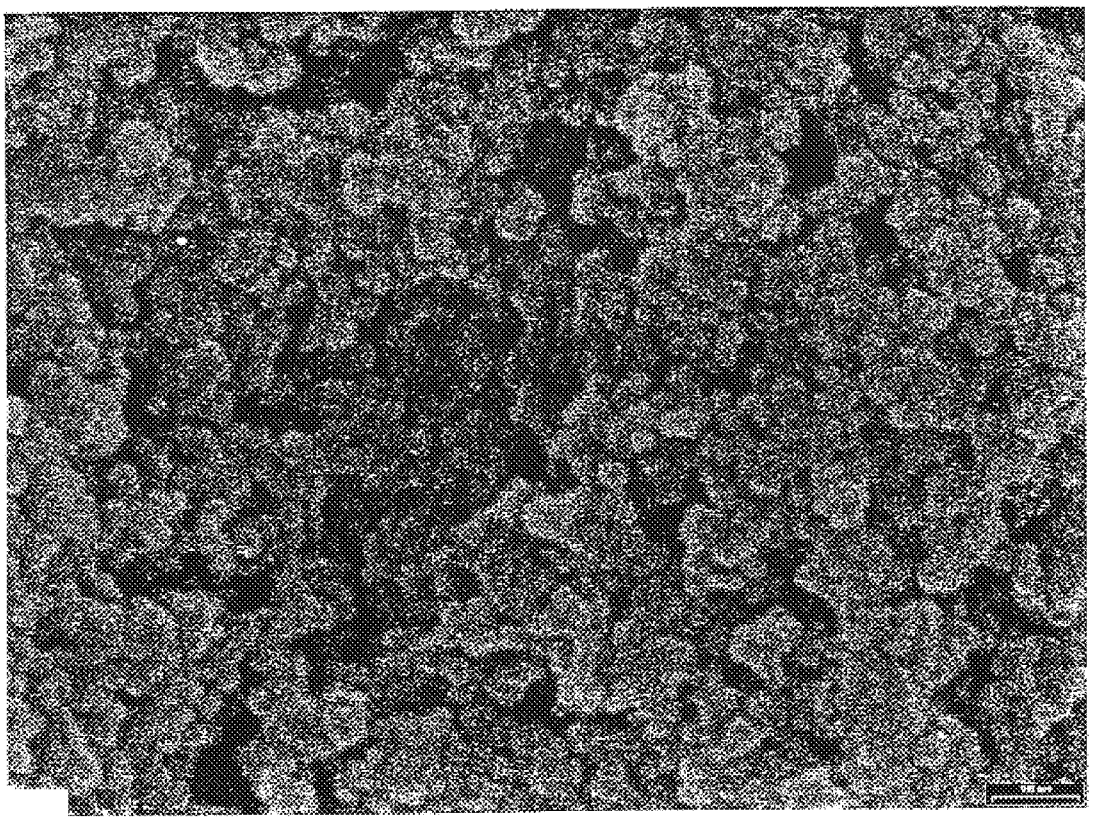

Chemical analysis revealed the metal content of the products to be about 33.2% Ni, about 2.0% Zn, and about 64.8% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray diffraction data for the products, depicted in FIG. 4, confirms that the product is Zn doped trevorite. FIG. 4 plots x-ray scattering intensity on the vertical axis, and scattering angle on the horizontal axis. The vertical bars denote the theoretically expected intensity and position of x-ray scattering peaks for a trevorite crystal structure. The solid trace, vertically offset from zero, depicts the experimentally measured x-ray scattering pattern for the product of run A. The experimental and theoretical scattering patterns are a good match, indicating that the product has a trevorite crystal structure.

The Scanning Electron Microscope images of the product depicted in FIGS. 5a–5e reveal that the product is in the form of fine crystals typically about 150 nm in length. The BET measurements indicate that the product crystals have a ratio of surface area to mass of about 9.0 square meters per gram. This value of surface to mass ratio is favorable for many potential applications, as crystals of this size are typically relatively easy to handle. The product has magnetic saturation of about 46.2 Gauss, and magnetic remanence of about 15.3 Gauss.

Example 2

Synthesis of $Ni_{0.95}Zn_{0.05}Fe_2O_4$

In example run B, described in Table 3 and in Table 4, zinc doped trevorite with stoichiometry $Ni_{0.95}Zn_{0.05}Fe_2O_4$ was synthesized from Ni Acetate, Zn Acetate, and Fe(III) Citrate. These metal salts were mixed stoichiometrically in about 1 liter of distilled water and loaded into the thermal reactor of the preferred embodiment. The thermal reactor heated this mixture to a temperature of about 380° C. The pressure in the reactor rose to about 26 MPa. This corresponds to supercritical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 41.8% Ni, about 2.3% Zn, and about 55.9% Fe, compared to the theoretically expected metal content of about 32.7% Ni, about 1.9% Zn, and about 65.4% Fe for the desired $Ni_{0.95}Zn_{0.05}Fe_2O_4$ stoichiometry. X-ray diffraction data for the product confirms that it is Zn doped trevorite. The x-ray scattering data, not shown, is nearly indistinguishable from that in FIG. 4, indicating that the product has a trevorite crystal structure.

The Scanning Electron Microscope images of the product depicted in FIGS. 6a–6d reveal that the product is in the form of fine crystals typically about 30 nm in length. The BET measurements indicate that the product crystals have a ratio of surface area to mass of about 46.5 square meters per gram. This is an unfavorable value for the surface to mass ratio, as crystals of this size are too small to easily handle. The product has magnetic saturation of about 52.7 Gauss. The magnetic remanence of this product was not determined.

Example 3

Synthesis of $Ni_{0.95}Zn_{0.05}Fe_2O_4$

In example run C, described in Table 3 and in Table 4, zinc doped trevorite with stoichiometry $Ni_{0.95}Zn_{0.05}Fe_2O_4$ was synthesized from Ni Acetate, Zn Acetate, and Fe(III) Nitrate. These metal salts were mixed stoichiometrically in about 1 liter of a solution of 25% $NH_4OH$ in distilled water and loaded into the thermal reactor of the preferred embodiment. The thermal reactor heated this mixture to a temperature of about 380° C. The pressure in the reactor rose to about 26 MPa. This corresponds to supercritical solvent conditions. These conditions were maintained for a residence time of about 24 hours. After about 24 hours, the suspension was transferred from the autoclave to the receiving vessel and cooled to room temperature. The residual gas in the reactor and the receiving vessel included NO. The internal pressure of the reactor was equalized with atmospheric pressure, and the slurry of product fine mineral crystals and water was unloaded from the receiving vessel.

Chemical analysis revealed the metal content of the products to be about 33.9% Ni, about 2.4% Zn, and about 63.8% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray diffraction data for the product confirms that it is Zn doped trevorite. The x-ray scattering data, not shown, is nearly indistinguishable from that in FIG. 4, indicating that the product has a trevorite crystal structure.

The Scanning Electron Microscope images of the product depicted in FIGS. 7a–7d reveal that the product is in the form of fine crystals typically about 50 nm in length. The BET measurements indicate that the product crystals have a ratio of surface area to mass of about 27.9 square meters per gram. This is an unfavorable value for the surface to mass ratio, as crystals of this size are too small to easily handle. The product has magnetic saturation of about 47.5 Gauss, and magnetic remanence of about 10.2 Gauss.

Example 4

Synthesis of $Ni_{0.95}Zn_{0.05}Fe_2O_4$

In example run D, described in Table 3 and in Table 4, zinc doped trevorite with stoichiometry $Ni_{0.95}Zn_{0.05}Fe_2O_4$ was synthesized from Ni Nitrate, Zn Nitrate, and Fe(III) Nitrate. These metal salts were mixed stoichiometrically in about 0.2 liters of a solution of 25% $NH_4OH$ in distilled water and loaded into the thermal reactor of the preferred embodiment. The thermal reactor heated this mixture to a temperature of about 210° C. The pressure in the reactor rose to about 1.9 MPa. This corresponds to near-critical solvent conditions. These conditions were maintained for a residence time of about 24 hours. After about 24 hours, the suspension was transferred from the autoclave to the receiving vessel and cooled to room temperature. The residual gas in the reactor and the receiving vessel included NO. The internal pressure of the reactor was equalized with atmospheric pressure, and the slurry of product fine mineral crystals and water was unloaded from the receiving vessel.

Chemical analysis revealed the metal content of the products to be about 28.9% Ni, about 2.0% Zn, and about 69.0% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, is nearly indistinguishable from that in FIG. 4, indicating that the product has a trevorite crystal structure.

The Scanning Electron Microscope images of the product depicted in FIGS. 8a–8e reveal that the product is in the form of fine crystals typically about 25 nm in length. The BET measurements indicate that the product crystals have a ratio of surface area to mass of about 54.4 square meters per gram. This is an unfavorable value for the surface to mass ratio, as crystals of this size are too small to easily handle.

Example 5

Synthesis of $Ni_{0.95}Zn_{0.05}Fe_2O_4$

In example run E, described in Table 3 and in Table 4, zinc doped trevorite with stoichiometry $Ni_{0.95}Zn_{0.05}Fe_2O_4$ was synthesized from Ni Nitrate, Zn Nitrate, and Fe(III) Nitrate. These metal salts were mixed stoichiometrically in about 1.0 liter of a solution of 25% $NH_4OH$ in distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The residual gas in the reactor and the receiving vessel included NO. The internal pressure of the reactor was equalized with atmospheric pressure, and the slurry of product fine mineral crystals and water was unloaded from the receiving vessel.

Chemical analysis revealed the metal content of the products to be about 30.5% Ni, about 2.4% Zn, and about 67.2% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, is nearly indistinguishable from that in FIG. 4, indicating that the product has a trevorite crystal structure.

The Scanning Electron Microscope images of the product depicted in FIGS. 9a–9c reveal that the product is in the form of fine crystals typically about 15 nm in length. The BET measurements indicate that the product crystals have a ratio of surface area to mass of about 13.7 square meters per gram. This is an unfavorable value for the surface to mass ratio, as crystals of this size are too small to easily handle.

Example 6

Synthesis of $Ni_{0.95}Zn_{0.05}Fe_2O_4$

In example run F, described in Table 3 and in Table 4, zinc doped trevorite with stoichiometry $Ni_{0.95}Zn_{0.05}Fe_2O_4$ was synthesized from Ni Acetate, Zn Acetate, and FeOOH. These precursors were mixed stoichiometrically in about 1.0 liter of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 32.1% Ni, about 1.8% Zn, and about 66.1% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, is nearly indistinguishable from that in FIG. 4, indicating that the product has a trevorite crystal structure.

The Scanning Electron Microscope images of the product depicted in FIGS. 10a–10d reveal that the product is in the form of fine crystals typically about 150 nm in length. The BET measurements indicate that the product crystals have a ratio of surface area to mass of about 9.8 square meters per gram. This is a favorable value for the surface to mass ratio, as crystals of this size are easy to handle.

Example 7

Synthesis of $Ni_{0.95}Zn_{0.05}Fe_2O_4$

In example run G, described in Table 3 and in Table 4, zinc doped trevorite with stoichiometry $Ni_{0.95}Zn_{0.05}Fe_2O_4$ was synthesized from Ni Acetate, Zn Acetate, and alkaline FeOOH. These precursors were mixed stoichiometrically in about 0.8 liters of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 31.0% Ni, about 2.1% Zn, and about 66.9% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, is nearly indistinguishable from that in FIG. 4, indicating that the product has a trevorite crystal structure.

The Scanning Electron Microscope images of the product depicted in FIGS. 11a–11e reveal that the product is in the form of fine crystals typically about 150 nm in length. The BET measurements indicate that the product crystals have a ratio of surface area to mass of about 9.8 square meters per gram. This is a favorable value for the surface to mass ratio, as crystals of this size are easy to handle.

Example 8

Synthesis of $Ni_{0.95}Zn_{0.05}Fe_2O_4$

In example run K, described in Table 3 and in Table 4, zinc doped trevorite with stoichiometry $Ni_{0.95}Zn_{0.05}Fe_2O_4$ was synthesized from Ni Nitrate, Zn Nitrate, and Fe(III) Nitrate. These metal salts were mixed stoichiometrically in about 1.0 liter of a solution of about 25% $NH_4OH$ in distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 48 hours. After about 48 hours, the suspension was transferred from the autoclave to the receiving vessel and cooled to room temperature. The residual gas in the reactor and the receiving vessel included NO. The internal pressure of the reactor was equalized with atmospheric pressure, and the slurry of product fine mineral crystals and water was unloaded from the receiving vessel.

Chemical analysis revealed the metal content of the products to be about 22.3% Ni, about 1.0% Zn, and about 76.7% Fe, in comparison to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, indicates that the product has a mix of trevorite and hematite crystal structures. Hematite is a mineral with chemical formula $Fe_2O_3$. The presence of hematite accounts for the discrepancy between the observed and expected metal contents of the product.

The Scanning Electron Microscope images of the product depicted in FIGS. 12a–12c reveal that the product is in the form of fine crystals typically about 40 nm in length. The BET measurements indicate that the product crystals have a ratio of surface area to mass of about 33.3 square meters per gram. This is an unfavorable value for the surface to mass ratio, as crystals of this size are difficult to handle.

Example 9

Synthesis of $Ni_{0.95}Zn_{0.05}Fe_2O_4$

In example run L, described in Table 3 and in Table 4, zinc doped trevorite with stoichiometry $Ni_{0.95}Zn_{0.05}Fe_2O_4$ was synthesized from Ni Sulfate, Zn Sulfate, and Fe(II) Sulfate. These metal salts were mixed stoichiometrically in about 1.0 liter of a solution of about 25% NaOH in distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 32.3% Ni, about 2.4% Zn, and about 65.3% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, indicates that the product has a mix of trevorite and bunsenite crystal structures. Bunsenite is a mineral with chemical formula NiO.

The Scanning Electron Microscope images of the product depicted in FIGS. 13a–13d reveal that the product is in the form of fine crystals typically from about 40 nm to 200 nm in length. The BET measurements indicate that the product crystals have a ratio of surface area to mass of about 13.7 square meters per gram. This is an unfavorable value for the surface to mass ratio, as crystals of this size are difficult to handle.

Example 10

Synthesis of $Ni_{0.95}Zn_{0.05}Fe_2O_4$

In example run M, described in Table 3 and in Table 4, zinc doped trevorite with stoichiometry $Ni_{0.95}Zn_{0.05}Fe_2O_4$ was synthesized from Ni Acetate, Zn Acetate, and FeOOH. These precursors were mixed stoichiometrically in about 1.0 liter of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 30.4% Ni, about 2.0% Zn, and about 67.6% Fe. This compares favorably to the theoretically expected metal content of about 32.7% Ni, about 1.9% Zn, and about 65.4% Fe for the desired $Ni_{0.95}Zn_{0.05}Fe_2O_4$ stoichiometry. X-ray scattering data, not shown, indicates that the product has a mix of trevorite and hematite crystal structures. The presence of hematite, which has chemical formula $Fe_2O_3$, accounts for the discrepancy between the observed and expected metal contents of the product.

The Scanning Electron Microscope images of the product depicted in FIGS. 14a–14d reveal that the product is in the form of fine crystals typically about 150 nm in length. The BET measurements indicate that the product crystals have a ratio of surface area to mass of about 9.5 square meters per gram. This is a favorable value for the surface to mass ratio, as crystals of this size are easy to handle.

Example 11

Synthesis of $Ni_{0.6}Zn_{0.4}Fe_2O_4$

In example run H, described in Table 3 and in Table 4, zinc doped trevorite with stoichiometry $Ni_{0.6}Zn_{0.4}Fe_2O_4$ was synthesized from Ni Acetate, Zn Acetate, and washed FeOOH. These precursors were mixed'stoichiometrically in about 1.0 liter of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 20.1% Ni, about 14.3% Zn, and about 65.6% Fe. This compares favorably to the theoretically expected metal content of about 20.4% Ni, about 15.1% Zn, and about 64.5% Fe for the desired $Ni_{0.6}Zn_{0.4}Fe_2O_4$ stoichiometry. X-ray scattering data, not shown, is nearly indistinguishable from that of FIG. 4, indicating that the product has a trevorite crystal structure.

The Scanning Electron Microscope images of the product depicted in FIGS. 15a–15d reveal that the product is in the form of fine crystals typically from about 50 to about 200 nm in length. The BET measurements indicate that the product crystals have a ratio of surface area to mass of about 7.3 square meters per gram. This is a favorable value for the surface to mass ratio, as crystals of this size are easy to handle.

Example 12

Synthesis of $Ni_{0.6}Zn_{0.4}Fe_2O_4$

In example run I, described in Table 3 and in Table 4, zinc doped trevorite with stoichiometry $Ni_{0.6}Zn_{0.4}Fe_2O_4$ was synthesized from Ni Acetate, Zn Acetate, and washed FeOOH. These precursors were mixed stoichiometrically in about 1.0 liter of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 19.8% Ni, about 13.9% Zn, and about 66.3% Fe. This compares favorably to the theoretically expected metal content of about 20.4% Ni, about 15.1% Zn, and about 64.5% Fe for the desired $Ni_{0.6}Zn_{0.4}Fe_2O_4$ stoichiometry. X-ray scattering data, not shown, is nearly indistinguishable from that of FIG. 4, indicating that the product has a trevorite crystal structure.

The Scanning Electron Microscope images of the product depicted in FIGS. 16a–16d reveal that the product is in the form of fine crystals typically about 50 to 200 nm in length. The BET measurements indicate that the product crystals have a ratio of surface area to mass of about 8.5 square meters per gram. This is a favorable value for the surface to mass ratio, as crystals of this size are easy to handle.

Example 13

Synthesis of $Ni_{0.6}Zn_{0.4}Fe_2O_4$

In example run J, described in Table 3 and in Table 4, zinc doped trevorite with stoichiometry $Ni_{0.6}Zn_{0.4}Fe_2O_4$ was synthesized from Ni Acetate, Zn Acetate, and washed FeOOH. These precursors were mixed stoichiometrically in about 1.0 liter of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 24 hours. After about 24 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 20.2% Ni, about 13.9% Zn, and about 65.9% Fe. This compares favorably to the theoretically expected metal content of about 20.4% Ni, about 15.1% Zn, and about 64.5% Fe for the desired $Ni_{0.6}Zn_{0.4}Fe_2O_4$ stoichiometry. X-ray scattering data, not shown, is nearly indistinguishable from that of FIG. 4, indicating that the product has a trevorite crystal structure.

The Scanning Electron Microscope images of the product depicted in FIGS. 17a–17d reveal that the product is in the form of fine crystals typically about 200 nm in length. The BET measurements indicate that the product crystals have a ratio of surface area to mass of about 5.5 square meters per gram.

Example 14

Synthesis of $NiO_{0.6}Zn_{0.4}Fe_2O_4$

In example run N, described in Table 3 and in Table 4, zinc doped trevorite with stoichiometry $Ni_{0.6}Zn_{0.4}Fe_2O_4$ was synthesized from Ni Acetate, Zn Acetate, and washed FeOOH. These precursors were mixed stoichiometrically in about 1.0 liter of distilled water and loaded into the thermal reactor of the preferred embodiment. The thermal reactor heated this mixture to a temperature of about 380° C. The pressure in the reactor rose to about 26 MPa. This corresponds to super-critical solvent conditions. These conditions were maintained for a residence time of about 6 hours. After about 6 hours, the suspension was transferred from the autoclave to the receiving vessel and cooled to room temperature. The internal pressure of the reactor was equalized with atmospheric pressure, and the slurry of product fine mineral crystals and water was unloaded from the receiving vessel.

Chemical analysis revealed the metal content of the products to be about 20.4% Ni, about 15.1% Zn, and about 64.5% Fe. This compares favorably to the theoretically expected metal content of about 20.4% Ni, about 15.1% Zn, and about 64.5% Fe for the desired $Ni_{0.6}Zn_{0.4}Fe_2O_4$ stoichiometry. X-ray scattering data, not shown indicates that the product has a mix of trevorite and hematite crystal structures.

The Scanning Electron Microscope images of the product depicted in FIGS. 18a–18d reveal that the product is in the form of fine crystals typically about 150 nm in length. The BET measurements indicate that the product crystals have a ratio of surface area to mass of about 8.2 square meters per gram.

Having described the methods of the invention in detail, those skilled in the art will appreciate that, given the present disclosure, modifications may be made to the methods of the invention without departing from the spirit of the inventive concept described herein. Therefore, it is not intended that the scope of the methods of the invention be limited to the specific and preferred embodiments illustrated and described. Rather, it is intended that the scope of the methods of the invention be determined by the appended claims.

TABLE 1

| Present invention: | Solid state synthesis: |
|---|---|
| mixing of raw materials in solvent | dry mixing of raw materials |
| mixing time < 15 minutes | mixing time > 3 days |
| in situ addition of dopants | not feasible to add dopants |
| Reaction time < 5 hours | intermediate calcining > 2 hours |
| Spray-drying < 100 Kgs/hour | grinding to required particle size, > 2 days |
| Addition of binder(s) | addition of binder(s) |
| Green body preparation | green body preparation |
| Calcining (low temperature) | calcining (high temperature) |
| Machining | machining |

TABLE 2

| Solvents | Critical Temperature (° K.) | Critical Pressure (MPa) |
|---|---|---|
| Carbon Dioxide | 304.26 | 7.28 |
| Ethane | 305.46 | 4.82 |
| Ethylene | 282.46 | 4.97 |
| Propane | 369.86 | 4.19 |
| Propylene | 365.06 | 4.56 |
| Cyclohexane | 553.46 | 4.02 |
| Isopropanol | 508.36 | 4.70 |
| Benzene | 562.16 | 4.83 |
| Toluene | 591.76 | 4.06 |
| p-Xylene | 616.26 | 3.47 |
| Chlorotrifluoromethane | 302.06 | 3.87 |
| Trichlorofluoromethane | 471.26 | 4.35 |
| Ammonia | 405.66 | 11.13 |
| Water | 647.36 | 22.12 |

TABLE 3

| Run | Precursors | Volume Distilled Water (liters) | Temperature ° K (° C.) | Pressure (MPa) | Residence Time (hrs) |
|---|---|---|---|---|---|
| A | Ni Acetate Zn Acetate FeOOH | 1.0 | 625 (352) | 17 | 5 |
| B | Ni Acetate Zn Acetate Fe(III) Citrate | 1.0 | 653 (380) | 26 | 24 |
| C | Ni Acetate Zn Acetate Fe(III) Nitrate | 1.0 including 25% $NH_4OH$ | 653 (380) | 26 | 24 |
| D | Ni Nitrate Zn Nitrate Fe(III) Nitrate | 0.2 including 25% $NH_4OH$ | 483 (210) | 1.9 | 24 |
| E | Ni Nitrate Zn Nitrate Fe(III) Nitrate | 1.0 including 25% $NH_4OH$ | 653 (380) | 26 | 24 |
| F | Ni Acetate Zn Acetate FeOOH | 1.0 | 653 (380) | 26 | 24 |
| G | Ni Acetate Zn Acetate FeOOH (Alk) | 0.8 | 653 (380) | 26 | 24 |
| H | Ni Acetate Zn Acetate FeOOH* | 1.0 | 653 (380) | 26 | 24 |
| I | Ni Acetate Zn Acetate FeOOH** | 1.0 | 653 (380) | 26 | 24 |
| J | Ni Acetate Zn Acetate FeOOH** | 1.0 | 653 (380) | 26 | 24 |
| K | Ni Nitrate Zn Nitrate Fe(III) Nitrate | 1.0 including 25% $NH_4OH$ | 653 (380) | 26 | 48 |
| L | Ni Sulfate Zn Sulfate Fe(II) Sulfate | 1.0 including 25% NaOH | 653 (380) | 26 | 24 |
| M | Ni Acetate Zn Acetate FeOOH (Ntr) | 1.0 | 653 (380) | 26 | 24 |
| N | Ni Acetate Zn Acetate FeOOH* | 1.0 | 653 (380) | 26 | 6 |

*washed
**washed twice and dried
(Alk) is alkaline
(Ntr) is neutral

TABLE 4

Stoichiometry: Ni$_{0.95}$Zn$_{0.05}$Fe$_2$O$_4$

| Run | Expected Percent Metal Content, by weight | Percent Metal Content, by weight | Crystal Structure | Surface/mass (m$^2$/gm) | magnetic saturation B$_s$ (Gauss) | magnetic remanence B$_r$ (Gauss) |
|---|---|---|---|---|---|---|
| A | 32.7% Ni<br>1.9% Zn<br>65.4% Fe | 33.2% Ni<br>2.0% Zn<br>64.8% Fe | Trevorite | 9.0 | 46.2 | 15.3 |
| B | 32.7% Ni<br>1.9% Zn<br>65.4% Fe | 41.8% Ni<br>2.30% Zn<br>55.9% Fe | Trevorite | 46.5 | 52.7 | N.D. |
| C | 32.7% Ni<br>1.9% Zn<br>65.4% Fe | 33.9% Ni<br>2.40% Zn<br>63.8% Fe | Trevorite | 27.9 | 47.5 | 10.2 |
| D | 32.7% Ni<br>1.9% Zn<br>65.4% Fe | 28.9% Ni<br>2.00% Zn<br>69.0% Fe | Trevorite | 54.4 | N.D. | N.D. |
| E | 32.7% Ni<br>1.9% Zn<br>65.4% Fe | 30.5% Ni<br>2.4% Zn<br>67.2% Fe | Trevorite | 13.7 | N.D. | N.D. |
| F | 32.7% Ni<br>1.9% Zn<br>65.4% Fe | 32.1% Ni<br>1.8% Zn<br>66.1% Fe | Trevorite | 9.8 | N.D. | N.D. |
| G | 32.7% Ni<br>1.9% Zn<br>65.4% Fe | 31.0% Ni<br>2.1% Zn<br>66.9% Fe | Trevorite | 9.8 | N.D. | N.D. |
| K | 32.7% Ni<br>1.9% Zn<br>65.4% Fe | 22.3% Ni<br>1.0% Zn<br>76.7 % Fe | Trevorite + Hematite | 33.3 | N.D. | N.D. |
| L | 32.7% Ni<br>1.9% Zn<br>65.4% Fe | 32.3% Ni<br>2.4% Zn<br>65.3% Fe | Trevorite + NiO | 13.7 | N.D. | N.D. |
| M | 32.7% Ni<br>1.9% Zn<br>65.4% Fe | 30.4% Ni<br>2.0% Zn<br>67.6% Fe | Trevorite + Hematite | 9.5 | N.D. | N.D. |
| H | 20.4% Ni<br>15.1% Zn<br>64.5% Fe | 20.1% Ni<br>14.3% Zn<br>65.6% Fe | Trevorite | 7.3 | N.D. | N.D. |
| I | 20.4% Ni<br>15.1% Zn<br>64.5% Fe | 19.8% Ni<br>13.9% Zn<br>66.3% Fe | Trevorite | 8.5 | N.D. | N.D. |
| J | 20.4% Ni<br>15.1% Zn<br>64.5% Fe | 20.2% Ni<br>13.9% Zn<br>65.9% Fe | Trevorite | 5.5 | N.D. | N.D. |
| N | 20.4% Ni<br>15.1% Zn<br>64.5% Fe | 20.4% Ni<br>15.1% Zn<br>64.5% Fe | Trevorite + Hematite | 8.2 | N.D. | N.D. |

We claim:

1. A method of making at least one crystal product having a controllable ratio of surface area to mass, comprising:

a) mixing reactants in a solvent wherein said reactants comprise at least two substances selected from the group consisting of metal salts selected from the group consisting of nitrate, sulfate, metal organic acid salts and mixtures thereof, metal oxides, metal oxyhydroxides and mixtures thereof, and wherein said reactants have approximately the stoichiometric ratio of metals desired in said product, and wherein said reactants comprise at least two different metals, and wherein a reactant is FeOOH; and b) reacting said reactants as mixed in said solvent under critical domain conditions of temperature and pressure, and under conditions of pH and for sufficient reaction time to produce said product having said controllable surface[]area to mass ratio, wherein said metal is selected from the group consisting of Fe, Mn, Mg, Ca, Sr, Co, Cd, Pb, Ni, Zn, Al, Cu, Y, and mixtures thereof.

2. A method as in claim 1, wherein said FeOOH is the mineral goethite.

3. A method as in claim 1, wherein said solvent comprises water.

4. A method as in claim 3 wherein said solvent further comprises NH$_4$OH.

5. A method as in claim 1, wherein said temperature is from approximately 200° C. to approximately 500° C.

6. A method as in claim 1, wherein said pH is from approximately 3.2 to approximately 4.5.

7. A method as in claim 1 wherein said pressure is from approximately 1 MPa to approximately 30 MPa.

8. A method as in claim 1 wherein said reaction time is from approximately 1 hour to approximately 48 hours.

9. A method as in claim 1 wherein said crystal has the hexagonal, spinel, or garnet structure.

10. A method as in claim 1 wherein said metal organic acid salts are selected from the group consisting of carboxylate, citrate, oxalate, and mixtures thereof.

11. A method as in claim 10 wherein said carboxylate metal salts are selected from the group consisting of acetate, formate and mixtures thereof.

12. A method of making at least one crystal product having a controllable ratio of surface area to mass, comprising:

a) mixing reactants in a solvent wherein said reactants comprise at least two substances selected from the group consisting of metal salts selected from the group consisting of nitrate, sulfate, metal organic acid salts and mixtures thereof, metal oxides, metal oxyhydroxides and mixtures thereof, and wherein said reactants have approximately the stoichiometric ratio of metals desired in said product, and wherein said reactants comprise at least two different metals, and wherein said product contains a ferrite, said ferrite having a trevorite crystal structure, and wherein at least one of said reactants is a substance containing iron; and b) reacting said reactants as mixed in said solvent under critical domain conditions of temperature and pressure, and under conditions of pH and for sufficient reaction time to produce said product having said controllable surface area to mass ratio, wherein said metal is selected from the group consisting of Fe, Mn, Mg, Ca, Sr, Co, Cd, Pb, Ni, Zn, Al, Cu, Y, and mixtures thereof.

13. A method as in claim 12 wherein said product comprises at least one of $Fe_xZn_yFe_2O_4$, $Mg_xZn_yFe_2O_4$, $Mn_xZn_yFe_2O_4$, $Ni_xZn_yFe_2O_4$, $Cu_xZn_yFe_2O_4$, $CaFe_{12}O_{19}$, $SrFe_{12}O_{19}$, and $YFe_5O_{12}$, where x and y are numbers between 0 and 1 whose sum is 1.

14. A method of making at least one crystal product having a controllable ratio of surface area to mass, comprising:

a) mixing reactants in a solvent wherein said reactants comprise at least two substances selected from the group consisting of metal salts selected from the group consisting of nitrate, sulfate, metal organic acid salts and mixtures thereof, metal oxides, metal oxyhydroxides and mixtures thereof, and wherein said reactants have approximately the stoichiometric ratio of metals desired in said product, and wherein said reactants comprise at least two different metals, and wherein said product contains a ferrite, said ferrite being a zinc substituted ferrite having substantially the composition $Ni_xZn_yFe_2O_4$ wherein x and y are fractions between 0 and 1 and whose sum is approximately one, and wherein at least one of said reactants is a substance containing iron; and b) reacting said reactants as mixed in said solvent under critical domain conditions of temperature and pressure, and under conditions of pH and for sufficient reaction time to produce said product having said controllable surface area to mass ratio, wherein said metal is selected from the group consisting of Fe, Mn, Mg, Ca, Sr, Co, Cd, Pb, Ni, Zn, Al, Cu, Y, and mixtures thereof.

15. A method as in claim 14 wherein x is approximately 0.6 and y is approximately 0.4.

16. A method as in claim 15 wherein said product has a surface area to mass ratio of from approximately 9 to approximately 54.4 square meters per gram.

17. A method as in claim 14 wherein x is approximately 0.6 and y is approximately 0.4.

18. A method as in claim 17 wherein said product has a surface area to mass ratio of from approximately 5.5 to approximately 8.5 square meters per gram.

19. A method of making at least one crystal product having a controllable ratio of surface area to mass, comprising:

a) mixing reactants in a solvent wherein said reactants comprise at least two substances selected from the group consisting of metal salts selected from the group consisting of nitrate, sulfate, metal organic acid salts and mixtures thereof, metal oxides, metal oxyhydroxides and mixtures thereof, and wherein said reactants have approximately the stoichiometric ratio of metals desired in said product, and wherein said reactants comprise at least two different metals, and wherein said product contains a ferrite, and wherein at least one of said reactants is a substance containing iron, wherein said substance containing iron is selected from the group comprising FeOOH, iron citrate, iron nitrate, iron oxalate, iron carboxylate, and mixtures thereof; and b) reacting said reactants as mixed in said solvent under critical domain conditions of temperature and pressure, and under conditions of pH and for sufficient reaction time to produce said product having said controllable surface area to mass ratio, wherein said metal is selected from the group consisting of Fe, Mn, Mg, Ca, Sr, Co, Cd, Pb, Ni, Zn, Al, Cu, Y, and mixtures thereof.

20. A method of making at least one crystal product having a controllable ratio of surface area to mass, comprising:

a) mixing reactants in a solvent wherein said reactants comprise at least two substances selected from the group consisting of metal salts selected from the group consisting of nitrate, sulfate, metal organic acid salts and mixtures thereof, metal oxides, metal oxyhydroxides and mixtures thereof, and wherein said reactants have approximately the stoichiometric ratio of metals desired in said product, and wherein said reactants comprise at least two different metals, and wherein said crystal has the hexagonal, spinel, or garnet structure, and wherein said crystal is spinel; and b) reacting said reactants as mixed in said solvent under critical domain conditions of temperature and pressure, and under conditions of pH and for sufficient reaction time to produce said product having said controllable surface area to mass ratio, wherein said metal is selected from the group consisting of Fe, Mn, Mg, Ca, Sr, Co, Cd, Pb, Ni, Zn, Al, Cu, Y, and mixtures thereof.

21. A method of making at least one crystal product having a controllable ratio of surface area to mass, comprising:

a) mixing reactants in a solvent wherein said reactants comprise at least two substances selected from the group consisting of metal salts selected from the group consisting of nitrate, sulfate, metal organic acid salts and mixtures thereof, metal oxides, metal oxyhydroxides and mixtures thereof, and wherein said reactants have approximately the stoichiometric ratio of metals desired in said product, and wherein said reactants comprise at least two different metals, and wherein said crystal has the hexagonal, spinel, or garnet structure, and wherein said crystal is gahnite; and b) reacting said reactants as mixed in said solvent under critical domain conditions of temperature and pressure, and under conditions of pH and for sufficient reaction time to produce said product having said controllable surface area to mass ratio, wherein said metal is selected from the group consisting of Fe, Mn, Mg, Ca, Sr, Co, Cd, Pb, Ni, Zn, Al, Cu, Y, and mixtures thereof.

* * * * *